(12) United States Patent
Nitto et al.

(10) Patent No.: US 6,214,954 B1
(45) Date of Patent: Apr. 10, 2001

(54) OLEFIN POLYMERIZATION CATALYST

(75) Inventors: Yu Nitto; Tokitaka Kaneshima; Toshiya Aoki, all of Kurashiki (JP)

(73) Assignee: Asahi Kasei Kogyo Kabushiki Kaisha, Osaka (JP)

( * ) Notice: Subject to any disclaimer, the term of this patent is extended or adjusted under 35 U.S.C. 154(b) by 0 days.

(21) Appl. No.: 08/849,835

(22) PCT Filed: Dec. 13, 1995

(86) PCT No.: PCT/JP95/02558

§ 371 Date: Jun. 12, 1997

§ 102(e) Date: Jun. 12, 1997

(87) PCT Pub. No.: WO96/18658

PCT Pub. Date: Jun. 20, 1996

(30) Foreign Application Priority Data

Dec. 13, 1994 (JP) ........................................ 6-308729
Dec. 13, 1994 (JP) ........................................ 6-308730

(51) Int. Cl.[7] ......................................................... C08F 4/42
(52) U.S. Cl. .................. 526/161; 502/117; 502/154; 502/155; 526/160; 526/172; 526/943; 556/52; 556/54; 556/55; 556/56
(58) Field of Search ...................... 502/117, 154, 502/155; 526/160, 161, 172, 943; 556/52, 54, 55, 56

(56) References Cited

U.S. PATENT DOCUMENTS 5,527,752 * 6/1996 Reichle et al. ................... 502/117

FOREIGN PATENT DOCUMENTS

| 0129368 | 12/1984 | (EP) . |
| 0142143 | 5/1985 | (EP) . |
| 0351392 | 1/1990 | (EP) . |
| 0416815 | 3/1991 | (EP) . |
| 0514828 | 11/1992 | (EP) . |
| 58-19309 | 2/1983 | (JP) . |
| 61-130314 | 6/1986 | (JP) . |
| 5170820 | 7/1993 | (JP) . |
| 5194641 | 8/1993 | (JP) . |
| 9308221 | 4/1993 | (WO) . |

OTHER PUBLICATIONS

J. Chem. Soc., Chem. Commun., 18, 1415–1417 (1993).
Mu et al., New ligand environments for soluble Ziegler––Natta olefin polymerization catalyst procursors, Polyhedron, vol. 14, No. 1, pp. 1–10, Jan. 1995.*

Bruder et al., Synthesis, characterization and x–ray structure of n5–cyclopendadienyltris(N,N–dimethyldithiocarbamato)–zirconium(IV), J. Amer. Chem. Soc., vol. 98, No. 22, pp.6932–6938, Oct. 1976.*

Fay et al., Nuclear Magnetic Resonance Studies of Stereochemical Rearrangements in (n5–cyclopentadienyl)tris(N, N–dimethyldithiocarbamato)titanium(IV),–zirconium(IV), and –hafnium(IV), Inorg. Chem. vol. 23, pp. 1078–1089, 1984.*

Chernega et al., Mono–n–cyclopentadienyl–benzamidinaot compounds of titanium, zirconium and hafnium, J. Chem. Soc. Chem. Commun., pp. 1415–1417, 1993.*

* cited by examiner

*Primary Examiner*—David W. Wu
*Assistant Examiner*—Ling-Siu Choi
(74) *Attorney, Agent, or Firm*—Birch, Stewart, Kolasch & Birch, LLP

(57) ABSTRACT

Disclosed is an olefin polymerization catalyst comprising: a transition metal compound comprising one transition metal selected from the group consisting of Ti, Zr and Hf, and at least two ligands, wherein one ligand is a group having a cyclopentadienyl skeleton, and the remaining at least one ligand is a monovalent, bidentate, anionic chelating ligand having two coordinating atoms each coordinated to the transition metal, one of which atoms is selected from the group consisting of O, S, Se and Te, and the other of which atoms is selected from the group consisting of N, S, Se and Te, and wherein one of the remaining at least one ligand is optionally bonded to the group having a cyclopentadienyl skeleton through a bridging group. Also disclosed is a method for efficiently producing an olefin homopolymer or olefin copolymer by using this catalyst. By polymerizing an olefin using the olefin polymerization catalyst of the present invention, there can be advantageously produced an olefin homopolymer having a narrow molecular weight distribution or an olefin copolymer having not only a narrow molecular weight distribution but also a uniform copolymerization distribution. The produced polymer has high impact strength, high resistance to stress cracking, high transparency, excellent heat sealing properties at low temperatures, high blocking resistance, low tackiness, low extractability and the like.

7 Claims, No Drawings

OLEFIN POLYMERIZATION CATALYST

BACKGROUND OF THE INVENTION

1. Field of the Invention

The present invention relates to a novel olefin polymerization catalyst and a method for polymerizing an olefin using the catalyst. More particularly, the present invention is concerned with an olefin polymerization catalyst comprising a transition metal compound which comprises one transition metal selected from Ti, Zr and Hf, and at least two ligands, wherein one ligand is a group having a cyclopentadienyl skeleton, and the remaining at least one ligand is a monovalent, bidentate, anionic chelating ligand having two coordinating atoms, one of which atoms is selected from O, S, Se and Te, and the other of which atoms is selected from N, S, Se and Te. The present invention is also concerned with a method for efficiently producing an olefin homopolymer or olefin copolymer by using this catalyst.

The transition metal compound of the olefin polymerization catalyst of the present invention is a novel compound. By polymerizing an olefin using the olefin polymerization catalyst of the present invention, there can be advantageously produced an olefin homopolymer having a narrow molecular weight distribution or an olefin copolymer having not only a narrow molecular weight distribution but also a uniform copolymerization distribution (i.e., uniform distribution with respect to the proportions of different component monomer units constituting the copolymer), and the resulting polymer has advantages in that it has high impact strength, high resistance to stress cracking, high transparency, excellent heat sealing properties at low temperatures, high blocking resistance, low tackiness, low extractability and the like.

2. Prior Art

In recent years, olefin polymerization methods have been proposed in which a solvent-soluble transition metal complex is used as a coordination polymerization catalyst. Representative examples of such transition metal complexes can be roughly classified into two groups. One of the two groups of transition metal complexes is a group of the so-called "metallocene compounds", that is, transition metal complexes each comprising a transition metal selected from Group 4A of the Periodic Table and, coordinated thereto, two ligands each having a cyclopentadienyl skeleton. Olefin polymerization methods using a metallocene compound as a catalyst are disclosed in, for example, Unexamined Japanese Patent Application Laid-Open Specification Nos. 58-19309 (corresponding to EP 069951), 60-35007 (corresponding to EP 129368), 61-130314 (corresponding to EP 0185918), 1-301706 (corresponding to EP 142143) and 2-41303 (corresponding to EP 351392). The other of the two groups of transition metal complexes is a group of the so-called "geometrically constrained compounds", that is, transition metal complexes each comprising a transition metal selected from those metals belonging to Group 4A of the Periodic Table and, coordinated thereto, a crosslinked product between a cyclopentadienyl skeleton-containing molecule and an electron donative molecule, such as amide, wherein the transition metal and the crosslinked product together constitute a transition metal-containing condensed ring. Olefin polymerization methods using a geometrically constrained compound as a catalyst are disclosed in, for example, Unexamined Japanese Patent Application Laid-Open Specification Nos. 3-163088 (corresponding to EP 416815), 5-194641 (corresponding to EP 502732), 5-230123 (corresponding to EP 514828) and 6-306121. It is known that, with respect to an olefin polymerization method in which any of these transition metal complexes is used as a catalyst and an aluminoxane or a cation generator is used as an auxiliary catalyst, advantages can be obtained in that an olefin homopolymer having a narrow molecular weight distribution can be produced and that a copolymerization can be performed with high copolymerizability, thus enabling the production of an olefin copolymer having uniform copolymerization distribution.

On the other hand, it has also been attempted to use, as an olefin polymerization catalyst, a third-type transition metal complex which contains a transition metal selected from Group 4A of the Periodic Table, but does not belong to any of the above-described two groups of transition metal complexes. However, such a third-type transition metal complex, which does not belong to any of the above-described two groups of transition metal complexes, has low polymerization activity which does not reach the practically acceptable level, as compared to the above-described two groups of transition metal complexes. As an olefin polymerization method using such a third-type transition metal complex, Unexamined Japanese Patent Application Laid-Open Specification No. 5-170820 discloses a polymerization method using, as a catalyst, a transition metal complex comprising a transition metal selected from Group 4A of the Periodic Table and, coordinated thereto, two ligands, namely, a ligand having a cyclopentadienyl skeleton and a chelating ligand having two coordinating oxygen atoms, which complex is represented by the formula $CpM(R^1COCR^2COR^3)_2X$ wherein M represents Zr or Hf, Cp represents a group having a cyclopentadienyl skeleton, each of $R^1$, $R^2$ and $R^3$ represents a hydrocarbon group, and X represents a halogen atom or $-SO_3CF_3$. As another olefin polymerization method using such a third-type transition metal complex, the Journal of Chemical Society, Chemical Communications [J. Chem. Soc., Chem. Commun., 18, 1415-1417 (1993)] discloses a polymerization method using, as a catalyst, a transition metal complex comprising a transition metal selected from those metals belonging to Group 4A of the Periodic Table and, coordinated thereto, two ligands, namely, a ligand having a cyclopentadienyl skeleton and a chelating ligand having two coordinating nitrogen atoms, which complex is represented by the formula $CpM[(NSiMe_3)_2CPh]X_2$ wherein Me represents $CH_3$, Ph represents $C_6H_5$, Cp represents $C_5H_5$ or $C_5Me_5$, X represents a chlorine atom or $-CH_2Ph$ and M represents Zr, Ti or Hf. The transition metal complex catalysts disclosed in these publications tend to have low activity.

Therefore, it has been desired to develop a new type olefin polymerization catalyst which does not belong to any of the above-described two groups of transition metal complexes, but has high polymerization activity.

SUMMARY OF THE INVENTION

The present inventors have made extensive and intensive studies with a view toward developing a novel transition metal complex compound having high olefin-polymerization activity. As a result, they have succeeded in obtaining a novel type of transition metal complex compound, and have found that the compound has high olefin-polymerization activity. The present invention has been completed, based on this finding.

Accordingly, it is a primary object of the present invention to provide an olefin polymerization catalyst comprising a novel type of transition metal complex compound.

It is another object of the present invention to provide an olefin polymerization catalyst which can be advantageously used for producing a homopolymer having a narrow molecular weight distribution and a copolymer having both a narrow molecular weight distribution and a uniform copolymerization distribution.

It is still another object of the present invention to provide an olefin polymerization catalyst which can be advantageously used for producing a polymer which has high impact strength, high resistance to stress cracking, high transparency, excellent heat-sealing properties at low temperatures, high blocking resistance, low tackiness, low extractability and the like.

It is a further object of the present invention to provide a method for polymerizing an olefin using the above-mentioned catalyst, which method can be used to produce a polymer having the above-mentioned excellent properties.

The foregoing and other objects, features and advantages of the present invention will become apparent to those skilled in the art from the following detailed description and appended claims.

The present invention provides a novel catalyst comprising a novel transition metal compound which exhibits high activity as an olefin polymerization catalyst. The transition metal compound of the catalyst of the present invention is characterized in that it has a specific monovalent, bidentate, anionic chelating ligand having two coordinating atoms each coordinated to the transition metal, one of which atoms is selected from O, S, Se and Te and the other of which atoms is selected from N, S, Se and Te. By using the olefin polymerization catalyst of the present invention, a homopolymer having a narrow molecular weight distribution or a copolymer having both a narrow molecular weight distribution and a uniform copolymerization distribution can be produced. By virtue of the above-mentioned performance of the catalyst of the present invention, the obtained polymer is advantageous in that it can exhibit high impact strength, high stress-cracking resistance, high transparency, excellent heat-sealing properties at low temperatures, high blocking resistance, low tackiness, low extractability and the like.

The olefin polymerization catalyst of the present invention is an olefin polymerization catalyst comprising a transition metal compound, the transition metal compound comprising a transition metal selected from the group consisting of Ti, Zr and Hf, and at least two ligands, wherein one ligand is a group having a cyclopentadienyl skeleton, and the remaining at least one ligand is a monovalent, bidentate, anionic chelating ligand having two coordinating atoms each coordinated to the transition metal, one of which atoms is selected from the group consisting of O, S, Se and Te, and the other of which atoms is selected from the group consisting of N, S, Se and Te, and wherein one of the remaining at least one ligand is optionally bonded to the group having a cyclopentadienyl skeleton through a bridging group.

The transition metal compound used in the present invention may be preferably employed in combination with an organoaluminumoxy compound as an auxiliary catalyst.

The transition metal compound used in the present invention may also be preferably employed in combination with a cation generator as an auxiliary catalyst.

DETAILED DESCRIPTION OF THE INVENTION

In one aspect of the present invention, there is provided an olefin polymerization catalyst comprising a transition metal compound, the transition metal compound comprising one transition metal selected from the group consisting of Ti, Zr and Hf, and at least two ligands, wherein one ligand is a group having a cyclopentadienyl skeleton, and the remaining at least one ligand is a monovalent, bidentate, anionic chelating ligand having two coordinating atoms each coordinated to the transition metal, one of which atoms is selected from the group consisting of O, S, Se and Te, and the other of which atoms is selected from the group consisting of N, S, Se and Te, and wherein one ligand of the remaining at least one ligand is optionally bonded to the group having a cyclopentadienyl skeleton through a bridging group.

In another aspect of the present invention, there is provided a method for polymerizing an olefin in the presence of the above-mentioned catalyst.

Hereinbelow, detailed explanation is made on the olefin polymerization catalyst of the present invention and the method for polymerizing an olefin using the catalyst.

The term "polymerization" used herein frequently means not only homopolymerization but also copolymerization, and the term "polymer" used herein frequently means not only a homopolymer but also a copolymer. The term "hydrocarbon group" used herein is intended to mean any of alkyl, cycloalkyl, alkenyl, alkynyl, arylalkyl, aryl and alkylaryl groups.

The olefin polymerization catalyst of the present invention comprises a transition metal compound comprising a transition metal selected from Ti, Zr and Hf, and a combination of a ligand having a cyclopentadienyl skeleton and one, two or three monovalent, bidentate, anionic chelating ligands each having two coordinating atoms, one of which atoms is selected from O, S, Se and Te and the other of which atoms is selected from N, S, Se and Te.

The term "ligand having a cyclopentadienyl skeleton" means an unsubstituted cyclopentadienyl group, a substituted cyclopentadienyl group or a condensed ring type cyclopentadienyl group in which two adjacent carbon atoms in the cyclopentadienyl ring are bonded to other carbon atoms to form a 4-, 5- or 6-membered ring. A substituted cyclopentadienyl group has from 1 to 5 substituents. Examples of such substituents include a $C_1$–$C_{20}$ hydrocarbon group and a silyl group substituted with at least one $C_1$–$C_{20}$ hydrocarbon group. Examples of condensed ring type cyclopentadienyl groups in which two adjacent carbon atoms in the cyclopentadienyl ring are bonded to other carbon atoms to form a 4-, 5- or 6-membered ring include an indenyl group, a tetrahydroindenyl group and a fluorenyl group. The condensed ring type cyclopentadienyl group may have a substituent, such as a $C_1$–$C_{20}$ hydrocarbon group or a silyl group substituted with a $C_1$–$C_{20}$ hydrocarbon group.

Examples of groups having a cyclopentadienyl skeleton include a cyclopentadienyl group, a methylcyclopentadienyl group, an ethylcyclopentadienyl group, an isopropylcyclopentadienyl group, an n-butylcyclopentadienyl group, an isobutylcyclopentadienyl group, a 1,2-dimethylcyclopentadienyl group, a 1,3-dimethylcyclopentadienyl group, a 1,2,4-trimethylcyclopentadienyl group, a 1,2,3-trimethylcyclopentadienyl group, a tetramethylcyclopentadienyl group, a pentamethylcyclopentadienyl group, a trimethylsilylcyclopentadienyl group, a trimethylsilyltetramethylcyclopentadienyl group, a (phenyldimethylsilyl)cyclopentadienyl group, a triphenylsilylcyclopentadienyl group, a 1,3-di(trimethylsilyl)cyclopentadienyl group, a cyclohexylcyclopentadienyl group, an allylcyclopentadienyl group, a benzylcyclopentadienyl group, a phenylcyclopentadienyl group, a tolylcyclopentadienyl group, an indenyl group, a 1-methylindenyl group, a 2-methylindenyl group, a 4-methylindenyl group, a 5-methylindenyl group, a 2,4-dimethylindenyl group, a 4,7-dimethylindenyl group, a 2-methyl,4-ethylindenyl group, a 2-methyl-4,6-diisopropylindenyl group, a naphthylindenyl group, a 4,5,6,7-tetrahydroindenyl group, a 2-methyltetrahydroindenyl group, a fluorenyl group, a 2-methylfluorenyl group, a 2,7-di-tert-butylfuruorenyl group and the like.

As an example of the transition metal compound of the polymerization catalyst of the present invention, there can be mentioned a compound represented by the following formula (1):

In formula (1) above:
Cp represents a group having a cyclopentadienyl skeleton, and M represents a central metal atom selected from Ti, Zr and Hf, which are transition metals belonging to Group 4A of the Periodic Table.
$L^1$ represents a bidentate chelating ligand represented by the following formula (2):

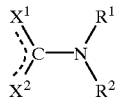

wherein each of $X^1$ and $X^2$ is a coordinating atom, wherein $X^1$ represents O, S, Se or Te, and $X^2$ represents S, Se or Te.

Specifically, bidentate chelating ligand $L^1$ is selected from a monothiocarbamato ligand ($X^1$=O, $X^2$=S), a dithiocarbamato ligand ($X^1$=S, $X^2$=S), a monoselenocarbamato ligand ($X^1$=O, $X^2$=Se), a thioselenocarbamato ligand ($X^1$=S, $X^2$=Se), a diselenocarbamato ligand ($X^1$=Se, $X^2$=Se), a monotellurbcarbamato ligand ($X^1$=O, $X^2$=Te), a thiotellurocarbamato ligand ($X^1$=S, $X^2$=Te) a selenotellurocarbamato ligand ($X^1$=Se, $X^2$=Te) and a ditellurocarbamato ligand ($X^1$=Te, $X^2$=Te). Any of the above-mentioned carbamato ligands is usable in the present invention; however, it is preferred that $L^1$ is a monothiocarbamato ligand or a dithiocarbamato ligand, and it is more preferred that $L^1$ is a dithiocarbamato ligand.

Each of $R^1$ and $R^2$ independently represents an unsubstituted or substituted $C_1$–$C_{20}$ hydrocarbon group, with the proviso that $R^1$ and $R^2$ are optionally bonded to each other, so that $R^1$, $R^2$ and N together form a heterocyclic ring containing a nitrogen atom.

As a hydrocarbon group usable as $R^1$ and $R^2$, there can be mentioned a $C_1$–$C_{20}$ alkyl group, such as a methyl group, an ethyl group, an n-propyl group, an isopropyl group or a tert-butyl group; a $C_5$–$C_{20}$ cycloalkyl group, such as a cyclopentyl group or a cyclohexyl group; a $C_6$–$C_{20}$ aryl group, such as a phenyl group, a tolyl group or a naphthyl group; a $C_7$–$C_{20}$ arylalkyl group, such as a benzyl group or a neophyl group; a $C_2$–$C_{20}$ alkenyl group, such as an allyl group, a 2-butenyl group or a 2,3-dimethyl-2-butenyl group; and a $C_2$–$C_{20}$ alkynyl group, such as a 2-butynyl group. Examples of heterocyclic rings formed by $R^1$, $R^2$ and N include a pyrrolidine ring, a pyrrole ring, a piperidine ring and the like. At least one hydrogen atom in the above-mentioned groups and rings may be replaced by a substituent selected from a halogen atom, a $C_1$–$C_{20}$ alkoxy group, a $C_6$–$C_{20}$ aryloxy group, a $C_1$–$C_{20}$ alkylsilyl group and a $C_6$–$C_{20}$ arylsilyl group.

$R^1$ and $R^2$ may be the same or different.

Y in formula (1) represents a halogen atom, a $C_1$–$C_{20}$ hydrocarbon group, a $C_1$–$C_{20}$ alkoxy group, a $C_1$–$C_{20}$ thioalkoxy group, a $C_6$–$C_{20}$ aryloxy group, a $C_6$–$C_{20}$ thioaryloxy group, an amino group substituted with a $C_1$–$C_{20}$ hydrocarbon group, or a phosphino group substituted with a $C_1$–$C_{20}$ hydrocarbon group. Specific examples of Y include a halogen atom, such as a fluorine, chlorine, bromine or iodine atom, a $C_1$–$C_{20}$ alkyl group, such as a methyl group, an ethyl group, an n-propyl group, an isopropyl group or a tert-butyl group; a $C_5$–$C_{20}$ cycloalkyl group, such as a cyclopentyl group or a cyclohexyl group; a $C_6$–$C_{20}$ unsubstituted or substituted aryl group, such as a phenyl group, a tolyl group or a methoxyphenyl group; a $C_7$–$C_{20}$ arylalkyl group, such as a benzyl group or a neophyl group; a $C_2$–$C_{20}$ alkenyl group, such as an allyl group or a 2-butenyl group; a $C_1$–$C_{20}$ alkoxy group, such as a methoxy group, an ethoxy group or an n-butoxy group; a $C_1$–$C_{20}$ thioalkoxy group, such as a thioisopropoxy group or a thiobenzylalkoxy group; a $C_6$–$C_{20}$ aryloxy group, such as a phenoxy group or a p-tolyloxy group; a $C_6$–$C_{20}$ thioaryloxy group, such as a thiophenoxy group; an amino group substituted with a $C_1$–$C_{20}$ hydrocarbon group, such as a di(n-propyl)amino group or a dibenzylamino group; and a phosphino group substituted with a $C_1$–$C_{20}$ hydrocarbon group, such as a diisoamylphosphino group or diphenylphosphino group.

m in formula (1) represents 1, 2 or 3.

Specific examples of transition metal compounds represented by formula (1) include those which are mentioned below. However, examples of transition metal compounds represented by formula (1) are not limited to those compounds.

Specific examples of transition metal compounds represented by formula (1) include:
(cyclopentadienyl)tris(diethyldithiocarbamato) zirconium,
(cyclopentadienyl)tris(dimethyldithiocarbamato) zirconium, (n-butylcyclopentadienyl)tris (dimethyldithiocarbamato)zirconium,
(1,3-dimethylcyclopentadienyl)tris (dimethyldithiocarbamato)zirconium,
(pentamethylcyclopentadienyl)tris (dimethyldithiocarbamato)zirconium,
(indenyl)tris(dimethyldithiocarbamato)zirconium,
(cyclopentadienyl)tris(methylethyldithiocarbamato) zirconium,
(methylcyclopentadienyl)tris(di-n-propyldithiocarbamato)zirconium,
(ethylcyclopentadienyl)tris(di-n-butyldithiocarbamato) zirconium,
(n-propylcyclopentadienyl)tris (dicyclohexyldithiocarbamato)zirconium,
(n-butylcyclopentadienyl)tris (ethylcyclohexyldithiocarbamato)zirconium,
(1,3-dimethylcyclopentadienyl)tris (phenyltolyldithiocarbamato)zirconium,
(1,2,4-trimethylcyclopentadienyl)tris (dibenzyldithiocarbamato)zirconium,
(tetramethylcyclopentadienyl)tris (diallyldithiocarbamato)zirconium,
(pentamethylcyclopentadienyl)tris (diisopropyldithiocarbamato)zirconium,
(trimethylsilyltetramethylcyclopentadienyl)tris (pyrrolyldithiocarbamato)zirconium,
(indenyl)tris(di-n-butyldiselenocarbamato)zirconium,
(tetrahydroindenyl)tris(dimethylditellurocarbamato) zirconium, (fluorenyl)tris(dimethylmonothiocarbamato)zirconium,
(cyclopentadienyl)bis(dimethyldithiocarbamato)
chlorozirconium,
(n-butylcyclopentadienyl)bis(diethyldithiocarbamato)
chlorozirconium,
(1,3-dimethylcyclopentadienyl)(diethyldithiocarbamato)
dimethylzirconium,
(pentamethylcyclopentadienyl)(diethyldithiocarbamato)
diphenylzirconium,
(trimethylsilyltetramethylcyclopentadienyl)
(pyrrolidinodithiocarbamato)diphenoxyzirconium,
(indenyl)bis(dimethyldithiocarbamato)bromozirconium,
(heptamethylindenyl)bis(diphenyldithiocarbamato)
fluorozirconium,
(2,7-di-tert-butylfluorenyl)
(dimethylmonoselenocarbamato)diaminozirconium,
(pentamethylcyclopentadienyl)
(dimethylmonotellurocarbamato)diphenylzirconium, and
(2,4,6-trimethylindenyl)(diethylselenotellurocarbamato)
bis(diphenylphosphino)zirconium.

Specific examples of transition metal compounds represented by formula (1) also include those transition metal compounds which are obtained by replacing the zirconium atom of the above-mentioned zirconium compounds of formula (1) by a titanium or a hafnium atom.

Transition metal compounds represented by formula (1): $CpML^1_mY_{3-m}$ can be produced by several methods. For example, a transition metal compound represented by formula (1) can be produced from a transition metal compound represented by the following formula (13) (containing a metal belonging to Group 4A of the Periodic Table) and a compound represented by the following formula (14) in accordance with the following reaction formula (15).

$$CpMY_3 \quad (13)$$

wherein M, Cp and Y are as defined for formula (1) above;

$$Z^1L^1 \quad (14)$$

wherein $L^1$ is as defined for formula (1) above and represented by formula (2) above, and $Z^1$ represents an alkali metal, such as Li, Na or K, or Ag; and $$CpMY_3 + mZ^1L^1 \rightarrow CpML^1_mY_{3-m} + mZ^1Y \quad (15).$$

In the reaction of formula (15), from the viewpoint of efficiency, it is preferred:
that, when m=1, the compound of formula (14) above is used in an equimolar amount relative to the molar amount of the compound of formula (13),
that, when m=2, the compound of formula (14) above is used in a molar amount two times the molar amount of the compound of formula (13), and
that, when m=3, the compound of formula (14) above is used in a molar amount three times the molar amount of the compound of formula (13).

As an example of reactions according to reaction formula (15) above, production of (pentamethylcyclopentadienyl)tris (dimethyldithiocarbamato)zirconium has been reported in Inorganic Chemistry, 26, 3701–3703 (1987). Similar compounds can also be produced substantially in accordance with the above-mentioned reaction method.

A transition metal compound of formula (1) above in which m=3, i.e., a transition metal compound represented by the formula: $CpML^1_3$, can be efficiently produced from a metallocene compound represented by the following formula (16) and a compound of formula (14) above by a reaction represented by the following reaction formula (17).

$$Cp_2MY_2 \quad (16)$$

wherein each of M, Cp and Y is as defined above for formula (1); and

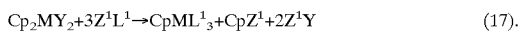

$$Cp_2MY_2 + 3Z^1L^1 \rightarrow CpML^1_3 + CpZ^1 + 2Z^1Y \quad (17).$$

As examples of reactions according to reaction formula (17), production of (cyclopentadienyl)tris (dimethyldithiocarbamato)zirconium is reported in J. Am. Chem. Soc., 98, 6932–6938 (1976), and production of (cyclopentadienyl)tris(dimethyldithiocarbamato)titanium, (cyclopentadienyl)tris(dimethyldithiocarbamato)zirconium and (cyclopentadienyl)tris(dimethyldithiocarbamato) hafnium is reported in Inorganic Chemistry, 23, 1079–1089 (1984). Similar compounds can also be produced substantially in accordance with the above-mentioned reaction method.

With respect to the conditions for effecting each of the reactions of reaction formulae (15) and (17), the reaction temperature is generally in the range of from −20 to 100° C., preferably from 0 to 80° C. and the reaction time is generally in the range of from 0.1 to 70 hours, preferably from 0.5 to 50 hours. As examples of solvents usable in the reactions, there can be mentioned aliphatic hydrocarbons, such as hexane and decane; ethers, such as diethyl ether and tetrahydrofuran; aromatic hydrocarbons, such as benzene, toluene and xylene; halogenated hydrocarbons, such as carbon tetrachloride, chloroform and methylene chloride. Of these solvents, halogenated hydrocarbons are preferred. These reaction solvents are generally used in an amount 10 to 500 times by weight the amount of compound (13) above or compound (16) above.

By the above-mentioned production methods, the desired transition metal compound can be produced. The thus produced transition metal compound can be purified by a method in which a reaction mixture containing the produced transition metal compound is subjected to filtration to obtain a filtrate; the filtrate is subjected to concentration under reduced pressure to isolate the transition metal compound; the isolated transition metal compound is subjected to recrystallization; and the recrystallized transition metal compound is dried under reduced pressure.

As another example of the transition metal compound of the catalyst of the present invention, there can be mentioned a compound represented by the following formula (3):

$$CpML^2_mY_{3-m} \quad (3).$$

In formula (3) above:

Cp represents a group having a cyclopentadienyl skeleton,

M represents a transition metal which is a central metal atom and is selected from Ti, Zr and Hf, and $L^2$ represents a bidentate chelating ligand represented by the following formula (4):

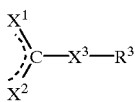

(4)

wherein each of $X^1$ and $X^2$ is a coordinating atom, wherein $X^1$ represents O, S, Se or Te, $X^2$ represents S, Se or Te, and $X^3$ represents O, S, Se or Te.

That is, examples of bidentate chelating ligand $L^2$ include a monothiocarbonato ligand ($X^1$=O, $X^2$=S, $X^3$=O), a thiomonothiocarbonato ligand ($X^1$=O, $X^2$=S, $X^3$=S), a selenomonothiocarbonato ligand ($X^1$=O, $X^2$=S, $X^3$=Se), a telluromonothiocarbonato ligand ($X^1$=O, $X^2$=S, $X^3$=Te), a monoselenocarbonato ligand ($X^1$=O, $X^2$=Se, $X^3$=O), a thiomonoselenocarbonato ligand ($X^1$=O, $X^2$=Se, $X^3$=S), a selenomonoselenocarbonato ligand ($X^1$=O, $X^2$=Se, $X^3$=Se), a telluromonoselenocarbonato ligand ($X^1$=O, $X^2$=Se, $X^3$=Te), a monotellurocarbonato ligand ($X^1$=O, $X^2$=Te, $X^3$=O), a thiomonotellurocarbonato ligand ($X^1$=O, $X^2$=Te, $X^3$=S), a selenomonotellurocarbonato ligand ($X^1$=O, $X^2$=Te, $X^3$=Se), a telluromonotellurocarbonato ligand ($X^1$=O, $X^2$=Te, $X^3$=Te), a dithiocarbonato ligand ($X^1$=S, $X^2$=S, $X^3$=O), a trithiocarbonato ligand ($X^1$=S, $X^2$=S, $X^3$=S), a selenodithiocarbonato ligand ($X^1$=S, $X^2$=S, $X^3$=Se), a tellurodithiocarbonato ligand ($X^1$=S, $X^2$=S, $X^3$=Te), a thioselenocarbonato ligand ($X^1$=S, $X^2$=Se, $X^3$=O), a dithioselenocarbonato ligand ($X^1$=S, $X^2$=Se, $X^3$=S), a selenothioselenocarbonato ligand ($X^1$=S, $X^2$=Se, $X^3$=Se), a tellurothioselenocarbonato ligand ($X^1$=S, $X^2$=Se, $X^3$=Te), a thiotellurocarbonato ligand ($X^1$=S, $X^2$=Te, $X^3$=O), a thiothiotellurocarbonato ligand ($X^1$=S, $X^2$=Te, $X^3$=S), a selenothiotellurocarbonato ligand ($X^1$=S, $X^2$=Te, $X^3$=Se), a tellurothiotellurocarbonato ligand ($X^1$=S, $X^2$=Te, $X^3$=Te), a diselenocarbonato ligand ($X^1$=Se, $X^2$=Se, $X^3$=O), a thiodiselenocarbonato ligand ($^1$=Se, $X^2$=Se, $X^3$=S), a triselenocarbonato ligand ($X^1$=Se, $X^2$=Se, $X^3$=Se), a tellurodiselenocarbonato ligand ($X^1$=Se, $X^2$=Se, $X^3$=Te), a selenotellurocarbonato ligand ($X^1$=Se, $X^2$=Te, $X^3$=O), a thioselenotellurocarbonato ligand ($X^1$=Se, $X^2$=Te, $X^3$=S), a diselenotellurocarbonato ligand ($X^1$=Se, $X^2$=Te, $X^3$=Se), a telluroselenotellurocarbonato ligand ($X^1$=Se, $X^2$=Te, $X^3$=Te), a ditellurocarbonato ligand ($X^1$=Te, $X^2$=Te, $X^3$=O), a thioditellurocarbonato ligand ($X^1$=Te, $X^2$=Te, $X^3$=S), a selenoditellurocarbonato ligand ($X^1$=Te, $X^2$=Te, $X^3$=Se), a tritellurocarbonato ligand ($X^1$=Te, $X^2$=Te, $X^3$=Te) and the like.

In formula (4) above, $R^3$ represents an unsubstituted or substituted $C_1$–$C_{20}$ hydrocarbon group. Examples of $R^3$ include a $C_1$–$C_{20}$ alkyl group, such as a methyl group, an ethyl group, an n-propyl group, an iso-propyl group or a tert-butyl group; a $C_5$–$C_{20}$ cycloalkyl group, such as a cyclopentyl group or a cyclohexyl group; a $C_6$–$C_{20}$ aryl group, such as a phenyl group, a tolyl group or a naphthyl group; a $C_7$–$C_{20}$ arylalkyl group, such as a benzyl group or a neophyl group; a $C_2$–$C_{20}$ alkenyl group, such as an allyl group or a 2-butenyl group; and a $C_2$–$C_{20}$ alkynyl group, such as a 2-butynyl group. At least one hydrogen atom of each of these hydrocarbon groups may be replaced by a substituent atom or group selected from a halogen atom, a $C_1$–$C_{20}$ alkoxy group, a $C_1$–$C_{20}$ aryloxy group, a $C_1$–$C_{20}$ alkylsilyl and a $C_6$–$C_{20}$ arylsilyl group.

Y in formula (3) above represents a halogen atom, a $C_1$–$C_{20}$ hydrocarbon group, a $C_1$–$C_{20}$ alkoxy group, a $C_1$–$C_{20}$ thioalkoxy group, a $C_6$–$C_{20}$ aryloxy group, a $C_6$–$C_{20}$ thioaryloxy group, an amino group substituted with a $C_1$–$C_{20}$ hydrocarbon group, or a phosphino group substituted with a $C_1$–$C_{20}$ hydrocarbon group.

Specific examples of Y include a halogen atom, such as a fluorine, a chlorine, a bromine or an iodine atom; a $C_1$–$C_{20}$ alkyl group, such as a methyl group, an ethyl group, an n-propyl group, an isopropyl group or a tert-butyl group; a $C_5$–$C_{20}$ cycloalkyl group, such as a cyclopentyl group or a cyclohexyl group; a $C_6$–$C_{20}$ unsubstituted or substituted aryl group, such as a phenyl group, a tolyl group or a methoxyphenyl group; a $C_7$–$C_{20}$ arylalkyl group, such as a benzyl group or a neophyl group; a $C_2$–$C_{20}$ alkenyl group, such as an allyl group or a 2-butenyl group; a $C_1$–$C_{20}$ alkoxy group, such as a methoxy group, an ethoxy group or an n-butoxy group; a $C_1$–$C_{20}$ thioalkoxy group, such as a thioisopropoxy group or a thiobenzylalkoxy group; a $C_6$–$C_{20}$ aryloxy group, such as a phenoxy group or a p-tolyloxy group; a $C_6$–$C_{20}$ thioaryloxy group, such as a thiophenoxy group; an amino group substituted with a $C_1$–$C_{20}$ hydrocarbon group, such as a di(n-propyl)amino group or a dibenzylamino group; and a phosphino group substituted with a $C_1$–$C_{20}$ hydrocarbon group, such as a diisoamylphosphino group or diphenylphosphino group.

m in formula (3) represents 1, 2 or 3.

Specific examples of transition metal compounds represented by formula (3) include those which are mentioned below. However, examples of transition metal compounds represented by formula (3) are not limited to those compounds.

Specific examples of transition metal compounds represented by formula (3) include:

(cyclopentadienyl)tris(O-methyldithiocarbonato)zirconium, (cyclopentadienyl)tris(O-ethyldithiocarbonato)zirconium, (1,3-dimethylcyclopentadienyl)tris(O-ethyldithiocarbonato)zirconium, (n-butylcyclopentadienyl)tris(O-ethyldithiocarbonato)zirconium, (pentamethylcyclopentadienyl)tris(O-ethyldithiocarbonato)zirconium, (indenyl)tris(O-ethyldithiocarbonato)zirconium, (cyclopentadienyl)tris(S-methyltrithiocarbonato)zirconium, (methylcyclopentadienyl)tris(O-ethyldithiocarbonato)zirconium, (methylcyclopentadienyl)tris(S-ethyltrithiocarbonato)zirconium, (ethylcyclopentadienyl)tris(O-isopropyldithiocarbonato)zirconium, (n-propylcyclopentadienyl)tris(S-isopropyltrithiocarbonato)zirconium, (n-butylcyclopentadienyl)tris(O-n-butyldithiocarbonato)zirconium, (n-butylcyclopentadienyl)tris(S-n-butyltrithiocarbonato)zirconium, (1,3-dimethylcyclopentadienyl)tris(O-iso-amyldithiocarbonato)zirconium, (1,2,4-trimethylcyclopentadienyl)tris(S-iso-amyltrithiocarbonato)zirconium, (tetramethylcyclopentadienyl)tris(O-cyclohexyldithiocarbonato)zirconium, (pentamethylcyclopentadienyl)tris(S-cyclohexyltrithiocarbonato)zirconium,
(pentamethylcyclopentadienyl)tris(O-tolyldithiocarbonato)zirconium,
(trimethylsilyltetramethylcyclopentadienyl)tris(S-tolyltrithiocarbonato)zirconium,
(trimethylsilylcyclopentadienyl)tris(O-benzyldithiocarbonato)zirconium,
(cyclopentadienyl)tris(Se-ethyltriselenocarbonato)zirconium,
(indenyl)tris(O-benzylmonoselenocarbonato)zirconium,
(indenyl)tris(O-3-methyl-2-pentene-1-yldiselenocarbonato)zirconium,
(indenyl)tris(Te-methyltritellurocarbonato)zirconium,
(tetrahydroindenyl)tris(O-methylmonotellurocarbonato)zirconium,
(fluorenyl)tris(O-ethylditellurocarbonato)zirconium,
(fluorenyl)tris(O-benzylselenotellurocarbonato)zirconium,
(n-butylcyclopentadienyl)(O-ethyldithiocarbonato)dichlorozirconium,
(1,3-dimethylcyclopentadienyl)(O-ethyldithiocarbonato)dibromozirconium,
(1,2,4-trimethylcyclopentadienyl)(O-n-propyldithiocarbonato)dimethylzirconium,
(pentamethylcyclopentadienyl)(O-ethyldithiocarbonato)diphenylzirconium,
(indenyl)(O-isobutyldithiocarbonato)diethoxyzirconium,
(tetrahydroindenyl)(O-sec-butyldithiocarbonato)diaminozirconium,
(fluorenyl)bis(O-ethyldithiocarbonato)chlorozirconium,
(cyclopentadienyl)bis(O-ethyldithiocarbonato)isopropylzirconium,
(n-butylcyclopentadienyl)bis(O-ethyldithiocarbonato)benzylzirconium,
(pentamethylcyclopentadienyl)bis(O-cyclohexyldiselenocarbonato)methoxyzirconium, and
(pentamethylcyclopentadienyl)bis(O-iso-amylditellurocarbonato)phosphinozirconium.

Examples of transition metal compounds represented by formula (3) above also include those which are obtained by replacing the zirconium in the above-mentioned zirconium compounds by titanium or hafnium.

Transition metal compounds of formula (3) above: $CpML^2_mY_{3-m}$ can be produced by several methods. For example, a transition metal compound of formula (3) above can be produced from a transition metal compound represented by the following formula (13) and a compound represented by the following formula (18) by a reaction represented by the following reaction formula (19).

$$CpMY_3 \quad (13)$$

wherein each of M, Cp and Y is as defined for formula (3) above;

$$Z^1L^2 \quad (18)$$

wherein $L^2$ is as defined for formula (3) above and is represented by formula (4), and $Z^1$ represents an alkali metal, such as Li, Na or K, or Ag; and $$CpMY_3 + m\ Z^1L^2 \rightarrow CpML^2_mY_{3-m} + m\ Z^1Y \quad (19).$$

In the reaction of formula (19) above, from the viewpoint of efficiency, it is preferred: that, when m=1, the compound of formula (18) above is used in an equimolar amount relative to the molar amount of the compound of formula (13), that, when m=2, the compound of formula (18) above is used in a molar amount two times the molar amount of the compound of formula (13), and that, when m=3, the compound of formula (18) above is used in a molar amount three times the molar amount of the compound of formula (13).

A transition metal compound of formula (3) above in which m=3, i.e., a transition metal compound represented by the formula: $CpML^2_3$, can be efficiently produced from a metallocene compound represented by the following formula (16) and a compound of formula (18) above by a reaction represented by the following reaction formula (20).

$$Cp_2MY_2 \quad (16)$$

wherein each of M, Cp and Y is as defined for formula (3) above; and $$Cp_2MY_2 + 3\ Z^1L^2 \rightarrow CpML^2_3 + CpZ^1 + 2\ Z^1Y \quad (20).$$

With respect to the conditions for effecting each of the reactions of reaction formulae (19) and (20), the reaction temperature is generally in the range of from −20 to 100° C., preferably from 0 to 80° C., and the reaction time is generally in the range of from 0.1 to 70 hours, preferably from 0.5 to 50 hours. As examples of reaction solvents usable in the reactions, there can be mentioned aliphatic hydrocarbons, such as hexane and decane; ethers, such as diethyl ether and tetrahydrofuran; aromatic hydrocarbons, such as benzene, toluene and xylene; and halogenated hydrocarbons, such as carbon tetrachloride, chloroform and methylene chloride. Of these solvents, halogenated hydrocarbons are preferred. These reaction solvents are generally used in an amount 10 to 500 times by weight the amount of the compound of formula (13) above or the compound of formula (16) above.

By the above-mentioned production methods, a desired transition metal compound can be produced. The thus produced transition metal compound can be purified by a method in which a reaction mixture containing the produced transition metal compound is subjected to filtration to obtain a filtrate; the filtrate is subjected to concentration under reduced pressure to isolate the transition metal compound; the isolated transition metal compound is subjected to recrystallization; and the recrystallized transition metal compound is dried under reduced pressure.

As still another example of the transition metal compound of the present invention, there can be mentioned a compound, containing a bidentate chelating ligand $L^3$, which compound is represented by the following formula (5) or (6):

$$CpM(L^3\text{-}R^4)_mY_{3-m} \quad (5)$$

$$(Cq\text{-}A\text{-}L^3)M(L^3\text{-}R^4)_nY_{2-n} \quad (6).$$

In formulae (5) and (6) above:

Cp represents a group having a cyclopentadienyl skeleton,

Cq represents a group, having a cyclopentadienyl skeleton, covalently bonded to A, M represents a transition metal which is a central metal atom and is Ti, Zr or Hf.

$L^3$ represents a bidentate chelating functional group represented by the following formula (7):

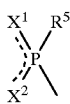

(7)

wherein each of $X^1$ and $X^2$ is a coordinating atom, wherein $X^1$ represents O, S, Se or Te, and $X^2$ represents S, Se or Te, and $R^5$ is represented by $X^5R^7$ or $R^7$, wherein $X^5$ represents O, S, Se or Te, and $R^7$ represents an unsubstituted or substituted $C_1$–$C_{20}$ hydrocarbon group.

Examples of $R^7$ include a $C_1$–$C_{20}$ alkyl group, such as a methyl group, an ethyl group, an n-propyl group, an isopropyl group or a tert-butyl group; a $C_5$–$C_{20}$ cycloalkyl group, such as a cyclopentyl group or a cyclohexyl group; a $C_6$–$C_{20}$ aryl group, such as a phenyl group, a tolyl group or a naphthyl group; a $C_7$–$C_{20}$ arylalkyl group, such as a benzyl group or a neophyl group; a $C_2$–$C_{20}$ alkenyl group, such as an allyl group or a 2-butenyl group; and a $C_2$–$C_{20}$ alkynyl group, such as a 2-butynyl group. At least one hydrogen atom of each of these hydrocarbon groups as $R^7$ may be replaced by a substituent group selected from a halogen atom, a $C_1$–$C_{20}$ alkoxy group, a $C_6$–$C_{20}$ aryloxy group, a $C_1$–$C_{20}$ alkylsilyl group and a $C_6$–$C_{20}$ arylsilyl group.

In formulae (5) and (6) above, ($L^3$-$R^4$) represents a bidentate chelating ligand represented by the following formula (21):

(21)

wherein $X^1$, $X^2$ and $R^5$ are as defined for formula (7) above.

In formulae (5) and (6), $R^4$ is represented by $X^4R^6$ or $R^6$, wherein $X^4$ represents O, S, Se or Te, and $R^6$ represents an unsubstituted or substituted $C_1$–$C_{20}$ hydrocarbon group. At least one hydrogen atom of a hydrocarbon group as $R^6$ may be replaced by a substituent atom or group selected from a halogen atom, a $C_1$–$C_{20}$ alkoxy group, a $C_6$–$C_{20}$ aryloxy group, a $C_1$–$C_{20}$ alkylsilyl group and a $C_6$–$C_{20}$ arylsilyl group.

In formula (6) above, (Cq-A-$L^3$) represents a ligand in which the bidentate chelating functional group $L^3$ and the group Cq having a cyclopentadienyl skeleton are linked to each other through bridging group A.

In formula (6), A represents a bridging group or atom forming the bridging by covalent bonding, and is selected from the group consisting of —$CR^8_2$—, —$CR^8_2CR^8_2$—, —$CR^8$=$CR^8$—, —$SiR^8_2$—, —$SiR^8_2SiR^8_2$—, —$GeR^8_2$—, —$BR^8$—, —$AlR^8$—, —$PR^8$—, —$P(O)R^8_2$—, —$NR^8$—, —$SO_2$—, —SO—, —O—, —S—, —Ge—, —Sn—, and —CO—, wherein $R^8$ represents a hydrogen atom, a halogen atom, or an unsubstituted or replaced $C_1$–$C_{20}$ hydrocarbon group. At least one hydrogen atom of a hydrocarbon group as $R^8$ may be replaced by a substituent atom or group selected from a halogen atom, a $C_1$–$C_{20}$ alkoxy group, a $C_6$–$C_{20}$ aryloxy group, a $C_1$–$C_{20}$ alkylsilyl group and a $C_6$–$C_{20}$ arylsilyl group.

In formulae (5) and (6) above, Y represents a halogen atom, a $C_1$–$C_{20}$ hydrocarbon group, a $C_1$–$C_{20}$ alkoxy group, a $C_1$–$C_{20}$ thioalkoxy group, a $C_6$–$C_{20}$ aryloxy group, a $C_6$–$C_{20}$ thioaryloxy group, an amino group substituted with a $C_1$–$C_{20}$ hydrocarbon group, or a phosphino group substituted with a $C_1$–$C_{20}$ hydrocarbon group.

Examples of Y include a halogen atom, such as a fluorine, a chlorine, a bromine or an iodine atom; a $C_1$–$C_{20}$ alkyl group, such as a methyl group, an ethyl group, an n-propyl group, an isopropyl group or a tertbutyl group; a $C_5$–$C_{20}$ cycloalkyl group, such as a cyclopentyl group or a cyclohexyl group; a $C_6$–$C_{20}$ unsubstituted or substituted aryl group, such as a phenyl group, a tolyl group or a methoxyphenyl group; a $C_7$–$C_{20}$ arylalkyl group, such as a benzyl group or a neophyl group; a $C_2$–$C_{20}$ alkenyl group, such as an allyl group or a 2-butenyl group; a $C_1$–$C_{20}$ alkoxy group, such as a methoxy group, an ethoxy group or an n-butoxy group; a $C_1$–$C_{20}$ thioalkoxy group, such as a thioisopropoxy group or a thiobenzylalkoxy group; a $C_6$–$C_{20}$ aryloxy group, such as a phenoxy group or a p-tolyloxy group; a $C_6$–$C_{20}$ thioaryloxy group, such as a thiophenoxy group; an amino group substituted with a $C_1$–$C_{20}$ hydrocarbon group, such as a di-n-propylamino group or a dibenzylamino group; and a phosphino group substituted with a $C_1$–$C_{20}$ hydrocarbon group, such as a diisoamylphosphino group or a diphenylphosphino group.

In formulae (5) and (6) above, m represents 1, 2 or 3, and n represents 0, 1 or 2.

Specific examples of transition metal compounds represented by formula (5) or (6) include those which are mentioned below. However, examples of transition metal compounds represented by formula (5) or (6) are not limited to those compounds.

Specific examples of transition metal compounds represented by formula (5) or (6) include:

(cyclopentadienyl)tris(O,O'-dimethyldithiophosphato) zirconium, (cyclopentadienyl)tris(O,O'-diethyldithiophosphato) zirconium, (n-butylcyclopentadienyl)tris(O,O'-diethyldithiophosphato) zirconium, (1,3-dimethylcyclopentadienyl)tris(O,O'-diethyldithiophosphato)zirconium, (pentamethylcyclopentadienyl)tris(O,O'-diethyldithiophosphato)zirconium, (indenyl)tris(O,O'-diethyldithiophosphato)zirconium, (cyclopentadienyl)tris(S,S'-dimethyltetrathiophosphato) zirconium, (methylcyclopentadienyl)tris(O,O'-diethyldithiophosphato)zirconium, (ethylcyclopentadienyl)tris(O,O'-diisopropyldithiophosphato)zirconium, (n-propylcyclopentadienyl)tris(O,O'-dicyclohexyldithiophosphato)zirconium, (n-butylcyclopentadienyl)tris(O,O'-diphenyldithiophosphato)zirconium, (1,3-dimethylcyclopentadienyl)tris(O,O'-dibenzyldithiophosphato)zirconium, (1,3,4-trimethylcyclopentadienyl)tris(O-ethyl-O'-phenyldithiophosphato)zirconium, (tetramethylcyclopentadienyl)tris(S,S'-dicyclohexyltetrathiophosphato)zirconium, (pentamethylcyclopentadienyl)tris(O,O'-dimethyldiselenophosphato)zirconium, (pentamethylcyclopentadienyl)tris(O,O'-diphenylditellurophosphato)zirconium, (trimethylsilylcyclopentadienyl)tris(O,O'-dibenzylmonothiophosphato)zirconium,
(trimethylsilyltetramethylcyclopentadienyl)tris(S,S'-dibenzyltetrathiophosphato)zirconium,
(indenyl)tris(O,O'-diallylmonotellurophosphato)zirconium,
(tetrahydroindenyl)tris(O,O'-dicyclohexylmonoselenophosphato)zirconium,
(cyclopentadienyl)tris(diethyldithiophosphinato)zirconium,
(1,2,4-trimethylcyclopentadienyl)tris(diphenyldithiophosphinato)zirconium,
(pentamethylcyclopentadienyl)tris(ethylphenyldithiophosphinato)zirconium,
(cyclopentadienyl)bis(O,O'-diethyldithiophosphato)chlorozirconium,
(methylcyclopentadienyl)bis(O,O'-di-n-propyldithiophosphato)bromozirconium,
(2,7-di-tert-butylfluorenyl)bis(O,O'-diethyldithiophosphato)chlorozirconium,
(cyclopentadienyl)bis(O,O'-diethyldithiophosphato)benzylzirconium,
(pentamethylcyclopentadienyl)bis(S,S'-dicyclohexyltetrathiophosphato)isobutylzirconium,
(pentamethylcyclopentadienyl)bis(O,O'-diisoamylmonothiophosphato)phenoxyzirconium,
(1,2,4-trimethylcyclopentadienyl)(O,O'-di-n-butyldithiophosphato)dibromozirconium,
(1,3-dimethylmethylcyclopentadienyl)(O,O'-dicyclohexylmonothiophosphato)dibenzylzirconium,
(n-butylcyclopentadienyl)(O,O'-diisobutyldiselenophosphato)diphenylzirconium,
(indenyl)(O,O'-diphenylditellurophosphato)dichlorozirconium,
(cyclopentadienyl)dimethylsilylene(O-phenyldithiophosphonato)dichlorozirconium,
(tetramethylcyclopentadienyl)dimethylsilylene(O-2,4,6-trimethylphenylphosphonato)dichlorozirconium,
(3,4-dimethylcyclopentadienyl)dimethylsilylene(O-ethyldithiophosphonato)dichlorozirconium,
(3-methylcyclopentadienyl)tetraethyldisilylene(O-3,5-xylyldithiophosphonato)dichlorozirconium,
(cyclopentadienyl)isopropylene(O-p-tolyldithiophosphonato)dichlorozirconium,
(tetramethylcyclopentadienyl)ethylene(phenyldithiophosphinato)dimethoxyzirconium,
(indenyl)dimethylsilylene(O-phenyldithiophosphonato)bis(O,O'-diphenyldithiophosphato)zirconium,
(tetrahydroindenyl)isopropylene(O-n-butyldithiophosphonato)dichlorozirconium, and
(fluorenyl)methylborene(O-ethylphosphonato)dichlorozirconium.

Examples of transition metal compounds represented by formula (5) or (6) above also include those which are obtained by replacing the zirconium in the above-mentioned zirconium compounds by titanium or hafnium.

Transition metal compounds of formula (5): $CpM(L^3-R^4)_m Y_{3-m}$ can be produced by several methods.

For example, a transition metal compound of formula (5) can be produced from a transition metal compound represented by the following formula (13) and a compound represented by the following formula (55) by a reaction represented by the following reaction formula (22).

$$CpMY_3 \qquad (13)$$

wherein each of M, Cp and Y is as defined for formula (5) above;

$$Z^2 (L^3-R^4) \qquad (55)$$

wherein $L^3$ is as defined for formula (5) above and is represented by formula (7) above, and $Z^2$ represents an alkali metal, such as Li, Na or K, or one member selected from $NH_4$ and Ag; and $$CpMY_3 + m\ Z^2(L^3-R^4) \rightarrow CpM(L^3-R^4)_m Y_{3-m} + m\ Z^2Y \qquad (22).$$

In the reaction of formula (22), from the viewpoint of efficiency, it is preferred: that, when m=1, the compound of formula (55) above is used in an equimolar amount relative to the molar amount of the compound of formula (13), that, when m=2, the compound of formula (55) above is used in a molar amount two times the molar amount of the compound of formula (13), and that, when m=3, the compound of formula (55) above is used in a molar amount three times the molar amount of the compound of formula (13).

A transition metal compound of formula (5) above in which m=3, i.e., a transition metal compound represented by the formula: $CpM(L^3-R^4)_3$, can be efficiently produced from a metallocene compound represented by the following formula (16) and a compound of formula (55) above by a reaction represented by the following reaction formula (23).

$$Cp_2MY_2 \qquad (16)$$

wherein each of M, Cp and Y is as defined for formula (5) above; and $$Cp_2MY_2 + 3\ Z^2(L^3-R^4) \rightarrow CpM(L^3-R^4)_3 + CpZ^2 + 2\ Z^2Y \qquad (23).$$

With respect to the conditions for effecting each of the reactions of reaction formulae (22) and (20), the reaction temperature is generally in the range of from −20 to 100° C., preferably from 0 to 80° C., and the reaction time is generally in the range of from 0.1 to 70 hours, preferably from 0.5 to 50 hours. As examples of reaction solvents usable in the reactions, there can be mentioned aliphatic hydrocarbons, such as hexane and decane; ethers, such as diethyl ether and tetrahydrofuran; aromatic hydrocarbons, such as benzene, toluene and xylene; and halogenated hydrocarbons, such as carbon tetrachloride, chloroform and methylene chloride. Of these solvents, halogenated hydrocarbons are preferred. These reaction solvents are generally used in an amount 10 to 500 times by weight the amount of the compound of formula (13) or the compound of formula (16).

By the above-mentioned production methods, a desired transition metal compound can be produced. The thus produced transition metal compound can be purified by a method in which a reaction mixture containing the produced transition metal compound is subjected to filtration to obtain a filtrate; the filtrate is subjected to concentration under reduced pressure to isolate the transition metal compound; the isolated transition metal compound is subjected to recrystallization; and the recrystallized transition metal compound is dried under reduced pressure.

On the other hand, a transition metal compound having the bridging group-containing ligand $(Cq-A-L^3)$, i.e., a transition metal compound of formula (6) $(Cq-A-L^3)M(L^3-R^4)_n Y_{2-n}$, can be produced, for example, by the following method.

That is, using a compound represented by formula (24), which has a group having a cyclopentadienyl skeleton and a bridging group, organophosphorus compounds represented by the following formula (25), a compound represented by the following formula (26), an organoalkali metal compound represented by the following formula (27) and a transition metal compound represented by the following formula (28), reactions represented, respectively, by the following reaction formulae (29), (30), (31) and (32) are successively performed.

$$\text{Cq-A-W} \tag{24}$$

wherein each of Cq and A is as defined for formula (6) above, and W represents a reactive group, such as a halogen atom, a hydrogen atom or an alkoxy group;

$$Z^3(PR^5H) \tag{25}$$

wherein $R^5$ is as defined for formula (7) above, and $Z^3$ represents an alkali metal, such as Li, Na or K;

$$X^1X^2 \tag{26}$$

wherein each of $X^1$ and $X^2$ is as defined for formula (7) above, and $X^1$ and $X^2$ are the same or different;

$$R^{21}\text{-}Z^4 \tag{27}$$

wherein $R^{21}$ is a hydrocarbon group, and $Z^4$ represents an alkali metal, such as Li, Na or K;

$$MY_4 \tag{28}$$

wherein each of M and Y is as defined for formula (6) above;

$$\text{Cq-A-W} + Z^3(PR^5H) \rightarrow \text{Cq-A-PR}^5H + Z^3W \tag{29};$$

$$\text{Cq-A-PR}^5H + X^1X^2 \rightarrow \text{Cq-A-PR}^5X^1X^2H \tag{30};$$

$$\text{Cq-A-PR}^5X^1X^2H + 2\ R^{21}\text{-}Z^4 \rightarrow (\text{Cq-A-L}^3)Z^4_2 + 2\ R^{21}\text{-}H \tag{31};$$

and $$(\text{Cq-A-L}^3)\ Z^4_2 + MY_4 \rightarrow (\text{Cq-A-L}^3)MY_2 + 2\ Z^4Y \tag{32}.$$

A transition metal compound of formula (6): $(\text{Cq-A-L}^3)M(L^3\text{-}R^4)_nY_{2-n}$ can be obtained, for example, by reacting $(\text{Cq-A-L}^3)MY_2$ [obtained by the reaction of reaction formula (32)] with an equimolar amount of $Z^2(L^3\text{-}R^4)$ [i.e., the compound of formula (55) above] in accordance with the following reaction formula (33):

$$(\text{Cq-A-L}^3)MY_2 + nZ^2(L^3\text{-}R^4) \rightarrow (\text{Cq-A-L}^3)M(L^3\text{-}R^4)_nY_{2-n} + nZ^2Y \tag{33}.$$

With respect to the conditions for effecting each of the reactions of reaction formulae (29), (30), (31), (32) and (33), the reaction temperature is generally in the range of from −20 to 100° C., preferably from 0 to 80° C., and the reaction time is generally in the range of from 0.1 to 70 hours, preferably from 0.5 to 50 hours. As examples of reaction solvents usable in the reactions, there can be mentioned aliphatic hydrocarbons, such as hexane and decane; ethers, such as diethyl ether and tetrahydrofuran; aromatic hydrocarbons, such as benzene, toluene and xylene; halogenated hydrocarbons, such as carbon tetrachloride, chloroform and methylene chloride; alcohols, such as methanol and ethanol; and water. As a solvent for the reactions of reaction formulae (28), (30) and (31), ethers are preferred. As a solvent for the reaction of reaction formula (29), aromatic hydrocarbons are preferred. As a solvent for the reaction of reaction formula (33), halogenated hydrocarbons are preferred. These reaction solvents are generally used in an amount 10 to 500 times by weight the amount of the starting compound used in the reaction.

By the above-mentioned production methods, the desired transition metal compound can be produced. The thus produced transition metal compound can be purified by a method in which a reaction mixture containing the produced transition metal compound is subjected to filtration to obtain a filtrate; the filtrate is subjected to concentration under reduced pressure to isolate the transition metal compound; the isolated transition metal compound is subjected to recrystallization; and the recrystallized transition metal compound is dried under reduced pressure.

A transition metal compound of formula (6): $(\text{Cq-A-L}^3)M(L^3\text{-}R^4)_nY_{2-n}$ wherein the bridging group A is a substituted methylene group $CR^{21}_2$ can also be produced by the following method. That is, first, the compound represented by the formula $\text{Cq-A-PR}^5H$ is produced from a compound represented by the below-mentioned formula (34) and the compound of formula (25) in accordance with a reaction represented by the below-mentioned reaction formula (35). Then, using the obtained compound of the formula Cq-A-$PR^5H$, the reactions of reaction formulae (30), (31), (32) and (33) above are successively performed.

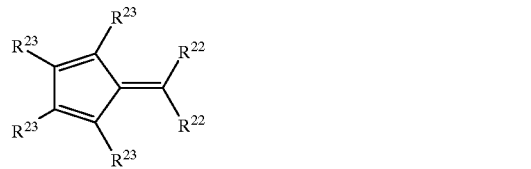

(34)

wherein each of the two $R^{22}$s independently represents a hydrogen atom or a $C_1$–$C_5$ hydrocarbon group, such as a methyl group or a tert-butyl group, and each of the four $R^{23}$s independently represents a hydrogen atom, a $C_1$–$C_5$ hydrocarbon group or a silyl group substituted with a $C_1$–$C_{20}$ hydrocarbon group, with the proviso that two adjacent $R^{23}$s are optionally bonded to each other to form a 4-, 5- or 6-membered ring.

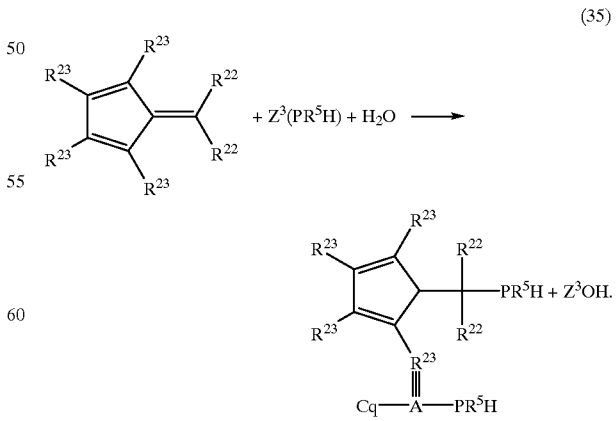

(35)

With respect to the conditions for effecting the reaction of reaction formula (35), the reaction temperature is generally in the range of from −20 to 100° C., preferably from 0 to 80° C., and the reaction time is generally in the range of from 0.1 to 20 hours, preferably from 0.2 to 10 hours. As examples of reaction solvents usable in the reaction, there can be mentioned aliphatic hydrocarbons, such as hexane and decane; ethers, such as diethyl ether and tetrahydrofuran; aromatic hydrocarbons, such as benzene, toluene and xylene; and halogenated hydrocarbons, such as carbon tetrachloride, chloroform and methylene chloride. Of these solvents, ethers are preferred. These reaction solvents are generally used in an amount 10 to 500 times by weight the amount of the compound of formula (34).

As still another example of the transition metal compound of the catalyst of the present invention, there can be mentioned a compound represented by the following formula (8):

$$CpML^4{}_nY_{3-n} \quad (8).$$

In formula (8) above:

Cp represents a group having a cyclopentadienyl skeleton,

M represents a transition metal which is a central metal atom and is Ti, Zr or Hf, $L^4$ represents a bidentate chelating ligand represented by the following formula (9):

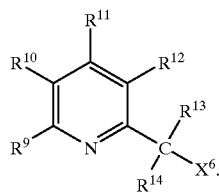

(9)

In formula (9) above, each of $R^9$, $R^{10}$, $R^{11}$, $R^{12}$, $R^{13}$ and $R^{14}$ independently represents a hydrogen atom, a halogen atom, an unsubstituted or substituted $C_1$–$C_{20}$ hydrocarbon group, an unsubstituted or substituted $C_1$–$C_{20}$ alkoxy group, or a silyl group substituted with an unsubstituted or substituted $C_1$–$C_{20}$ hydrocarbon group, with the proviso that when each of $R^9$, $R^{10}$, $R^{11}$, $R^{12}$, $R^{13}$ and $R^{14}$ independently represents an unsubstituted or substituted hydrocarbon group, a pair of members of at least one combination of $R^9$ and $R^{10}$, $R^{10}$ and $R^{11}$, $R^{11}$ and $R^{12}$, and $R^{12}$ and $R^{13}$ are optionally bonded to each other, so that at least one combination of $R^9$ and $R^{10}$, $R^{10}$ and $R^{11}$, $R^{11}$ and $R^{12}$, and $R^{12}$ and $R^{13}$ forms a 4-, 5- or 6-membered ring. Examples of atoms or groups which can be used as each of $R^9$, $R^{10}$, $R^{11}$, $R^{12}$, $R^{13}$ and $R^{14}$ include a hydrogen atom; a halogen atom, such as a fluorine, a chlorine, a bromine or an iodine atom; a $C_1$–$C_{20}$ alkyl group, such as a methyl group, an ethyl group, an n-propyl group, an isopropyl group or a tert-butyl group; a $C_5$–$C_{20}$ cycloalkyl group, such as a cyclopentyl group or a cyclohexyl group; a $C_6$–$C_{20}$ aryl group, such as a phenyl group, a tolyl group or a naphthyl group; a $C_7$–$C_{20}$ arylalkyl group, such as a benzyl group or a neophyl group; a $C_2$–$C_{20}$ alkenyl group, such as an allyl group or a 2-butenyl group; a $C_2$–$C_{20}$ alkynyl group, such as a 2-butynyl group; a $C_1$–$C_{20}$ alkoxy group, such as a methoxy group, an ethoxy group or a phenoxy group; and a $C_1$–$C_{20}$ trialkylsilyl group. At least one hydrogen atom of each of these groups may be replaced by a substituent atom or group selected from a halogen atom, a $C_1$–$C_{20}$ alkoxy group, a $C_6$–$C_{20}$ aryloxy group, a $C_1$–$C_{20}$ alkylsilyl group and a $C_6$–$C_{20}$ arylsilyl group. As examples of carbocyclic skeletons in which at least one pair of members of at least one combination of $R^9$ and $R^{10}$, $R^{10}$ and $R^{11}$, $R^{11}$ and $R^{12}$, and $R^{12}$ and $R^{13}$ are bonded to each other to form at least one carbon ring, there can be mentioned a quinoline structure wherein $R^{12}$ and $R^{13}$ are bonded to each other to form a 6-membered aromatic ring; an acridine structure wherein $R^9$ and $R^{10}$ are bonded to each other to form a 6-membered aromatic ring and $R^{12}$ and $R^{13}$ are also bonded to each other to form another 6-membered aromatic ring; and an isoquinoline structure wherein either a pair of $R^{10}$ and $R^{11}$ or a pair of $R^{11}$ and $R^{12}$ are bonded to each other to form a 6-membered aromatic ring.

In formula (9) above, $X^6$ represents O, S, Se or Te.

In formula (8) above, Y represents a halogen atom, a $C_1$–$C_{20}$ hydrocarbon group, a $C_1$–$C_{20}$ alkoxy group, a $C_1$–$C_{20}$ thioalkoxy group, a $C_6$–$C_{20}$ aryloxy group, a $C_6$–$C_{20}$ thioaryloxy group, an amino group substituted with a $C_1$–$C_{20}$ hydrocarbon group, or a phosphino group substituted with a $C_1$–$C_{20}$ hydrocarbon group.

Specific examples of Y include a halogen atom, such as a fluorine, a chlorine, a bromine or an iodine atom; a $C_1$–$C_{20}$ alkyl group, such as a methyl group, an ethyl group, an n-propyl group, an isopropyl group or a tert-butyl group; a $C_5$–$C_{20}$ cycloalkyl group, such as a cyclopentyl group or a cyclohexyl group; a $C_6$–$C_{20}$ unsubstituted or substituted aryl group, such as a phenyl group, a tolyl group or a methoxyphenyl group; a $C_7$–$C_{20}$ arylalkyl group, such as a benzyl group or a neophyl group; a $C_2$–$C_{20}$ alkenyl group, such as an allyl group or a 2-butenyl group; a $C_1$–$C_{20}$ alkoxy group, such as a methoxy group, an ethoxy group or an n-butoxy group; a $C_1$–$C_{20}$ thioalkoxy group, such as a thioisopropoxy group or a thiobenzylalkoxy group; a $C_6$–$C_{20}$ aryloxy group, such as a phenoxy group or a p-tolyloxy group; a $C_6$–$C_{20}$ thioaryloxy group, such as a thiophenoxy group; an amino group substituted with a $C_1$–$C_{20}$ hydrocarbon group, such as a di-n-propylamino group or a dibenzylamino group; and a phosphino group substituted with a $C_1$–$C_{20}$ hydrocarbon group, such as a diisoamylphosphino group or a diphenylphosphino group.

In formula (8) above, n represents 1 or 2.

Illustrative examples of transition metal compounds represented by formula (8) above wherein $L^4$ is represented by formula (9) above include those which are mentioned below. However, examples of transition metal compounds represented by formula (8) wherein $L^4$ is represented by formula (9) are not limited to those compounds.

Examples of those transition metal compounds include:

(cyclopentadienyl)bis(2-pyridylmethanolato)chlorozirconium, (n-butylcyclopentadienyl)bis(2-pyridylmethanolato)chlorozirconium, (1,3-dimethylcyclopentadienyl)bis(2-pyridylmethanolato) chlorozirconium, (pentamethylcyclopentadienyl)bis(2-pyridylmethanolato)chlorozirconium, (indenyl)bis(2-pyridylmethanolato)chlorozirconium, (cyclopentadienyl)bis(3-ethoxy-2-pyridylmethanolato)bromozirconium, (cyclopentadienyl)bis(2-pyridylmethylthiolato)chlorozirconium, (methylcyclopentadienyl)bis(2-pyridylmethanolato)chlorozirconium, (methylcyclopentadienyl)bis(4-methyl-2-pyridylmethanolato)chlorozirconium, (n-propylcyclopentadienyl)bis(3,4-dimethyl-2-pyridylmethanolato)methylzirconium, (n-butylcyclopentadienyl)bis(2-pyridyl-phenylmethanolato)chlorozirconium,
(n-butylcyclopentadienyl)bis(2-pyridylmethanolato)ethoxyzirconium,
(n-butylcyclopentadienyl)bis(2-pyridylmethylthio)phenylzirconium,
(1,3-dimethylcyclopentadienyl)bis[(3-propyl-2-pyridyl)methanolato]chlorozirconium,
(1,2,4-trimethylcyclopentadienyl)bis[1-(3-propyl-2-pyridyl)ethanolato]benzylzirconium,
(tetramethylcyclopentadienyl)bis(4-chloro-2-pyridylmethanolato)chlorozirconium,
(pentamethylcyclopentadienyl)bis(2-pyridylmethanolato)chlorozirconium,
(pentamethylcyclopentadienyl)bis(2-pyridyl-diphenylmethanolato)chlorozirconium,
(trimethylsilylcyclopentadienyl)bis[1-(2-pyridyl)-2-methylpropanolato]chlorozirconium,
(trimethylsilyltetramethylcyclopentadienyl)bis(2-pyridylmethanolato)chlorozirconium,
(indenyl)bis(2-pyridylmethanolato)phenoxyzirconium,
(indenyl)bis(2-pyridylmethylthio)chlorozirconium,
(tetrahydroindenyl)bis(4-methyl-2-pyridylmethanolato)dimethylaminozirconium,
(2,4,6-trimethylindenyl)bis(2-pyridylmethanolato)diphenylphosphinozirconium,
(fluorenyl)bis(2-pyridyl-phenylmethanolato)chlorozirconium,
(2,7-di-tert-butylfluorenyl)bis(2-pyridylmethanolato)chlorozirconium,
(cyclopentadienyl)(2-pyridylmethanolato)dichlorozirconium,
(cyclopentadienyl)(2-pyridylmethylthio)dichlorozirconium,
(methylcyclopentadienyl)(2-pyridylmethanolato)dichlorozirconium,
(n-propylcyclopentadienyl)(3,4-dimethyl-2-pyridylmethanolato)dimethylzirconium,
(n-butylcyclopentadienyl)bis(2-pyridyl-phenylmethanolato)chlorozirconium,
(1,3-dimethylcyclopentadienyl)(3-propyl-2-pyridylmethanolato)diethoxyzirconium,
(1,2,4-trimethylcyclopentadienyl)[1-(3-propyl-2-pyridyl)ethylthio]dibenzylzirconium,
(tetramethylcyclopentadienyl)(4-chloro-2-pyridylmethanolato)diallylzirconium,
(pentamethylcyclopentadienyl)bis(2-pyridylmethanolato)iodozirconium,
(trimethylsilyltetramethylcyclopentadienyl)(2-pyridylmethanolato)methylphenylzirconium,
(indenyl)(2-pyridylmethanolato)diaminozirconium,
(tetrahydroindenyl)(3-ethoxy-2-pyridylmethanolato)di(diphenylphosphino)zirconium,
(fluorenyl)(2-pyridylmethanolato)dichlorozirconium,
(cyclopentadienyl)bis(8-quinolinolato)chlorozirconium, (n-butylcyclopentadienyl)bis(8-quinolinolato)chlorozirconium,
(1,3-dimethylcyclopentadienyl)bis(8-quinolinolato)chlorozirconium,
(pentamethylcyclopentadienyl)bis(8-quinolinolato)chlorozirconium,
(indenyl)bis(8-quinolinolato)chlorozirconium,
(cyclopentadienyl)bis(8-quinolinolato)bromozirconium, (cyclopentadienyl)bis(5-chloro-8-quinolinolato)chlorozirconium,
(methylcyclopentadienyl)bis(5-chloro-7-iodo-8-quinolinolato)isopropylzirconium,
(methylcyclopentadienyl)bis(2-methyl-8-quinolinolato)chlorozirconium,
(ethylcyclopentadienyl)bis(10-acridinolato)chlorozirconium,
(ethylcyclopentadienyl)bis(2,7-dimethyl-8-quinolinolato)phenylzirconium,
(n-propylcyclopentadienyl)bis(2-ethyl-5-iodo-8-quinolinolato)chlorozirconium,
(n-butylcyclopentadienyl)bis(10-acridinolato)chlorozirconium,
(1,3-dimethylcyclopentadienyl)bis(8-quinolinolato)cyclohexylzirconium,
(1,3-dimethylcyclopentadienyl)bis(7-n-propyl-8-quinolinolato)chlorozirconium,
(1,2,4-trimethylcyclopentadienyl)bis(7-chloro-8-quinolinolato)chlorozirconium,
(tetramethylcyclopentadienyl)bis(8-quinolinolato)benzylzirconium,
(pentamethylcyclopentadienyl)bis(2-methyl-8-quinolinolato)chlorozirconium,
(trimethylsilyltetramethylcyclopentadienyl)bis(8-quinolinolato)chlorozirconium,
(fluorenyl)bis(7-chloro-8-quinolinolato)chlorozirconium,
(cyclopentadienyl)(8-quinolinolato)dichlorozirconium,
(methylcyclopentadienyl)(10-acridinolato)diphenoxyzirconium,
(ethylcyclopentadienyl)(7-chloro-8-quinolinolato)dibromozirconium,
(n-propylcyclopentadienyl)(8-quinolinolato)dicyclohexylzirconium,
(n-butylcyclopentadienyl)bis(8-quinolinolato)aminozirconium,
(1,3-dimethylcyclopentadienyl)(10-acridinolato)dichlorozirconium,
(1,2,4-trimethylcyclopentadienyl)(8-quinolinolato)dichlorozirconium,
(pentamethylcyclopentadienyl)(2-methyl-8-quinolinolato) dimethoxyzirconium,
(indenyl)(8-quinolinolato)dichlorozirconium, and
(fluorenyl)(7-n-propyl-8-quinolinolato)dichlorozirconium.

Examples of transition metal compounds represented by formula (8) above also include those which are obtained by replacing the zirconium in the above-mentioned zirconium compounds by titanium or hafnium.

Transition metal compounds of formula (8) above: $CpML^4{}_nY_{3-n}$ can be produced by several methods.

For example, a transition metal compound of formula (8) above can be produced from a Group 4A transition metal compound represented by the following formula (13) and a compound represented by the following formula (36) by a reaction represented by the following reaction formula (37).

$$CpMY_3 \quad (13)$$

wherein each of M, Cp and Y is as defined above for formula (8) above;

$$L^4H \quad (36)$$

wherein L$^4$ is as defined for formula (8) above and is represented by formula (9) above; and $$CpMY_3 + nL^4H \rightarrow CpML^4_nY_{3-n} + nHY \quad (37).$$

In the reaction of formula (37), from the view-point of efficiency, it is preferred: that, when n=1, the compound of formula (36) above is used in an equimolar amount to the molar amount of the compound of formula (13) above, and that, when n=2, the compound of formula (36) above is used in a molar amount two times the molar amount of the compound of formula (13) above.

A transition metal compound of formula (8) in which n=2, i.e., a transition metal compound represented by the formula: $CpML^4_2Y$, can be efficiently produced from a metallocene compound represented by the following formula (16) and a compound of formula (36) by a reaction represented by the following reaction formula (38).

$$Cp_2MY_2 \quad (16)$$

wherein each of M, Cp and Y is as defined for formula (8) above; and $$Cp_2MY_2 + 2L^4H \rightarrow CpML^4_2Y + CpH + HY \quad (38).$$

As examples of this reaction, production of (cyclopentadienyl)bis(8-quinolinolato)fluorotitanium, (cyclopentadienyl)bis(8-quinolinolato)chlorotitanium, (cyclopentadienyl)bis(8-quinolinolato)bromotitanium, (cyclopentadienyl)bis(8-quinolinolato)chlorozirconium, (cyclopentadienyl)bis(8-quinolinolato)bromozirconium, and (cyclopentadienyl)bis(8-quinolinolato)chlorohafnium is disclosed in Journal of Chemical Society (A) [J. Chem. Soc. (A)], 15, 2487–2491 (1971). Similar compounds can also be produced substantially in accordance with the above-mentioned reaction method.

In each of the reactions of reaction formulae (37) and (38), for producing the desired compound efficiently, a tertiary amine, such as triethylamine or triisobutylamine, can be used for trapping by-produced HY. When the tertiary amine is used, the molar amount of the tertiary amine is generally from 1 to 100 times that of the compound of formula (36).

With respect to the conditions for effecting each of the reactions of reaction formulae (37) and (38), the reaction temperature is generally in the range of from −20 to 100° C., preferably from 0 to 80° C., and the reaction time is generally in the range of from 0.1 to 50 hours, preferably from 0.5 to 30 hours. As examples of reaction solvents usable in the reaction, there can be mentioned aliphatic hydrocarbons, such as hexane and decane; ethers, such as diethyl ether and tetrahydrofuran; aromatic hydrocarbons, such as benzene, toluene and xylene; halogenated hydrocarbons, such as carbon tetrachloride, chloroform and methylene chloride; and nitrogen-containing compounds, such as acetonitrile and pyridine. Of these solvents, acetonitrile is preferred. These reaction solvents are generally used in an amount 10 to 500 times by weight the amount of the compound of formula (13) or the compound of formula (16).

By the above-mentioned production methods, the desired transition metal compound can be produced. The thus produced transition metal compound can be purified by a method in which a reaction mixture containing the produced transition metal compound is subjected to filtration to obtain a filtrate; the filtrate is subjected to concentration under reduced pressure to isolate the transition metal compound; the isolated transition metal compound is subjected to recrystallization; and the recrystallized transition metal compound is dried under reduced pressure.

As a further example of the transition metal compound of the olefin polymerization catalyst of the present invention, there can be mentioned a transition metal compound, having a bindentate chelating functional group L$^5$, represented by the following formula (10) or (11):

$$CpM(L^5\text{-}R^{15})_mY_{3-m} \quad (10)$$

$$(Cq\text{-}A\text{-}L^5)M(L^5\text{-}R^{15})_nY_{2-n} \quad (11).$$

In formulae (10) and (11) above:

Cp represents a group having a cyclopentadienyl skeleton,

Cq represents a group, having a cyclopentadienyl skeleton, covalently bonded to A, and M represents a central metal atom which is a transition metal selected from Zr, Ti and Hf.

In formulae (10) and (11), L$^5$ represents a bidentate chelating functional group represented by the following formula (12):

(12)

wherein X$^7$ represents O, S, Se or Te, each of R$^{16}$, R$^{17}$, R$^{18}$ and R$^{19}$ independently represents a hydrogen atom, a halogen atom, an unsubstituted or substituted C$_1$–C$_{20}$ hydrocarbon group, an unsubstituted or substituted C$_1$–C$_{20}$ alkoxy group, or a silyl group substituted with a C$_1$–C$_{20}$ hydrocarbon group, or L$_5$ represents a bidentate chelating functional group having a structure such that, in the formula (12), each of the two carbon atoms has one or two unsubstituted or substituted hydrocarbon groups, wherein arbitrarily selected two hydrocarbon groups, which are respectively bonded to the two carbon atoms, are bonded to each other so that the two carbon atoms and the arbitrarily selected two hydrocarbon groups together form a 4-, 5- or 6-membered ring or wherein each of R$^{16}$ and R$^{18}$ is the hydrocarbon group and each of R$^{17}$ and R$^{19}$ is null, the R$^{16}$ and the R$^{18}$ being bonded to each other, so that the two carbon atoms, R$^{16}$ and R$^{18}$ together form a 4-, 5- or 6-membered ring containing at least one carbon-to-carbon double bond, or wherein each of R$^{17}$ and R$^{19}$ is the hydrocarbon group and each of R$^{16}$ and R$^{18}$ is null, the R$^{17}$ and the R$^{19}$ being bonded to each other, so that said two carbon atoms, R$^{17}$ and R$^{19}$ together form 4-, 5- or 6-membered ring containing at least one carbon-to-carbon double bond.

Examples of each of R$^{16}$, R$^{17}$, R$^{18}$ and R$^{19}$ include a hydrogen atom; a halogen atom, such as a fluorine, a chlorine, a bromine or an iodine atom; a C$_1$–C$_{20}$ alkyl group, such as a methyl group, an ethyl group, an n-propyl group, an isopropyl group or a tert-butyl group; a C$_5$–C$_{20}$ cycloalkyl group, such as a cyclopentyl group or a cyclohexyl group; a C$_6$–C$_{20}$ aryl group, such as a phenyl group, a tolyl group or a naphtyl group; a C$_7$–C$_{20}$ arylalkyl group, such as a benzyl group or a neophyl group; a C$_2$–C$_{20}$ alkenyl group, such as an allyl group or a 2-butenyl group; a C$_1$–C$_{20}$ alkoxy group, such as a methoxy group, an ethoxy group or a phenoxy group; and a $C_1$–$C_{20}$ trialkylsilyl group. At least one hydrogen atom of each of $R^{16}$, $R^{17}$, $R^{18}$ and $R^{19}$ may be replaced by a substituent atom or group selected from a halogen atom, a $C_1$–$C_{20}$ alkoxy group, a $C_6$–$C_{20}$ aryloxy group, a $C_1$–$C_{20}$ alkylsilyl group and a $C_6$–$C_{20}$ arylsilyl group. Examples of the carbocyclic structures formed by the two carbon atoms in formula (12) and hydrocarbon groups respectively bonded thereto include a benzene structure which is a 6-membered aromatic ring formed by bonding $R^{16}$ and $R^{18}$ to each other, and a cyclohexane structure which is an 6-membered ring formed by bonding $R^{16}$ and $R^{18}$ to each other.

$L^5$-$R^{15}$ represents a bidentate chelating ligand represented by the following formula (39):

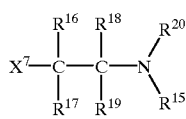

(39)

wherein each of $X^7$, $R^{16}$, $R^{17}$, $R^{18}$, $R^{19}$ and $R^{20}$ is as defined for formula (12) above.

Each of $R^{15}$ and $R^{20}$ independently represents a hydrogen atom, a hydrocarbon group, with the proviso that $R^{15}$ and $R^{20}$ are optionally bonded to each other to form a 5- or 6-membered ring containing a nitrogen atom. Examples of each of $R^{15}$ and $R^{20}$ include a halogen atom, a $C_1$–$C_{20}$ alkyl group, such as a methyl group, an ethyl group, an n-propyl group, an isopropyl group or a tert-butyl group; a $C_5$–$C_{20}$ cycloalkyl group, such as a cyclopentyl group or a cyclohexyl group; a $C_6$–$C_{20}$ aryl group, such as a phenyl group, a tolyl group or a naphthyl group; a $C_7$–$C_{20}$ arylalkyl group, such as a benzyl group or a neophyl group; a $C_2$–$C_{20}$ alkenyl group, such as an allyl group or a 2-butenyl group. Examples of skeleton structures of heterocyclic rings containing a nitrogen include a 5-membered pyrrolidine structure, a 6-membered piperidine structure, and a pyrrole structure which is a 5-membered aromatic ring. At least one hydrogen atom of each of these groups may be replaced by a substituent atom or group selected from a halogen atom, a $C_1$–$C_{20}$ alkoxy group, a $C_6$–$C_{20}$ aryloxy group, a $C_1$–$C_{20}$ alkylsilyl group and a $C_6$–$C_{20}$ arylsilyl group.

Cq-A-$L^5$ in formula (11) represents a ligand in which the bidentate chelating functional group $L^5$ and the group Cq having a cyclopentadienyl skeleton are linked to each other through briding group A.

In formula (11), A represents a bridging group or atom forming the bridging by covalent bonding, and is selected from the group consisting of —$CR^8_2$—, —$CR^8_2CR^8_2$—, —$CR^8$=$CR^8$—, —$SiR^8_2$—, —$SiR^8_2SiR^8_2$—, —$GeR^8_2$—, —$BR^8$—, —$AlR^8$—, —$PR^8$—, —$P(O)R^8_2$—, —$NR^8$—, —$SO_2$—, —SO—, —O—, —S—, —Ge—, —Sn—, and —CO—, wherein $R^8$ represents a hydrogen atom, a halogen atom, or an unsubstituted or substituted $C_1$–$C_{20}$ hydrocarbon group. At least one hydrogen atom of a hydrocarbon group as $R^8$ may be replaced by a substituent atom or group selected from a halogen atom, a $C_1$–$C_{20}$ alkoxy group and a $C_6$–$C_{20}$ aryloxy group.

Y in formulae (10) and (11) represents a halogen atom, a $C_1$–$C_{20}$ hydrocarbon group, a $C_1$–$C_{20}$ alkoxy group, a $C_1$–$C_{20}$ thioalkoxy group, a $C_6$–$C_{20}$ aryloxy group, a $C_6$–$C_{20}$ thioaryloxy group, an amino group substituted with a $C_1$–$C_{20}$ hydrocarbon group, or a phosphino group substituted with a $C_1$–$C_{20}$ hydrocarbon group. Examples of Y include a halogen atom, such as a fluorine, a chlorine, a bromine or an iodine atom; a $C_1$–$C_{20}$ alkyl group, such as a methyl group, an ethyl group, an n-propyl group, an isopropyl group or a tert-butyl group; a $C_5$–$C_{20}$ cycloalkyl group, such as a cyclopentyl group or a cyclohexyl group; a $C_6$–$C_{20}$ unsubstituted or substituted aryl group, such as a phenyl group, a tolyl group or a methoxyphenyl group; a $C_7$–$C_{20}$ arylalkyl group, such as a benzyl group or a neophyl group; a $C_2$–$C_{20}$ alkenyl group, such as an allyl group or a 2-butenyl group; a $C_1$–$C_{20}$ alkoxy group, such as a methoxy group, an ethoxy group or an n-butoxy group; a $C_1$–$C_{20}$ thioalkoxy group, such as a thioisopropoxy group or a thiobenzylalkoxy group; a $C_6$–$C_{20}$ aryloxy group, such as a phenoxy group or p-tolyloxy group; a $C_6$–$C_{20}$ thioaryloxy group, such as a thiophenoxy group; an amino group substituted with a $C_1$–$C_{20}$ hydrocarbon group, such as a di-n-propylamino group or a dibenzylamino group; a phosphino group substituted with a $C_1$–$C_{20}$ hydrocarbon group, such as a di-isoamylphosphino group or a diphenylphosphino group.

In formulae (10) and (11), m represents 1 or 2, and n represents 0, 1 or 2.

Specific examples of transition metal compounds represented by formula (10) or (11) include those which are mentioned below. However, examples of transition metal compounds represented by formula (10) or (11) are not limited to those compounds.

Specific examples of transition metal compounds represented by formula (10) or (11) include:

(cyclopentadienyl)bis(2-dimethylamino-ethanolato)chlorozirconium, (n-butylcyclopentadienyl)bis(2-dimethylamino-ethanolato)chlorozirconium, (1,3-dimethylcyclopentadienyl)bis(2-dimethylaminoethanolato)chlorozirconium, (pentamethylcyclopentadienyl)bis(2-dimethylamino-ethanolato)chlorozirconium, (indenyl)bis(2-dimethylamino-ethanolato)chlorozirconium, (cyclopentadienyl)bis(2-diethylamino-ethanolato)chlorozirconium, (cyclopentadienyl)bis(2-di-n-propylaminoethanolato)bromozirconium, (methylcyclopentadienyl)bis(2-dimethylaminoethanolato)chlorozirconium, (methylcyclopentadienyl)bis(2-dimethylamino-1-methylethanolato)methylzirconium, (ethylcyclopentadienyl)bis(2-dimethylamino-1,2-dimethyl-ethanolato)chlorozirconium, (n-propylcyclopentadienyl)bis(2-dimethylamino-ethanolato)chlorozirconium, (n-butylcyclopentadienyl)bis(2-dimethylamino-ethanolato)phenylzirconium, (n-butylcyclopentadienyl)bis(2-dicyclohexylamino-ethanolato)chlorozirconium, (1,3-dimethylcyclopentadienyl)bis(2-diphenylaminoethanolato)phenoxyzirconium, (1,3-dimethylcyclopentadienyl)bis(2-dimethylaminoethanolato)dimethylaminozirconium, (1,2,4-trimethylcyclopentadienyl)bis(2-dimethylaminoethylthio)chlorozirconium, (tetramethylcyclopentadienyl)bis(2-dimethylamino-ethanolato)diphenylphosphinozirconium, (pentamethylcyclopentadienyl)bis(2-dimethylamino-1,2-diethyl-ethanolato)chlorozirconium, (pentamethylcyclopentadienyl)bis(2-dimethylamino-ethanolato)chlorozirconium, (trimethylsilyltetramethylcyclopentadienyl)bis[2-(1-pyrrolidino)-ethanolato]thioethoxyzirconium,
(indenyl)bis(2-di-n-propylamino-ethanolato)bromozirconium,
(tetrahydroindenyl)bis[2-(1-piperidino)ethanolato]chlorozirconium,
(2,4,6-trimethylindenyl)bis(2-dimethylamino-1-methylethanolato)ethoxyzirconium,
(fluorenyl)bis[2-(1-pyrrolyl)-ethanolato]chlorozirconium,
(2,7-di-tert-butylfluorenyl)bis(2-dimethylamino-ethanolato)chlorozirconium,
(cyclopentadienyl)(2-dimethylamino-ethanolato)dichlorozirconium,
(cyclopentadienyl)(2-di-n-propylamino-ethanolato)dibromozirconium,
(methylcyclopentadienyl)(2-dimethylaminoethanolato)dichlorozirconium,
(ethylcyclopentadienyl)(2-dimethylamino-1,2-dimethylethanolato)dimethoxyzirconium,
(n-propylcyclopentadienyl)(2-dimethylaminoethanolato)diphenylzirconium,
(n-butylcyclopentadienyl)(2-dimethylaminoethanolato)diethoxyzirconium,
(1,3-dimethylcyclopentadienyl)bis(2-diphenylaminoethanolato)chlorozirconium,
(1,2,4-trimethylcyclopentadienyl)[2-(1-pyrrolidino)ethylthio]bis(diethylamino)zirconium,
(tetramethylcyclopentadienyl)(2-dimethylamino-ethanolato)bis(diphenylphosphino)zirconium,
(pentamethylcyclopentadienyl)(2-dimethylamino-1,2-diethyl-ethanolato)dichlorozirconium,
(trimethylsilyltetramethylcyclopentadienyl)(2-diethylamino-ethanolato)(chloro)methylzirconium,
(indenyl)(2-di-n-propylamino-ethanolato)(methoxy)methylzirconium,
(fluorenyl)(2-dimethylamino-ethanolato)dichlorozirconium,
(cyclopentadienyl)bis(2-dimethylamino-phenolato)chlorozirconium,
(n-butylcyclopentadienyl)bis(2-dimethylaminophenolato)chlorozirconium,
(1, 3-dimethylcyclopentadienyl)bis(2-dimethylaminophenolato)chlorozirconium,
(pentamethylcyclopentadienyl)bis(2-dimethylamino-phenolato)chlorozirconium,
(cyclopentadienyl)bis(2-diethylamino-phenolato)chlorozirconium,
(cyclopentadienyl)bis(4-butyl-2-dimethylamino-phenolato)bromozirconium,
(methylcyclopentadienyl)bis(2-dimethylaminophenolato)methylzirconium,
(methylcyclopentadienyl)bis(2-diphenylaminophenolato)chlorozirconium,
(ethylcyclopentadienyl)bis(2-dicyclohexylamino-phenolato)phenylzirconium,
(ethylcyclopentadienyl)bis(4-amino-2-dimethylaminophenolato)phenoxyzirconium,
(n-propylcyclopentadienyl)bis[2-(1-pyrrolidino)-phenolato]chlorozirconium,
(n-butylcyclopentadienyl)bis(2-dimethylaminophenolato)chlorozirconium,
(n-butylcyclopentadienyl)bis(4-allyl-2-dimethylaminophenolato)diphenylaminozirconium,
(1,3-dimethylcyclopentadienyl)bis(2-dimethylaminophenolato)methoxyzirconium,
(1,3-dimethoxycyclopentadienyl)bis[2-(1-piperidino)phenolato]chlorozirconium,
(1,2,4-trimethylcyclopentadienyl)bis(2-dimethylaminophenolato)chlorozirconium,
(1,2,4-trimethylcyclopentadienyl)bis[2-(1-pyrrolyl)phenolato]bromozirconium,
(tetramethylcyclopentadienyl)bis(2-dimethylamino-phenolato)diethylaminozirconium,
(pentamethylcyclopentadienyl)bis(4-butyl-2-dimethylamino-phenolato)benzylzirconium,
(trimethylsilylcyclopentadienyl)bis(2-diethylaminophenolato)chlorozirconium,
(trimethylsilyltetramethylcyclopentadienyl)bis(2-di-n-propylamino-phenolato)iodozirconium,
(indenyl)bis(2-dimethylamino-phenolato)chlorozirconium,
(tetrahydroindenyl)bis(4-amino-2-diethylamino-phenolato)chlorozirconium,
(2,4,6-trimethylindenyl)bis(2-diethylaminophenolato)chlorozirconium,
(fluorenyl)bis(2-dimethylamino-phenolato)chlorozirconium,
(2,7-di-ethylfluorenyl)bis(2-diisopropylaminophenolato)chlorozirconium,
(cyclopentadienyl)(2-dimethylamino-phenolato)dichlorozirconium,
(methylcyclopentadienyl)bis(2-diethylaminophenolato)methylzirconium,
(ethylcyclopentadienyl)(2-dicyclohexylaminophenolato)dimethoxyzirconium,
(n-propylcyclopentadienyl)[2-(1-pyrrolidino)phenolato]diphenylzirconium,
(n-butylcyclopentadienyl)(2-dimethylaminophenolato)dibenzylzirconium,
(1,3-dimethylcyclopentadienyl)(2-dimethylaminophenolato)dichlorozirconium,
(1,2,4-trimethylcyclopentadienyl)bis(2-dimethylaminophenolato)(diphenylphosphino)zirconium,
(pentamethylcyclopentadienyl)(2-dimethylaminophenolato)dichlorozirconium,
(trimethylsilylcyclopentadienyl)(2-diethylaminophenolato)methoxychlorozirconium,
(trimethylsilyltetramethylcyclopentadienyl)[2-(1-piperidino)-phenolato]dibromozirconium,
(indenyl)(2-dimethylamino-phenolato)diphenylzirconium,
(fluorenyl)(2-dimethylaminophenolato)bis(diethylamino)zirconium,
(tetramethylcyclopentadienyl)dimethylsilylene(2-phenylamino-ethanolato)dichlorozirconium,
(cyclopentadienyl)dimethylsilylene(2-methylaminoethanolato)dichlorozirconium,
(cyclopentadienyl)ethylene(2-phenylamino-2-ethylethanolato)diphenoxyzirconium,
(tetramethylcyclopentadienyl)methylene(2-ethylaminoethanolato)difluorozirconium,
(2-methylcyclopentadienyl)dimethylsilylenedimethylsilylene(2-methylamino-ethanolato)dichlorozirconium, (3-methylcyclopentadienyl)dimethylsilylene(2-cyclohexylamino-1-methyl-ethanolato)diisobutylzirconium, (2,4-dimethylcyclopentadienyl)ethylene(2-phenylaminoethanolato)dichlorozirconium, (3,5-dimethylcyclopentadienyl)isopropylene(2-phenylamino-phenolato)dichlorozirconium, (indenyl)dimethylsilylene(2-methylaminophenolato)dibromozirconium, (tetrahydroindenyl)ethylborene(2-methylamino-ethanolato)dimethoxyzirconium, and (fluorenyl)dimethylsilylene(2-phenylaminophenolato)dibenzylzirconium.

Examples of transition metal compounds represented by formula (10) or (11) above also include those which are obtained by replacing the zirconium in the above-mentioned zirconium compounds by titanium or hafnium.

Transition metal compounds of formula (10) above: $CpM(L^5-R^{15})_m Y_{3-m}$ can be produced by several methods. For example, a transition metal compound of formula (10) above can be produced from a transition metal compound represented by the following formula (13) and a compound represented by the following formula (40) by a reaction represented by the following reaction formula (41).

$$CpMY_3 \quad (13)$$

wherein each of M, Cp and Y is as defined for formula (10) above;

$$(L^5-R^{15})H \quad (40)$$

wherein $L^5$ is as defined for formula (10) above and is represented by formula (12) above, and $R^{15}$ is as defined for formula (10) above; and $$CpMY_3 + m(L^5-R^{15})H \rightarrow CpM(L^5-R^{15})_m Y_{3-m} + mHY \quad (41)$$

In the reaction of formula (41) above, from the viewpoint of efficiency, it is preferred: that, when m=1, the compound of formula (40) above is used in an equimolar amount to the molar amount of the compound of formula (13), that, when m=2, the compound of formula (40) above is used in a molar amount two times the molar amount of the compound of formula (13).

A transition metal compound of formula (10) above in which m=2, i.e., a transition metal compound represented by the formula: $CpM(L^5-R^{15})_2 Y$, can be efficiently produced from a metallocene compound represented by the following formula (16) and a compound of formula (39) above by a reaction represented by the following reaction formula (42).

$$Cp_2MY_2 \quad (16)$$

wherein each of M, Cp and Y is as defined for formula (10) above; and $$Cp_2MY_2 + 2(L^5-R^{15})H \rightarrow CpM(L^5-R^{15})_2 Y + CpH + HY \quad (42)$$

In each of the reactions of reaction formulae (41) and (42), for producing the desired compound efficiently, a tertiary amine, such as triethylamine or triisobutylamine, can be used for trapping by-produced HY. When the tertiary amine is used, the molar amount of the tertiary amine is generally from 1 to 100 times that of the compound of formula (40).

With respect to the conditions for effecting each of the reactions of reaction formulae (41) and (42), the reaction temperature is generally in the range of from −20 to 100° C., preferably from 0 to 80° C., and the reaction time is generally in-the range of from 0.1 to 70 hours, preferably from 0.5 to 50 hours. As examples of reaction solvents usable in the reactions, there can be mentioned aliphatic hydrocarbons, such as hexane and decane; ethers, such as diethyl ether and tetrahydrofuran; aromatic hydrocarbons, such as benzene, toluene and xylene; halogenated hydrocarbons, such as carbon tetrachloride, chloroform and methylene chloride; and nitrogen-containing compounds, such as acetonitrile and pyridine. Of these solvents, acetonitrile is preferred. These reaction solvents are generally used in an amount 10 to 500 times by weight the amount of the compound of formula (13) above or the compound of formula (16) above.

By the above-mentioned production methods, a desired transition metal compound can be produced. The thus produced transition metal compound can be purified by a method in which a reaction mixture containing the produced transition metal compound is subjected to filtration to obtain a filtrate; the filtrate is subjected to concentration under reduced pressure to isolate the transition metal compound; the isolated transition metal compound is subjected to recrystallization; and the recrystallized transition metal compound is dried under reduced pressure.

On the other hand, a transition metal compound having the bridging group-containing ligand ($Cq-A-L^5$) i.e., a transition metal compound of formula (6): $(Cq-A-L^5)M(L^5-R^{15})_n Y_{2-n}$, can be produced, for example, by the following method.

That is, using a compound represented by formula (24), which has a group having a cyclopentadienyl skeleton and a bridging group, compound represented by the following formula (43), an organoalkali metal compound represented by the following formula (27) and a transition metal compound represented by the following formula (28), reactions represented, respectively, by the following reaction formulae (44), (45) and (46) are successively performed.

$$Cq-A-W \quad (24)$$

wherein each of Cq and A is as defined for formula (11) above, and W represents a reactive group, such as a halogen atom, a hydrogen atom or an alkoxy group;

$$H-L^5-H \quad (42)$$

wherein $L^5$ is as defined for formula (11) above and is represented by formula (12) above;

$$R^{21}-Z^4 \quad (27)$$

wherein $R^{21}$ is a hydrocarbon group, and $Z^4$ represents an alkali metal, such as Li, Na or K;

$$MY_4 \quad (28)$$

wherein each of M and Y is as defined for formula (11) above;

$$Cq-A-W + H-L^5-H \rightarrow Cq-A-L^5H + WH \quad (44);$$

$$Cq-A-L^5H + 2(R^{21}-Z^4) \rightarrow (Cq-A-L^5)Z^4_2 + 2R^{21}-H \quad (45);$$

and $$(Cq-A-L^5)Z^4_2 + MY_4 \rightarrow (Cq-A-L^5)MY_2 + 2Z^4 Y \quad (46).$$

A transition metal compound of formula (6): $(Cq-A-L^5)M(L^5-R^{15})_n Y_{2-n}$ can be obtained, for example, by reacting (Cq-A-L$^5$)MY$_2$ [obtained by the reaction of reaction formula (32)] with an equimolar amount of (L$^5$-R$^{15}$)H [i.e., the compound of formula (40) above] in accordance with the following reaction formula (47):

(Cq-A-L$^5$)MY$_2$+n(L$^5$-R$^{15}$)H→(Cq-A-L$^5$)M(L$^5$-R$^{15}$)$_n$Y$_{2-n}$+nHY(47).

With respect to the conditions for effecting each of the reactions of reaction formulae (44), (45), (46) and (47), the reaction temperature is generally in the range of from −20 to 100° C., preferably from 0 to 80° C., and the reaction time is generally in the range of from 0.1 to 70 hours, preferably from 0.5 to 50 hours. As examples of reaction solvents usable in the reactions, there can be mentioned aliphatic hydrocarbons, such as hexane and decane; ethers, such as diethyl ether and tetrahydrofuran; aromatic hydrocarbons, such as benzene, toluene and xylene; and halogenated hydrocarbons, such as carbon tetrachloride, chloroform and methylene chloride. Of these solvents, ethers are preferred. These reaction solvents are generally used in an amount 10 to 500 times by weight the amount of the starting compound used in the reaction.

By the above-mentioned production methods, the desired transition metal compound can be produced. The thus produced transition metal compound can be purified by a method in which a reaction mixture containing the produced transition metal compound is subjected to filtration to obtain a filtrate; the filtrate is subjected to concentration under reduced pressure to isolate the transition metal compound; the isolated transition metal compound is subjected to recrystallization; and the recrystallized transition metal compound is dried under reduced pressure.

A transition metal compound of formula (11): (Cq-A-L$^5$)M (L$^5$-R$^{15}$)$_n$Y$_{2-n}$, wherein the bridging group A is a substituted methylene group CR$^{21}_2$, can also be produced by the following method. That is, first, the compound represented by the formula Cq-A-L$^5$H is produced from a compound represented by the below-mentioned formula (34), the compound of formula (27) and the compound of formula (43) in accordance with a reaction represented by the below-mentioned reaction formulae (48) and (49). Then, using the obtained compound of the formula Cq-A-L$^5$H, the reactions of reaction formulae (45), (46) and (47) above are successively performed.

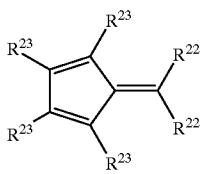

(34)

wherein each of the two R$^{22}$s independently represents a hydrogen atom or a C$_1$–C$_5$ hydrocarbon group, such as a methyl group or a tert-butyl group, and each of the four R$^{23}$s independently represents a hydrogen atom, a C$_1$–C$_5$ hydrocarbon group or a silyl group substituted with a C$_1$–C$_{20}$ hydrocarbon group, with the proviso that two adjacent R$^{23}$s are optionally bonded to each other to form a 4-, 5- or 6-membered ring;

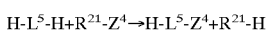
(48);

and

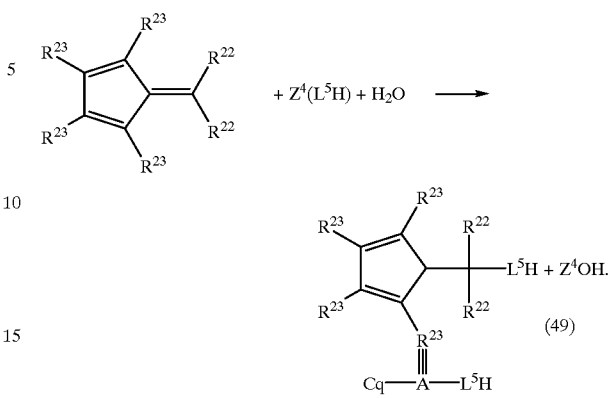

With respect to the conditions for effecting each of the reactions of reaction formulae (48) and (49), the reaction temperature is generally in the range of from −20 to 100° C., preferably from 0 to 80° C., and the reaction time is generally in the range of from 0.1 to 20 hours, preferably from 0.2 to 10 hours. As examples of reaction solvents usable in the reaction, there can be mentioned aliphatic hydrocarbons, such as hexane and decane; ethers, such as diethyl ether and tetrahydrofuran; aromatic hydrocarbons, such as benzene, toluene and xylene; and halogenated hydrocarbons, such as carbon tetrachloride, chloroform and methylene chloride. Of these solvents, ethers are preferred. These reaction solvents are generally used in an amount 10 to 500 times by weight the amount of the compound of formula (34).

It is preferred that the olefin polymerization catalyst of the present invention, which comprises the above-specified transition metal compound, futher comprises at least one auxiliary catalyst selected from the group consisting of an organoaluminumoxy compound and a cation generator. As the auxiliary catalyst, a conventional compound can be used.

The organoaluminumoxy compound is an alkylaluminoxane which is represented by one of the following formulae (50) and (51):

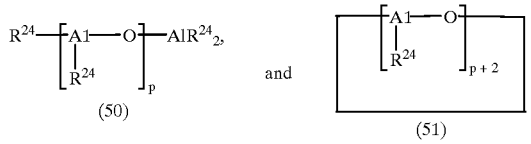

wherein each R$^{24}$ independently represents a hydrogen atom, a halogen atom or a C$_1$–C$_{10}$ alkyl group, and p is an integer of from 2 to 40.

Representative examples of R$^{24}$ in each of formulae (50) and (51) include a hydrogen atom; a halogen atom, such as a chlorine atom or a bromine atom; and an alkyl group, such as a methyl group, an ethyl group, an n-propyl group, an isopropyl group, an n-butyl group, an isobutyl group, a sec-butyl group, a pentyl group, a hexyl group, a heptyl group, an octyl group, a nonyl group or a decyl group. These atoms and groups can be used in combination. It is preferred that each R$^{24}$ is a methyl group or that R$^{24}$s are different and are a combination of a methyl group and other atom(s) and group(s). The number of recurring units (i.e., p) is preferably in the range of from 2 to 40, more preferably from 5 to 40. The alkylaluminoxane can be prepared by a customary method, for example, a method in which a trialkylaluminum is dissolved in a hydrocarbon solvent to obtain a solution and then, one equivalent of water, relative to the amount of the trialkylaluminum, is gradually added to the solution to hydrolyze the trialkylaluminum; a method in which copper sulfate hydrate, aluminum sulfate hydrate or the like is suspended in a hydrocarbon solvent and then, 1 to 3 equivalents of trialkylaluminum, relative to the crystal water of the suspended hydrate, are contacted with the hydrate to thereby gradually hydrolyze the trialkylaluminum; or a method in which silica gel having water adsorbed thereon is suspended in a hydrocarbon solvent and then, 1 to 3 equivalents of trialkylaluminum, relative to the water adsorbed on the suspended silica gel, are contacted with the silica gel to thereby gradually hydrolyze the trialkylaluminum.

As cation generators, there can be mentioned cation generators of the neutral type and cation generators of the ion-pair type.

An example of cation generators of the neutral type is an organoboron compound which is represented by the following formula (52):

$$BR^{25}_3 \tag{52}$$

wherein each $R^{25}$ independently represents a $C_1$–$C_{20}$ hydrocarbon group.

That is, the organoboron compound is not specifically limited, as long as it is a boron compound in which a hydrocarbon group as a substituent is bonded to a boron atom. At least one hydrogen atom of the hydrocarbon group may be replaced by a halogen atom.

Examples of $R^{25}$ include alkyl groups, such as a methyl group, an ethyl group, an n-propyl group, an amyl group, an iso-amyl group, an isobutyl group and an n-octyl group; and aryl groups, such as a phenyl group, a fluorophenyl group, a tolyl group and a xylyl group. The three $R^{25}$ groups may be the same or different.

Specific examples of organic boron compounds represented by formula (52) include triphenylborane, tri(pentafluorophenyl)borane, tri(2,3,4,5-tetrafluorophenyl)borane, tri(2,4,6-trifluorophenyl)borane, tri(2,3-difluorophenyl)borane, tri(2-fluorophenyl)borane, tri[(3,5-di(trifluoromethyl)phenyl]borane, tri[(4-trifluoromethyl)phenyl]borane, trimethylborane, triethylborane, tri(trifluoromethyl)borane, diphenylfluoroborane and di(pentafluorophenyl)chloroborane. Among these examples, tri(pentafluorophenyl)borane is especially preferred.

An example of cation generators of the ion-pair type is a compound represented by the following formula (53):

$$[On]^+[BR^{26}_4]^- \tag{53}$$

wherein $[On]^+$ represents a metal cation, such as an ion of a metal belonging to Group 1B, 2B or 8 of the Periodic Table, or a cation, such as a carbonium ion, a silylium ion, an oxonium ion, a sulfonium ion, an ammonium ion or a phosphonium ion, and $[BR^{26}_4]^-$ represents an anion which has no or poor coordinating property.

$R^{26}$ is the same as $R^{25}$ in formula (52). Preferred specific examples of cation generators represented by formula (53) include tetra(pentafluorophenyl) borate salts and the like, such as ferrocenium tetra(pentafluorophenyl)borate, silver (I) tetra(pentafluorophenyl)borate, copper(I) tetra(pentafluorophenyl)borate, mercury(II) bis[tetra(pentafluorophenyl)borate], palladium(II) bis[tetra(pentafluorophenyl)borate], platinum(II) bis[tetra(pentafluorophenyl)borate], diphenylhydrocarbonium tetra(pentafluorophenyl)borate, triphenylcarbonium tetra(pentafluorophenyl)borate, triphenylsilylium tetra(pentafluorophenyl)borate, tricyclohexylcarbonium tetra(pentafluorophenyl)borate, triethyloxonium tetra(pentafluorophenyl)borate, triethylsulfonium tetra(pentafluorophenyl)borate, diethylanilinium tetra(pentafluorophenyl)borate, trimethylammonium tetra(pentafluorophenyl)borate, triethylammonium tetra(pentafluorophenyl)borate, tetra(n-butyl)ammonium tetra(pentafluorophenyl)borate and triphenylphosphonium tetra(pentafluorophenyl)borate.

The polymerization catalyst of the present invention may further comprise an alkylaluminum represented by the following formula (54) in addition to the above-mentioned auxiliary catalyst (i.e., an organoaluminumoxy compound and/or a cation generator), so as to stabilize the catalyst and the auxiliary catalyst and to reduce the amount of the auxiliary catalyst to be used;

$$(R^{27}_3Al)_q \tag{54}$$

wherein each $R^{27}$ independently represents a hydrogen atom, a halogen atom or a $C_1$–$C_{10}$ alkyl group, and q is 1 or 2.

Examples of $R^{27}$ include a hydrogen atom; a halogen atom, such as a chlorine atom or a bromine atom; an alkyl group, such as a methyl group, an ethyl group, an n-propyl group, an isopropyl group, an n-butyl group, an isobutyl group, a sec-butyl group, a pentyl group, a hexyl group, an octyl group or a decyl group.

The olefin polymerization catalyst of the present invention can be prepared by a method in which components of the catalyst, namely the above-mentioned specific transition metal compound as the main component, at least one auxiliary catalyst selected from an organoaluminumoxy compound and cation generator, and, optionally, an alkylaluminum compound, are added to and dissolved in an inert hydrocarbon solvent or an olefin monomer medium, to obtain a catalyst solution for use in polymerization. The order of adding the components for the catalyst is not particularity limited and can be arbitrarily selected. The transition metal component and the auxiliary catalyst may be mixed with each other prior to addition thereof into the polymerization reaction system, or may be added separately to the polymerization reaction system. Further, the catalyst of the present invention may contain other components capable of effectively catalyzing the olefn polymerization reaction, in addition to the above-mentioned catalyst components. Furthermore, when it is intended to produce a polymer having a multi-modal molecular weight distribution so as to impart the polymer with improved characteristics, a combination of two or more types of transition metal compounds falling in the definition of the transition metal compound of the catalyst of the present invention may be used, or, alternatively, the catalyst of the present invention may be used in combination with conventional catalyst components.

In practice of the olefin polymerization method using the catalyst of the present invention, the transition metal compound of the catalyst of the present invention is used in an amount of from $10^{-8}$ to $10^{-1}$ mole, preferably from $10^{-7}$ to $10^{-3}$ mole, in terms of the amount of the transition metal, per unit volume (liter) of the olefin monomer. The "volume of the olefin monomer" generally means the volume of the olefin monomer as a material. However, in a suspension or solution polymerization in which a solvent is used, the "volume of the olefin monomer" means the total volume of the olefin monomer and the solvent. In a gas phase polymerization in which a diluent gas, which is an inert gas, such as nitrogen or argon, is used in addition to a gaseous olefin

monomer, the "volume of the olefin monomer" means the total volume of the olefin monomer and the diluent gas. However, in a suspension or solution polymerization using a reactor in which a space other than the liquid phase is filled with an inert gas, the volume of the inert gas is not included in the "volume of the olefin monomer".

When the above-mentioned organoaluminumoxy compound is used as an auxiliary catalyst, the organoaluminumoxy compound is used in an amount such that the atomic ratio of the aluminum contained in the organoaluminumoxy compound to the transition metal contained in the catalyst is generally in the range of from 10 to $10^5$, preferably from 50 to $5 \times 10^3$. When the above-mentioned cation generator is employed as an auxiliary catalyst, the cation generator is used in an amount of from 0.5 to 10, preferably from 1 to 3, in terms of the molar ratio of the cation generator to the transition metal compound. Further, when the above-mentioned alkylaluminum is used, the alkylaluminum is used in an amount of from 1 to $10^5$, preferably from 10 to $10^4$, in terms of the atomic ratio of the aluminum contained in the alkylaluminum to the transition metal contained in the transition metal compound.

When, among the transition metal compounds of the catalyst of the present invention, a transition metal compound having 2 or 3 bidentate chelating ligands is used, it is occasionally desirable for obtaining a catalyst having improved polymerization activity that the catalyst comprising the transition metal compound is subjected to a preliminary treatment (described below) prior to the polymerization. Especially when the polymerization temperature is about 90° C. or lower, the preliminary treatment is very effective for improving the polymerization activity. The preliminary treatment is conducted in such a manner as mentioned below: the transition metal compound, the auxiliary catalyst and an olefin are mixed together in an inert hydrocarbon solvent to thereby obtain a mixture, and the obtained mixture is heated and maintained at a high temperature. Examples of inert hydrocarbon solvents used in the preliminary treatment include aliphatic hydrocarbons, such as butane, isobutane, pentane, hexane, octane, decane, dodecane, hexadecane and octadecane; alicyclic hydrocarbons, such as cyclopentane, methylcyclopentane, cyclohexane and cyclooctane; aromatic hydrocarbons, such as benzene, toluene and xylene; petroleum fractions, such as naphtha, coal oil and gas oil. With respect to the molar ratio of the transition metal compound to the auxiliary catalyst in the preliminary treatment, there is no particular limitation as long as the molar ratio is in the same range of molar ratio as used for the polymerization reaction. The olefin used in the preliminary treatment may be either the same olefin as used as an olefin monomer in the polymerization reaction, or an olefin which is other than the olefin monomer used in the polymerization reaction and which has from 2 to 20 carbon atoms. The olefin is used in an amount such that the molar ratio of the olefin to the transition metal compound is in the range of about 10 to $10^3$. The temperature and time of the heat treatment are, respectively, selected from the range of from about 90 to 120° C. and the range of from about 10 to 60 minutes.

In practicing the olefin polymerization using the catalyst of the present invention, there may be employed a customary polymerization method, such as a suspension polymerization method, a solution polymerization method and a gas phase polymerization method.

When a suspension polymerization method or a gas phase polymerization method is employed, the transition metal compound and/or the auxiliary catalyst can be used in such a form as carried on a carrier. Examples of materials for the carrier include an inorganic oxide material, such as silica, alumina, silica-alumina, magnesia, titania or zirconia; an inorganic material, such as magnesium chloride; and an organic material, such as polystyrene, polyethylene, polypropylene or carbon. With respect to the method for having the catalyst carried on a carrier, there is no particular limitation, and a conventional method can be used. When the catalyst carried on a carrier is used, a preliminary polymerization of an olefin may be conducted using such a catalyst prior to the full-scale polymerization of the olefin. It is preferred that the preliminary polymerization is conducted in a scale such that an olefin polymer is obtained in an amount of from 0.05 to 500 g, more preferably 0.1 to 100 g, per gram of the carried catalyst. The use of the transition metal compound and/or the auxiliary catalyst in such a form as carried on a carrier is effective for improving the powder characteristics and bulk density of a polymer produced by a suspension polymerization method or a gas phase polymerization method.

In practicing the solution polymerization method or suspension polymerization method, an inert hydrocarbon solvent or an olefin monomer itself which is subjected to the polymerization can be used as a solvent for the polymerization reaction. Examples of inert hydrocarbon solvents used in the polymerization reaction include aliphatic hydrocarbons, such as butane, isobutane, pentane, hexane, octane, decane, dodecane, hexadecane and octadecane; alicyclic hydrocarbons, such as cyclopentane, methylcyclopentane, cyclohexane and cyclooctane; aromatic hydrocarbons, such as benzene, toluene and xylene; and petroleum fractions, such as naphtha, coal oil and gas oil.

In the suspension polymerization method, the polymerization reaction is carried out at a temperature of from −20 to 100° C., preferably from 20 to 90° C. In the solution polymerization method, the polymerization reaction is carried out at a temperature of from 0 to 300° C., preferably from 100 to 250° C. In the gas phase polymerization method, the polymerization reaction is carried out at a temperature of from 0 to 120° C., preferably from 20 to 100° C.

With respect to the pressure of the polymerization reaction, there is no particular limitation. The polymerization pressure is generally from atmospheric pressure to 300 kg/cm², preferably from atmospheric pressure to 100 kg/cm². The polymerization may be conducted in a batchwise manner, a semi-continuous manner or a continuous manner. Further, it is possible to conduct the polymerization reaction in a two(or more)-stage manner, wherein the reaction conditions in one stage are different from the reaction conditions in the other stage (or stages).

The molecular weight of a polymer produced can be adjusted by customary techniques, such as control of the reaction temperature and addition of hydrogen to the reaction system.

Examples of olefins which can be polymerized by the olefin polymerization methods of the present invention include ethylene; $C_3$–$C_{20}$ olefins, such as propylene, 1-butene, 1-pentene, 1-hexene, 4-methyl-1-pentene, 1-octene, 1-decene, 1-tetradecene, 1-hexadecene, 1-octadecene and 1-eicosene; alicyclic olefins, such as cyclopentene, cycloheptene, norbornene, 5-methyl-2-norbornene and tetracyclododecene. Other compounds having a double bond or double bonds, such as styrene, vinylcyclohexene or 1,5-hexadiene, can also be used as an olefin monomer in the polymerization of the present invention. Further, copolymerization can be conducted between two or more different olefins, e.g., ethylene/propylene, ethylene/1-butene, ethylene/1-hexene, ethylene/1-octene, ethylene/cyclopentene, ethylene/styrene, ethylene/propylene/ethylidenenorbornene, to thereby obtain a copolymer having a low density and a copolymer having a uniform copolymerization distribution (i.e., uniform distribution with respect to the proportions of different component monomer units constituting the copolymer).

BEST MODE FOR CARRYING OUT THE INVENTION

The present invention will now be further illustrated in more detail with reference to the following Examples and Comparative Examples, which should not be construed as limiting the scope of the present invention.

The organic acid salts and hydroxy compounds used as materials for synthesizing the transition metal compounds of the present invention were those which are mentioned below.

Carbamates: commercially available products, or products synthesized by the method described in the literature (for example, "Inorganic Chemistry, 22, 2000 (1983)", "Inorganic Chemistry, 17, 2114 (1978)") or synthesized substantially in accordance with the above method.

Xanthates: commercially available products, or products synthesized by the method described in the literature (for example, "Inorganic Chemistry, 33, 2790 (1994)") or synthesized substantially in accordance with the above method.

Dithiophosphates: commercially available products, or products synthesized by the method described in the literature (for example, "Inorganic Chemistry, 29, 4974 (1990)") or synthesized substantially in accordance with the above method.

Quinolinols: commercially available products, or products synthesized by the method described in the literature (for example, "Zesz. Nauk. Politech. Rzeszowskiej, 3, 63 (1984)") or synthesized substantially in accordance with the above method.

Pyridylmethanols : commercially available products, or products synthesized by the method described in the literature (for example, "Synthetic Communications, 25, 629 (1995)") or synthesized substantially in accordance with the above method.

Aminoethanols: commercially available products, or products synthesized by the method described in the literature (for example, "Journal of Chemical Society, 3623 (1953)", and "Synthetic Communications, 14, 1213 (1984)") or synthesized substantially in accordance with the above method.

With respect to the metallocenes and transition metal compounds as materials for synthesizing the transition metal compounds characteristic of the present invention, commercially available products, or products obtained by conventional methods in the art were used.

In each of the Examples and Comparative Examples, the catalyst was synthesized and isolated in a nitrogen atmosphere by the Schlenk's method or in a gloved box. The materials and the synthesized transition metal compounds were identified by elemental analysis and $^1$H-NMR.

The molecular weight and molecular weight distribution of a homopolymer or a copolymer obtained by the polymerization or copolymerization reaction were obtained, by gel permeation chromatography (GPC) (detection: differential refractive index) (apparatus: 150CV manufactured and sold by Waters Assoc. Co., U.S.A.). The comonomer distribution in a copolymer obtained by the copolymerization reaction was obtained using a Fourier transform infrared (FT-IR) spectrophotometer (M550, manufactured and sold by Nicolet Instrument Co., U.S.A.) which is connected to the above GPC apparatus.

In the chemical formulae described in the Examples and Comparative Examples, Me, Et, iPr, Bu, Ph and Cp represent methyl, ethyl, isopropyl, butyl, phenyl and a group having a cyclopentadienyl skeleton, respectively.

Cp* and Me$_3$SiCp* represent (CH$_3$)$_5$Cp and (Me$_3$Si)Me$_4$Cp, respectively.

$\overline{Mw}$ represents a weight average molecular weight, and $\overline{Mn}$ represents a number average molecular weight.

Synthesis 1 of Catalyst

Example 1

Synthesis of (Pentamethylcyclopentadienyl)Tris(Dimethyldithiocarbamato)Zirconium [Cp*Zr(S$_2$CNMe$_2$)$_3$] (Catalyst 1)

Into a 100 ml glass reactor which had been fully purged with nitrogen gas were charged 2.0 g of (pentamethylcyclopentadienyl)zirconium trichloride and 2.6 g of sodium dimethyldithiocarbamate, followed by mixing to obtain a mixture. 50 ml of methylene chloride was added to the mixture, and the resultant mixture was stirred at room temperature for 12 hours to effect a reaction. The resultant reaction mixture was filtered to obtain a filtrate, and the obtained filtrate was subjected to distillation to obtain a solid. The obtained solid was recrystallized from methylene chloride and then dried under reduced pressure. As a result, 2.8 g of a white solid was obtained (yield: 79%). The results of the measurement by $^1$H-NMR spectroscopy (δ: ppm, solvent: deuteriochloroform) and elemental analysis of the product were as follows.

δ 1.9 (s, 15H), 3.3 (m, 18H) C, 38.4; H, 5.4; N, 7.5; S, 33.6; Zr, 15.1; (wt %)

Example 2

Synthesis of (n-Butylcyclopentadienyl)Tris(di-Isopropyldithiocarbamato)Zirconium [(nBuCp)Zr(S$_2$CNiPr$_2$)$_3$] (Catalyst 2)

Into a 100 ml glass reactor which had been fully purged with nitrogen gas were charged 2.0 g of bis(n-butylcyclopentadienyl)zirconium dichloride and 3.0 g of sodium di-isopropyldithiocarbamate, followed by mixing. 50 ml of methylene chloride was added, and the resultant mixture was stirred at room temperature for 18 hours to effect a reaction. The resultant reaction mixture was filtered to obtain a filtrate, and the obtained filtrate was subjected to distillation to obtain a solid. The obtained solid was recrystallized from methylene chloride and then dried under reduced pressure. As a result, 2.7 g of a white solid was obtained (yield: 75%). The results of elemental analysis of the product were as follows.

C, 48.1; H, 7.3; N, 5.4; S, 26.6; Zr, 12.6; (wt %)

Example 3

Synthesis of (Pentamethylcyclopentadienyl)(di-Methyldithiocarbamato)Dichlorozirconium [Cp*Zr(S$_2$CNMe$_2$)Cl$_2$] (Catalyst 3)

Into a 100 ml glass reactor which had been fully purged with nitrogen gas were charged 2.0 g of (pentamethylcyclopentadienyl)zirconium trichloride and 0.9 g of sodium dimethyldithiocarbamate, followed by mixing. 50 ml of methylene chloride was added to the mixture, and the resultant mixture was stirred at room temperature for 12 hours to effect a reaction. The resultant reaction mixture was filtered to obtain a filtrate, and the obtained filtrate was subjected to distillation to obtain a solid. The obtained solid was recrystallized from methylene chloride and then dried under reduced pressure. As a result, 1.8 g of a yellow solid was obtained (yield: 72%). The results of elemental analysis of the product were as follows.

C, 37.0; H, 5.3; N, 3.7; S, 15.5; Zr, 21.6; (wt %)

Example 4

Synthesis of (1,2,4-Trimethylcyclopentadienyl)Tris (Dibenzyldithiocarbamato)Zirconium [(1,2,4-$Me_3Cp$)Zr$\{S_2CN(CH_2Ph)_2\}_3$] (Catalyst 4)

Into a 100 ml glass reactor which had been fully purged with nitrogen gas were charged 2.0 g of (1,2,4-trimethylcyclopentadienyl)zirconium trichloride and 4.7 g of sodium dibenzyldithiocarbamate, followed by mixing. 50 ml of methylene chloride was added and the resultant mixture was stirred at room temperature for 18 hours to thereby effect a reaction. The reaction mixture was filtered to obtain a filtrate, and the obtained filtrate was subjected to distillation to obtain a solid. The obtained solid was recrystallized from a methylene chloride and then dried under reduced pressure. As a result, 4.3 g of a white solid was obtained (yield: 80%). The results of elemental analysis of the product were as follows.

C, 62.8; H, 5.0; N, 4.5; S, 18.5; Zr, 9.2; (wt %)

Example 5

Synthesis of (Cyclopentadienyl)Tris (Dimethyldithiocarbamato)Titanium [CpTi ($S_2CNMe_2$)$_3$] (Catalyst 5)

Into a 100 ml glass reactor which had been fully purged with nitrogen gas were charged 2.0 g of bis (cyclopentadienyl)titanium dichloride, 2.3 g of sodium dimethyldithiocarbamate and 1.0 g of tetramethylthiuram disulfide, followed by mixing. 50 ml of tetrahydrofuran was added and the resultant mixture was stirred at room temperature for 6 hours to thereby effect a reaction. The resultant reaction mixture was filtered to obtain a filtrate, and the obtained filtrate was subjected to distillation to obtain a solid. The obtained solid was recrystallized from methylene chloride and then dried under reduced pressure. As a result, 2.5 g of a yellow solid was obtained (yield: 65%). The results of elemental analysis of the product were as follows.

C, 36.0; H, 5.3; N, 8.9; S, 40.1; Ti, 9.7; (wt %)

Example 6

Synthesis of (Indenyl)Tris(di-n-Butyldiselenocarbamato)Zirconium [(Ind)Zr ($Se_2CNnBu_2$)$_3$] (Catalyst 6)

Into a 100 ml glass reactor which had been fully purged with nitrogen gas were charged 2.0 g of bis(indenyl) zirconium dichloride and 4.3 g of sodium di-n-butyldiselenocarbamate, followed by mixing. 50 ml of methylene chloride was added and the resultant mixture was stirred at room temperature for 18 hours to thereby effect a reaction. The resultant reaction mixture was filtered to obtain a filtrate, and the obtained filtrate was subjected to distillation to obtain a solid. The obtained solid was recrystallized from methylene chloride and then dried under reduced pressure. As a result, 2.7 g of a yellow solid was obtained (yield: 55%). The results of elemental analysis of the product were as follows.

C, 39.0; H, 5.6; N, 3.6; S, 42.8; Zr, 9.0; (wt %)

Example 7

Synthesis of (Cyclopentadienyl)Tris (Diethyldithiocarbamato)Zirconium [CpZr ($S_2CNEt_2$)$_3$] (Catalyst 7)

Into a 100 ml glass reactor which had been fully purged with nitrogen gas were charged 2.0 g of bis (cyclopentadienyl)zirconium dichloride and 5.3 g of silver diethyldithiocarbamate, followed by mixing. 50 ml of methylene chloride was added and the resultant mixture was stirred at room temperature for 18 hours to thereby effect a reaction. The resultant reaction mixture was filtered to obtain a filtrate, and the obtained filtrate was subjected to distillation to obtain a solid. The obtained solid was recrystallized from methylene chloride and then dried under reduced pressure. As a result, 3.2 g of a white solid was obtained (yield: 78%). The results of elemental analysis of the product were as follows.

C, 39.8; H, 6.1; N, 7.3; S, 31.0; Zr, 15.8; (wt %)

Example 8

Synthesis of (Pentamethylcyclopentadienyl)Tris (Dimethylmonothiocarbamato)Zirconium [Cp*Zr (SOCNMe$_2$)$_3$] (Catalyst 8)

Into a 100 ml glass reactor which had been fully purged with nitrogen gas were charged 2.0 g of (pentamethylcyclopentadienyl)zirconium trichloride and 2.3 g of sodium dimethylmonothiocarbamate, followed by mixing. 50 ml of methylene chloride was added and the resultant mixture was stirred at room temperature for 12 hours to effect a reaction. The resultant reaction mixture was filtered to obtain a filtrate, and the obtained filtrate was subjected to distillation to obtain a solid. The obtained solid was recrystallized from methylene chloride and then dried under reduced pressure. As a result, 2.6 g of a yellow solid was obtained (yield: 79%). The results of elemental analysis of the product were as follows.

C, 41.3; H, 6.6; N, 7.9; S, 17.8; Zr, 16.4; (wt %)

Example 9

Synthesis of (Trimethylsilyltetramethylcyclopentadienyl) (Pyrrolidinodithiocarbamato)Diphenoxyzirconium [(Me$_3$SiCp*)Zr(S$_2$CNC$_4$H$_8$)(OPh)$_2$] (Catalyst 9)

Into a 100 ml glass reactor which had been fully purged with nitrogen gas was charged 50 ml of diethyl ether. 2.0 g of (trimethylsilyltetramethylcyclopentadienyl)zirconium trichloride was dissolved in the diethyl ether to obtain a solution. To the solution was added 15.3 ml of a diethyl ether solution of lithium phenoxide (lithium phenoxide concentration: 1 mole/liter) to obtain a mixture, and the resultant mixture was stirred at room temperature for 6 hours to effect a reaction. The resultant reaction mixture was subjected to distillation to obtain a solid. The obtained solid was dissolved in toluene to obtain a solution, and the solution was filtered to obtain a filtrate. The obtained filtrate was subjected to distillation to obtain a solid. As a result, (trimethylsilyltetramethylcyclopentadienyl)zirconium triphenoxide was obtained. The obtained solid as such was used for the subsequent reaction.

Into a 100 ml glass reactor which had been fully purged with nitrogen gas were charged the above-obtained (trimethylsilyltetramethylcyclopentadienyl)zirconium triphenoxide and 0.9 g of sodium pyrrolidinodithiocarbamate, followed by mixing. 50 ml of methylene chloride was added and the resultant mixture was stirred at room temperature for 12 hours to effect a reaction. The resultant reaction mixture was filtered to obtain a filtrate, and the obtained filtrate was subjected to distillation to obtain a solid. The obtained solid was recrystallized from methylene chloride and then dried under reduced pressure. As a result, 1.7 g of a yellow solid was obtained (yield: 55%). The results of elemental analysis of the product were as follows. C, 56.6; H, 6.1; N, 2.7; S, 10.5; Zr, 14.8 (wt %)

Example 10

Synthesis of (cyclopentadienyl)tris(dimethyldithiocarbamato)hafnium [CpHf(S$_2$CNMe$_2$)$_3$] (catalyst 10)

Into a 100 ml glass reactor which had been fully purged with nitrogen gas were charged 2.0 g of bis(cyclopentadienyl)hafnium dichloride and 2.3 g of sodium dimethyldithiocarbamate, followed by mixing. 50 ml of methylene chloride was added and the resultant mixture was stirred at room temperature for 18 hours to effect a reaction. The resultant reaction mixture was filtered to obtain a filtrate, and the obtained filtrate was subjected to distillation to obtain a solid. The obtained solid was recrystallized from methylene chloride and then dried under reduced pressure. As a result, 2.4 g of a white solid was obtained (yield: 76%). The results of elemental analysis of the product were as follows. C, 27.2; H, 3.9; N, 7.1; S, 31.9; Hf, 29.9 (wt %).

Example 11

Synthesis of (1,3-dimethylcyclopentadienyl)tris-(dicyclohexylditellurocarbamato)zirconium [(1,3-Me$_2$Cp)Zr{Te$_2$CN(C$_6$H$_{11}$)$_2$}$_3$] (catalyst 11)

Into a 100 ml glass reactor which had been fully purged with nitrogen gas were charged 2.0 g of (1,3-dimethylcyclopentadienyl)zirconium trichloride and 8.1 g of sodium dicyclohexylditellurocarbamate, followed by mixing. 50 ml of methylene chloride was added and the resultant mixture was stirred at room temperature for 18 hours to effect a reaction. The resultant reaction mixture was filtered to obtain a filtrate, and the obtained filtrate was subjected to distillation to obtain a solid. The obtained filtrate was recrystallized from methylene chloride and then dried under reduced pressure. As a result, 5.6 g of a yellow solid was obtained (yield: 64%). The results of elemental analysis of the product were as follows. C, 36.7; H, 5.2; N, 2.5; S, 49.0; Zr, 6.6 (wt %)

Polymerization reaction 1

Example 12

Into a 1.6-liter autoclave which had been evacuated and fully purged with nitrogen gas, a 5 ml toluene solution containing 0.5 μmole of catalyst 1 [Cp*Zr(S$_2$CNMe$_2$)$_3$] and 5 ml of a toluene solution of MMAO (methylaluminoxane, manufactured and sold by Tosoh Akzo Corp., Japan) were charged together with 0.6 liter of dehydrated and deoxidated toluene, wherein the MMAO concentration of the toluene solution of MMAO was 0.1 mole/liter in terms of the amount of aluminum and, accordingly, 5 ml of the toluene solution contained MMAO in an amount of 0.5 mmole in terms of the amount of aluminum. The temperature of the inside of the autoclave was maintained at 80° C. and then, ethylene gas was charged into the autoclave at a pressure of 10 kg/cm$^2$·G. A polymerization reaction was allowed to proceed for 1 hour, while supplying ethylene gas to maintain the total pressure in the autoclave at a constant level. 32.6 g of a polymer was obtained. It was found that the $\overline{Mw}$ of the polymer was 565,000 and the $\overline{Mw}/\overline{Mn}$ was 2.56.

Example 13

A polymerization reaction was conducted in substantially the same manner as in Example 12 except that use was made of catalyst 2 [(nBuCp)Zr(S$_2$CNiPr$_2$)$_3$] instead of catalyst 1. 26.5 g of a polymer was obtained. It was found that the $\overline{Mw}$ of the polymer was 643,000 and the $\overline{Mw}/\overline{Mn}$ was 2.41.

Example 14

A polymerization reaction was conducted in substantially the same manner as in Example 12 except that use was made of catalyst 3 [(Cp*Zr(S$_2$CNMe$_2$)Cl$_2$]. 29.3 g of a polymer was obtained. It was found that the $\overline{Mw}$ of the polymer was 525,000 and the $\overline{Mw}/\overline{Mn}$ was 2.30.

Example 15

In a 100 ml glass reactor which had been fully purged with nitrogen gas, a 10 ml toluene solution containing 1 μmole of catalyst 4 [(1,2,4-Me$_3$Cp)Zr{S$_2$CN(CH$_2$Ph)$_2$}$_3$], 10 ml of a toluene solution of MMAO (methylaluminoxane, manufactured and sold by Tosoh Akzo Corp., Japan) and 1 ml of octene were mixed, wherein the MMAO concentration of the toluene solution of MMAO was 0.1 mole/liter in terms of the amount of aluminum and, accordingly, 10 ml of the toluene solution contained MMAO in an amount of 1 mmole in terms of the amount of aluminum. The temperature of the inside of the reactor was maintained at 100° C. for 30 minutes while stirring, to thereby obtain a toluene solution of a final olefin polymerization catalyst composition.

10.5 ml of the above-obtained toluene solution of the catalyst composition was charged together with 0.6 liter of dehydrated and deoxidated toluene into a 1.6-liter autoclave which had been evacuated and fully purged with nitrogen gas. The temperature of the inside of the autoclave was maintained at 80° C. and then, ethylene gas was charged into the autoclave at a pressure of 10 kg/cm$^2$·G. A polymerization reaction was allowed to proceed for 1 hour, while supplying ethylene gas to maintain the total pressure in the autoclave at a constant level. 28.3 g of a polymer was obtained. It was found that the $\overline{Mw}$ of the polymer was 452,000 and the $\overline{Mw}/\overline{Mn}$ was 2.86.

Example 16

A polymerization reaction was conducted in substantially the same manner as in Example 15 except that use was made of catalyst 5 [CpTi(S$_2$CNMe$_2$)$_3$] instead of catalyst 4. 24.1 g of a polymer was obtained. It was found that the $\overline{Mw}$ of the polymer was 433,000 and the $\overline{Mw}/\overline{Mn}$ was 2.95.

Example 17

In a 100 ml glass reactor which had been fully purged with nitrogen gas, a 10 ml toluene solution containing 1 μmole of catalyst 6 [(Ind)Zr(Se$_2$CNnBu$_2$)$_3$], a 10 ml toluene solution containing 1 mmole of tri-isobutylaluminum and a 10 ml toluene solution containing 2 μmole of tris (pentafluorophenyl)borane were mixed. The temperature of the inside of the reactor was maintained at 120° C. for 10 minutes while stirring, to thereby obtain a toluene solution of a final olefin polymerization catalyst composition.

15 ml of the above-obtained toluene solution of the catalyst composition was charged together with 0.6 liter of dehydrated and deoxidated toluene into a 1.6-liter autoclave which had been evacuated and fully purged with nitrogen gas. The temperature of the inside of the autoclave was maintained at 80° C. and then, ethylene gas was charged into the autoclave at a pressure of 10 kg/cm$^2$•G. A polymerization reaction was allowed to proceed for 1 hour, while supplying ethylene gas to maintain the total pressure in the autoclave at a constant level. 26.0 g of a polymer was obtained. It was found that the $\overline{Mw}$ of the polymer was 581,000 and the $\overline{Mw}/\overline{Mn}$ was 2.77.

Example 18

Into a 1.6-liter autoclave which had been evacuated and fully purged with nitrogen gas were charged a 5 ml toluene solution containing 0.5 μmole of catalyst 7 [CpZr(S$_2$CNEt$_2$)$_3$], 5 ml of a toluene solution of MMAO (methylaluminoxane, manufactured and sold by Tosoh Akzo Corp., Japan) and 0.5 liter of dehydrated and deoxidated toluene, followed by mixing, wherein the MMAO concentration of the toluene solution of MMAO was 0.1 mole/liter in terms of the amount of aluminum and, accordingly, 5 ml of the toluene solution contained MMAO in an amount of 0.5 mmole in terms of the amount of aluminum. 100 ml of 1-hexene was charged into the autoclave, and the temperature of the inside of the autoclave was maintained at 120° C. Ethylene gas was charged into the autoclave at a pressure of 20 kg/cm$^2$•G. A polymerization reaction was allowed to proceed for 1 hour, while supplying ethylene gas to maintain the total pressure in the autoclave at a constant level. 35.1 g of a polymer was obtained. It was found that the $\overline{Mw}$ of the polymer was 421,000 and the $\overline{Mw}/\overline{Mn}$ was 2.81. The obtained polymer had a density of 0.915 g/cm$^3$. The measurement of the comonomer distribution of the polymer by GPC-(FT-IR) showed that 1-hexene was distributed uniformly from the low molecular region to the high molecular region in the molecular weight distribution of the obtained polymer.

Example 19

A polymerization reaction was conducted in substantially the same manner as in Example 18 except that use was made of catalyst 8 [Cp*Zr(SOCNMe$_2$)$_3$] instead of catalyst 7. 34.6 g of a polymer was obtained. It was found that the $\overline{Mw}$ of the polymer was 435,000, the $\overline{Mw}/\overline{Mn}$ was 2.71 and the density was 0.926 g/cm$^3$.

Example 20

A polymerization reaction was conducted in substantially the same manner as in Example 18 except that use was made of catalyst 9 [(Me$_3$SiCp*)Zr(S$_2$CNC$_4$H$_8$)(OPh)$_2$]. 37.3 g of a polymer was obtained. It was found that the $\overline{Mw}$ of the polymer was 403,000, the $\overline{Mw}/\overline{Mn}$ was 2.47 and the density was 0.929 g/cm$^3$.

Example 21

A polymerization reaction was conducted in substantially the same manner as in Example 18 except that use was made of catalyst 10 [CpHf(S$_2$CNMe$_2$)$_3$]. 27.5 g of a polymer was obtained. It was found that the $\overline{Mw}$ of the polymer was 410,000, the $\overline{Mw}/\overline{Mn}$ was 3.03 and the density was 0.920 g/cm$^3$.

Example 22

Into a 100 ml glass reactor which had been fully purged with nitrogen gas were charged a 10 ml toluene solution containing 1 μmole of catalyst 11 [(1,3-Me$_2$Cp)Zr{Te$_2$CN (C$_6$H$_{11}$)$_2$}$_3$], a 10 ml toluene solution containing 1 mmole of tri-isobutylaluminum and a 10 ml toluene solution containing 2 μmole of triphenylcarbonium-tetrakis (pentafluorophenyl)borate, followed by mixing. The temperature of the inside of the reactor was maintained at 30° C. for 10 minutes while stirring, to thereby obtain a toluene solution of a final olefin polymerization catalyst composition.

15 ml of the above-obtained toluene solution of the catalyst composition was charged together with 0.5 liter of dehydrated and deoxidated toluene into a 1.6-liter autoclave which had been evacuated and purged with nitrogen gas. 100 ml of 1-hexene was charged into the autoclave, and the temperature of the inside of the autoclave was maintained at 80° C. Ethylene gas was charged into the autoclave at a pressure of 10 kg/cm$^2$•G. A polymerization reaction was allowed to proceed for 1 hour, while supplying ethylene gas to maintain the total pressure in the autoclave at a constant level. 26.0 g of a polymer was obtained. It was found that the $\overline{Mw}$ of the polymer was 581,000 and the $\overline{Mw}/\overline{Mn}$ was 2.77.

Comparative Example 1

Using comparative catalyst [CpZr(CH$_3$COCH$_2$COCH$_3$)$_2$Cl] which was synthesized according to the method disclosed in Unexamined Japanese Patent Application Laid-Open Specification No. 5-170820, a polymerization reaction was conducted in substantially the same manner as in Example 18. 5.5 g of a polymer was obtained. It was found that the $\overline{Mw}$ of the polymer was 344,000, the $\overline{Mw}/\overline{Mn}$ was 2.35 and the density was 0.925 g/cm$^3$.

Comparative Example 2

Using comparative catalyst [Cp*Zr{(NSiMe$_3$)$_2$CPh} (CH$_2$Ph)$_2$] which had been synthesized according to the method described in "J. Chem. Soc., Chem. Commun., 18, 1415–1417 (1993)", a polymerization reaction was conducted in substantially the same manner as in Example 18. 3.4 g of a polymer was obtained. It was found that the $\overline{Mw}$ of the polymer was 67,000, the $\overline{Mw}/\overline{Mn}$ was 4.35 and the density was 0.931 g/cm$^3$.

From comparison between Examples and Comparative Examples 1 and 2, it is apparent that the catalyst containing the transition metal compound characteristic of the present invention as a main catalyst component exhibits significantly high catalytic activity for an olefin polymerization as compared to the conventional olefin polymerization catalysts.

Synthesis 2 of catalyst

Example 23

Synthesis of (cyclopentadienyl)tris(O-ethyldithiocarbonato)zirconium [CpZr(S$_2$COEt)$_3$] (catalyst 12)

Into a 100 ml glass reactor which had been fully purged with nitrogen gas were charged 2.0 g of bis (cyclopentadienyl)zirconium dichloride and 3.0 g of sodium xanthate followed by mixing to obtain a mixture. 50 ml of methylene chloride was added to the mixture, and the resultant mixture was stirred at room temperature for 18 hours to effect a reaction. The resultant reaction mixture was filtered to obtain a filtrate, and the obtained filtrate was subjected to distillation to obtain a solid. The obtained solid was recrystallized from methylene chloride and then dried under reduced pressure. As a result, 2.2 g of a white solid was obtained (yield: 63%). The results of the measurement by $^1$H-NMR spectroscopy ($\delta$: ppm, solvent: deuteriochloroform) and elemental analysis of the product were as follows.

$\delta$1.4 (t, 3H), 1.5 (t, 6H), 4.5 (q, 2H), 4.6 (q,4H), 6.1(s, 5H). C, 32.0; H, 3.7; S, 37.8; Zr, 17.5 (wt %)

Example 24

Synthesis of (pentamethylcyclopentadienyl) (O-ethyldithiocarbonato)dichlorozirconium [Cp*Zr(S$_2$COEt)Cl$_2$] (catalyst 13)

Into a 100 ml glass reactor which had been fully purged with nitrogen gas were charged 2.0 g of (pentamethylcyclopentadienyl)zirconium trichloride and 1.0 g of potassium xanthate followed by mixing to obtain a mixture. 50 ml of methylene chloride was added to the mixture, and the resultant mixture was stirred at room temperature for 12 hours to effect a reaction. The resultant reaction mixture was filtered to obtain a filtrate, and the obtained filtrate was subjected to distillation to obtain a solid. The obtained solid was recrystallized from methylene chloride and then dried under reduced pressure. As a result, 0.88 g of a yellow solid was obtained (yield: 35%). The results of elemental analysis of the product were as follows. C, 37.4; H, 4.9; S, 15.4; Zr, 21.6 (wt %)

Example 25

Synthesis of (indenyl)tris(S-ethyltrithiocarbonato)zirconium [(Ind)Zr(S$_2$CSEt)$_3$] (catalyst 14)

Into a 100 ml glass reactor which had been fully purged with nitrogen gas were charged 2.0 g of bis (indenyl) zirconium dichloride and 2.1 g of sodium S-ethyltrithiocarbonate followed by mixing. 50 ml of methylene chloride was added and the resultant mixture was stirred at room temperature for 18 hours to effect a reaction. The resultant reaction mixture was filtered to obtain a filtrate, and the obtained filtrate was subjected to distillation to obtain a solid. The obtained solid was recrystallized from methylene chloride and then dried under reduced pressure. As a result, 1.3 g of a white solid was obtained (yield: 48%). The results of elemental analysis of the obtained product were as follows. C, 35.5; H, 3.8; S, 46.2; Zr, 14.9 (wt %)

Example 26

Synthesis of (pentamethylcyclopentadienyl)tris(O-cyclohexyldithiocarbonato)titanium [Cp*Ti(S$_2$COC$_6$H$_{11}$)$_3$] (catalyst 15)

Into a 100 ml glass reactor which had been fully purged with nitrogen gas were charged 2.0 g of (pentamethylcyclopentadienyl)titanium trichloride and 4.4 g of potassium O-cyclohexyldithiocarbonate followed by mixing, 50 ml of methylene chloride was added and the resultant mixture was stirred at room temperature for 12 hours to effect a reaction. The resultant reaction mixture was filtered to obtain a filtrate, and the obtained filtrate was subjected to distillation to obtain a solid. The obtained solid was recrystallized from methylene chloride and then dried under reduced pressure. As a result, 2.7 g of a yellow solid was obtained (yield: 55%). The results of elemental analysis of the obtained product were as follows. C, 51.5; H, 6.5; S, 27.3; Ti, 6.9 (wt %)

Example 27

Synthesis of (trimethylsilyltetramethylcyclopentadienyl)tris(O-n-butylditellurocarbonato)zirconium [(Me$_3$SiMe$_4$Cp)Zr(Te$_2$COnBu)$_3$] (catalyst 16)

Into a 100 ml glass reactor which had been fully purged with nitrogen gas were charged 2.0 g of (trimethylsilyltetramethylcyclopentadienyl)zirconium trichloride and 5.6 g of sodium O-n-butylditerullocarbonate, followed by mixing. 50 ml of methylene chloride was added and the resultant mixture was stirred at room temperature for 12 hours to effect a reaction. The resultant reaction mixture was filtered to obtain a filtrate, and the obtained filtrate was subjected to distillation to obtain a solid. The obtained solid was recrystallized from methylene chloride and then dried under reduced pressure. As a result, 2.7 g of a yellow solid was obtained (yield: 40%). The results of elemental analysis of the product were as follows. C, 25.3; H, 3.6; Zr, 6.6 (wt %)

Example 28

Synthesis of (1,2,4-trimethylcyclopentadienyl)tris(O-p-tolylthiocarbonato)zirconium [(1,2,4-Me$_3$Cp)Zr{S$_2$CO(C$_6$H$_4$Me)}$_3$]

Into a 100 ml glass reactor which had been fully purged with nitrogen gas were charged 2.0 g of (1,2,4-trimethylcyclopentadienyl)zirconium trichloride and 3.3 g of sodium O-p-tolyldithiocarbonate, followed by mixing. 50 ml of methylene chloride was added and the resultant mixture was stirred at room temperature for 18 hours to effect a reaction. The resultant reaction mixture was filtered to obtain a filtrate, and the obtained filtrate was subjected to distillation to obtain a solid. The obtained solid was recrystallized from methylene chloride and then dried under reduced pressure. As a result, 1.3 g of a white solid was obtained (yield: 56%). The results of elemental analysis of the obtained product were as follows. C, 50.6; H, 4.0; S, 25.8; Zr, 12.6 (wt %)

Example 29

Synthesis of (pentamethylcyclopentadienyl)[O-(1-propenyl)dithiocarbonato]dimethoxyzirconium [Cp*Zr(S$_2$COCH=CHCH$_3$)(OMe)$_2$] (catalyst 18)

Into a 100 ml glass reactor which had been fully purged with nitrogen gas was charged 50 ml of diethyl ether and 2.0 g of (pentamethylcyclopentadienyl)zirconium trichloride was dissolved in the diethyl ether to obtain a solution. To the obtained solution was added 18.0 ml of a diethyl ether solution of lithium methoxide (lithium methoxide concentration: 1 mole/liter) to obtain a mixture, and the resultant mixture was stirred at room temperature for 6 hours to effect a reaction. The resultant reaction mixture was filtered to obtain a filtrate and the obtained filtrate was subjected to distillation to obtain a solid. The obtained solid was dissolved in toluene to obtain a solution, and the toluene was filtered to obtain a filtrate. The obtained filtrate was subjected to distillation to obtain a solid. As a result, (pentamethylcyclopentadienyl) zirconium trimethoxide was obtained. The obtained solid as such was used for the subsequent reaction.

Into a 100 ml glass reactor which had been fully purged with nitrogen gas were charged the above-obtained (pentamethylcyclopentadienyl)zirconium tri-methoxide and 1.0 g of sodium 1-propenyldithiocarbonate, followed by mixing to obtain a mixture. 50 ml of methylene chloride was added to the mixture, and the resultant mixture was stirred at room temperature for 12 hours to effect a reaction. The resultant reaction mixture was filtered to obtain a filtrate, and the obtained filtrate was subjected to distillation to obtain a solid. The obtained solid was recrystallized from methylene chloride and then dried under reduced pressure. As a result, 0.6 g of a yellow solids were obtained (yield: 24%). The results of elemental analysis of the product were as follows. C, 46.5; H, 6.4; S, 14.8; Zr, 21.4 (wt %)

Example 30

Synthesis of (1,3-dimethylcyclopentadienyl)tris (O-benzyldithiocarbonato)zirconium [(1,3-Me$_2$Cp)Zr(S$_2$COCH$_2$Ph)$_3$] (catalyst 19)

Into a 100 ml glass reactor which had been fully purged with nitrogen gas were charged 2.0 g of bis(1,3-dimethylcyclopentadienyl)zirconium dichloride and 3.3 g of sodium O-benzyldithiocarbonate, followed by mixing. 50 ml of methylene chloride was added and the resultant mixture was stirred at room temperature for 18 hours to effect a reaction. The resultant reaction mixture was filtered to obtain a filtrate, and the obtained filtrate was subjected to distillation to obtain a solid. The obtained solid was recrystallized from methylene chloride and then dried under reduced pressure. As a result, 2.1 g of a white solid was obtained (yield: 49%). The results of elemental analysis of the product were as follows. C, 50.8; H, 4.5; S, 25.8; Zr, 12.3 (wt %)

Example 31

Synthesis of(cyclopentadienyl)tris(O-ethyldithiocarbonato)hafnium [CpHf(S$_2$COEt)$_3$] (catalyst 20)

Into a 100 ml glass reactor which had been fully purged with nitrogen gas were charged 2.0 g of bis(cyclopentadienyl)hafnium dichloride and 2.3 g of sodium xanthate, followed by mixing. 50 ml of methylene chloride was added and the resultant mixture was stirred at room temperature for 18 hours to effect a reaction. The resultant reaction mixture was filtered to obtain a filtrate, and the obtained filtrate was subjected to distillation to obtain a solid. The obtained solid were recrystallized from methylene chloride and then dried under reduced pressure. As a result, 1.3 g of a white solids were obtained (yield: 41%). The results of elemental analysis of the product were as follows. C, 27.4; H, 3.4; S, 32.1; Hf, 29.0 (wt %)

Example 32

Synthesis of (n-butylcyclopentadienyl)tris (O-isopropyldiselenocarbonato)zirconium [(nBuCp)—Zr(Se$_2$COiPr)$_3$] (catalyst 21)

Into a 100 ml glass reactor which had been fully purged with nitrogen gas were charged 2.0 g of bis(n-butylcyclopentadienyl)zirconium dichloride and 3.7 g of sodium O-isopropyldiselenocarbonate, followed by mixing. 50 ml of methylene chloride was added and the resultant mixture was stirred at room temperature for 18 hours to effect a reaction. The resultant reaction mixture was filtered to obtain a filtrate, and the obtained filtrate was subjected to distillation to obtain a solid. The obtained solid was recrystallized from methylene chloride and then dried under reduced pressure. As a result, 1.6 g of a yellow solid was obtained (yield: 36%). The results of elemental analysis of the product were as follows. C, 27.6; H, 3.5; S, 53.0; Zr, 10.0 (wt %)

Polymerization reaction 2

Example 33

Into a 1.6-liter autoclave which had been evacuated and fully purged with nitrogen gas, a 5 ml toluene solution containing 0.5 μmole of catalyst 12 [CpZr(S$_2$COEt)$_3$] and 5 ml of a toluene solution of MMAO (methylaluminoxane, manufactured and sold by Tosoh Akzo Corp., Japan) were charged together with 0.6 liter of dehydrated and deoxidated toluene, wherein the MMAO concentration of the toluene solution of MMAO was 0.1 mole/liter in terms of the amount of aluminum and, accordingly, 5 ml of the toluene solution contained MMAO in an amount of 0.5 mmole in terms of the amount of aluminum. The temperature of the inside of the autoclave was maintained at 80° C. and then, ethylene gas was charged into the autoclave at a pressure of 10 kg/cm$^2$•G. A polymerization reaction was allowed to proceed for 1 hour, while supplying ethylene gas to maintain the total pressure in the autoclave at a constant level. 40.3 g of a polymer was obtained. It was found that the $\overline{Mw}$ of the polymer was 495,000 and the $\overline{Mw}/\overline{Mn}$ was 2.83.

Example 34

A polymerization reaction was conducted in substantially the same manner as in Example 33 except that use was made of catalyst 13 [Cp*Zr(S$_2$COEt)Cl$_2$] instead of catalyst 12. 36.2 g of a polymer was obtained. It was found that the $\overline{Mw}$ of the polymer was 611,000 and the $\overline{Mw}/\overline{Mn}$ was 2.71.

Example 35

In a 100 ml glass reactor which had been fully purged with nitrogen gas, a 10 ml toluene solution containing 1 μmole of catalyst 14 [(Ind)Zr(S$_2$CSEt)$_3$], 10 ml of a toluene solution of MMAO (methylaluminoxane, manufactured and sold by Tosoh Akzo Corp., Japan) and 1 ml of octene were mixed, wherein the MMAO concentration of the toluene solution of MMAO was 0.1 mole/liter in terms of the amount of aluminum and, accordingly, 10 ml of the toluene solution contained MMAO in an amount of 1 mmole in terms of the amount of aluminum. The temperature of the inside of the reactor was maintained at 100° C. for 30 minutes while stirring, to thereby obtain a toluene solution of a final olefin polymerization catalyst composition.

10.5 ml of the above-obtained toluene solution of the catalyst composition was charged together with 0.6 liter of dehydrated and deoxidated toluene into a 1.6-liter autoclave which had been evacuated and fully purged with nitrogen gas. The temperature of the inside of the autoclave was maintained at 80° C. and then, ethylene gas was charged into the autoclave at a pressure of 10 kg/cm$^2$•G. A polymerization reaction was allowed to proceed for 1 hour, while supplying ethylene gas to maintain the total pressure in the autoclave at a constant level. 41.6 g of a polymer was obtained. It was found that the $\overline{\text{Mw}}$ of the polymer was 531,000 and the $\overline{\text{Mw}}/\overline{\text{Mn}}$ was 3.16.

Example 36

A polymerization reaction was conducted in substantially the same manner as in Example 35 except that use was made of catalyst 15 [Cp*Ti(S$_2$COC$_6$H$_{11}$)$_3$] instead of catalyst 14. 29.4 g of a polymer was obtained. It was found that the $\overline{\text{Mw}}$ of the polymer was 399,000 and the $\overline{\text{Mw}}/\overline{\text{Mn}}$ was 3.01.

Example 37

In a 100 ml glass reactor which had been fully purged with nitrogen gas, a 10 ml toluene solution containing 1 μmole of catalyst 16 [(Me$_3$SiMe$_4$Cp)Zr(Te$_2$COnBu)$_3$], a 10 ml toluene solution containing 1 mmole of tri-isobutylaluminum and a 10 ml toluene solution containing 2 μmole of tris(pentafluorophenyl)borane were mixed. The temperature of the inside of the reactor was maintained at 30° C. for 10 minutes while stirring, to thereby obtain a toluene solution of a final olefin polymerization catalyst composition.

15 ml of the above-obtained toluene solution of the catalyst composition was charged together with 0.6 liter of dehydrated and deoxidated toluene into a 1.6-liter autoclave which had been evacuated and fully purged with nitrogen gas. The temperature of the inside of the autoclave was maintained at 80° C. and then, ethylene gas was charged into the autoclave at a pressure of 10 kg/cm$^2$•G. A polymerization reaction was allowed to proceed for 1 hour, while supplying ethylene gas to maintain the total pressure in the autoclave at a constant level. 31.3 g of a polymer was obtained. It was found that the $\overline{\text{Mw}}$ of the polymer was 452,000 and the $\overline{\text{Mw}}/\overline{\text{Mn}}$ was 2.76.

Example 38

Into a 1.6-liter autoclave which had been evacuated and fully purged with nitrogen gas were charged a 5 ml toluene solution containing 0.5 μmole of catalyst 17 [(1,2,4-Me$_3$Cp)Zr{S$_2$CO(C$_6$H$_4$Me)}$_3$], 5 ml of a toluene solution of MMAO (methylaluminoxane, manufactured and sold by Tosoh Akzo Corp., Japan) and 0.5 liter of dehydrated and deoxidated toluene, followed by mixing, wherein the MMAO concentration of the toluene solution of MMAO was 0.1 mole/liter in terms of the amount of aluminum and, accordingly, 5 ml of the toluene solution contained MMAO in an amount of 0.5 mmole in terms of the amount of aluminum. 100 ml of 1-hexene was charged into the autoclave, and the temperature of the inside of the autoclave was maintained at 120° C. Ethylene gas was charged into the autoclave at a pressure of 20 kg/cm$^2$•G. A polymerization reaction was allowed to proceed for 1 hour, while supplying ethylene gas to maintain the total pressure in the autoclave at a constant level. 50.3 g of a polymer was obtained. It was found that the $\overline{\text{Mw}}$ of the polymer was 352,000 and the $\overline{\text{Mw}}/\overline{\text{Mn}}$ was 2.91. The obtained polymer had a density of 0.918 g/cm$^3$. The measurement of the comonomer distribution of the polymer by FT-IR showed that 1-hexene was distributed uniformly from the low molecular region to the high molecular region in the molecular weight distribution of the obtained polymer.

Example 39

A polymerization reaction was conducted in substantially the same manner as in Example 38 except that use was made of catalyst 18 [Cp*Zr(S$_2$COCH=CHCH$_3$)(OMe)$_2$] instead of catalyst 17. 45.6 g of a polymer was obtained. It was found that the $\overline{\text{Mw}}$ of the polymer was 271,000, the $\overline{\text{Mw}}/\overline{\text{Mn}}$ was 2.77 and the density was 0.919 g/cm$^3$.

Example 40

A polymerization reaction was conducted in substantially the same manner as in Example 38 except that use was made of catalyst 19 [(1,3-Me$_2$Cp)Zr(S$_2$COCH$_2$Ph)$_3$]. 41.6 g of a polymer was obtained. It was found that the $\overline{\text{Mw}}$ of the polymer was 306,000, the $\overline{\text{Mw}}/\overline{\text{Mn}}$ was 2.46 and the density was 0.921 g/cm$^3$.

Example 41

A polymerization reaction was conducted in substantially the same manner as in Example 38 except that use was made of catalyst 20 [CpHf(S$_2$COEt)$_3$]. 36.2 g of a polymer was obtained. It was found that the $\overline{\text{Mw}}$ of the polymer was 264,000, the $\overline{\text{Mw}}/\overline{\text{Mn}}$ was 4.31 and the density was 0.922 g/cm$^3$.

Example 42

Into a 100 ml glass reactor which had been fully purged with nitrogen gas were charged a 10 ml toluene solution containing 1 μmole of catalyst 21 [(nBuCp)Zr(Se$_2$COiPr)$_3$], a 10 ml toluene solution containing 1 mmole of tri-isobutylaluminum and a 10 ml toluene solution containing 2 μmole of triphenylcarbonium-tetrakis(pentafluorophenyl)borate, followed by mixing. The temperature of the inside of the reactor was maintained at 30° C. for 10 minutes while stirring, to thereby obtain a toluene solution of a final olefin polymerization catalyst composition.

15 ml of the above-obtained toluene solution of the catalyst composition was charged together with 0.5 liter of dehydrated and deoxidated toluene into a 1.6-liter autoclave which had been evacuated and fully purged with nitrogen gas. 100 ml of 1-hexene was charged into the autoclave, and the temperature of the inside of the autoclave was maintained at 80° C. Ethylene gas was charged into the autoclave at a pressure of 10 kg/cm$^2$•G. A polymerization reaction was allowed to proceed for 1 hour, while supplying ethylene gas to maintain the total pressure in the autoclave at a constant level. 38.5 g of a polymer was obtained. It was found that the $\overline{\text{Mw}}$ of the polymer was 213,000, the $\overline{\text{Mw}}/\overline{\text{Mn}}$ was 3.28 and the density was 0.930 g/cm$^3$.

Synthesis 3 of Catalyst

Example 43

Synthesis of (pentamethylcyclopentadienyl)tris-(O,O'-diethyldithiophosphato)zirconium [Cp*Zr{S$_2$P(OEt)$_2$}$_3$] (catalyst 22)

Into a 100 ml glass reactor which had been fully purged with nitrogen gas were charged 2.0 g of (pentamethylcyclopentadienyl)zirconium trichloride and 3.7 g of ammonium O,O'-diethyldithiophosphate, followed by mixing. 50 ml of methylene chloride was added and the resultant mixture was stirred at room temperature for 12 hours to effect a reaction. The resultant reaction mixture was filtered to obtain a filtrate, and the obtained filtrate was subjected to distillation to obtain an oily substance. The obtained oily substance was washed with hexane and then dried under reduced pressure. As a result, 3.2 g of a yellow oily substance was obtained (yield: 68%). The results of the measurement by $^1$H-NMR spectroscopy (δ: ppm, solvent: deuteriochloroform) and elemental analysis of the product were as follows. δ1.3 (m, 18H), 2.0 (s, 15H), 4.1 (m, 12H) C, 33.4; H, 5.7; P, 12.3; S, 24.8; Zr, 11.5 (wt %)

Example 44

Synthesis of (n-butylcyclopentadienyl)tris(O,O'-dicyclohexyldithiophosphato)zirconium [(nBuCp)Zr{S$_2$P—(OC$_6$H$_{11}$)$_2$}$_3$] (catalyst 23)

Into a 100 ml glass reactor which had been fully purged with nitrogen gas were charged 2.0 g of bis(n-butylcyclopentadienyl)zirconium dichloride and 4.6 g of ammonium O,O'-dicyclohexyldithiophosphate, followed by mixing. 50 ml of methylene chloride was added to the obtained mixture, and the resultant mixture was stirred at room temperature for 18 hours to effect a reaction. The resultant reaction mixture was filtered to obtain a filtrate, and the obtained filtrate was subjected to distillation to obtain an oily substance. The obtained oily substance was washed with hexane and then dried under reduced pressure. As a result, 3.8 g of a yellow oily substance was obtained (yield: 70%). The results of elemental analysis of the product were as follows. C, 49.5; H, 7.4; P, 8.3; S, 17.6; Zr, 8.4 (wt %)

Example 45

Synthesis of (pentamethylcyclopentadienyl) (O,O'-diethyldithiophosphato)dichlorozirconium [Cp*Zr{S$_2$P(OEt)$_2$}Cl$_2$] (catalyst 24)

Into a 100 ml glass reactor which had been fully purged with nitrogen gas were charged 2.0 g of (pentamethylcyclopentadienyl)zirconium trichloride and 1.2 g of ammonium O,O'-diethyldithiophosphate, followed by mixing. 50 ml of methylene chloride was added to the obtained mixture, and the resultant mixture was stirred at room temperature for 12 hours to effect a reaction. The resultant reaction mixture was filtered to obtain a filtrate, and the obtained filtrate was subjected to distillation to obtain an oily substance. The obtained oily substance was washed with hexane and then dried under reduced pressure. As a result, 2.1 g of a yellow oily substance was obtained (yield: 72%). The results of elemental analysis of the product were as follows. C, 34.9; H, 5.4; P, 6.6; S, 13.1; Zr, 18.7 (wt %)

Example 46

Synthesis of (1,2,4-trimethylcyclopentadienyl)tris (O,O'-diphenyldithiophosphato)zirconium [(1,2,4-Me$_3$Cp)Zr{S$_2$P(OPh)$_2$}$_3$] (catalyst 25)

Into a 100 ml glass reactor which had been fully purged with nitrogen gas were charged 2.0 g of bis(1,2,4-trimethylcyclopentadienyl)zirconium dichloride and 4.8 g of ammonium O,O'-diphenyldithiophosphate, followed by mixing. 50 ml of methylene chloride was added to the obtained mixture, and the resultant mixture was stirred at room temperature for 18 hours to effect a reaction. The resultant reaction mixture was filtered to obtain a filtrate, and the obtained filtrate was subjected to distillation to obtain an oily substance. The obtained oily substance was washed with hexane and then dried under reduced pressure. As a result, 3.6 g of a yellow oily substance was obtained (yield: 65%). The results of elemental analysis of the product were as follows. C, 50.9; H, 4.2; P, 8.6; S, 17.9; Zr, 8.6 (wt %)

Example 47

Synthesis of (cyclopentadienyl)tris(O,O'-diethyldithiophosphato)hafnium [CpHf{S$_2$P(OEt)$_2$}$_3$] (catalyst 26)

Into a 100 ml glass reactor which had been fully purged with nitrogen gas were charged 2.0 g of bis (cyclopentadienyl)hafnium dichloride and 3.2 g of ammonium O,O'-diethyldithiophosphate, followed by mixing to obtain a mixture. 50 ml of methylene chloride was added to the obtained mixture, and the resultant mixture was stirred at room temperature for 18 hours to effect a reaction. The resultant reaction mixture was filtered to obtain a filtrate, and the obtained filtrate was subjected to distillation to obtain an oily substance. The obtained oily substance was washed with hexane and then dried under reduced pressure. As a result, 1.8 g of a yellow oily substance was obtained (yield: 42%). The results of elemental analysis of the product were as follows. C, 50.9; H, 4.2; P, 8.6; S, 17.9; Zr, 8.6 (wt %)

Example 48

Synthesis of (pentamethylcyclopentadienyl)tris-(O, O'-diethyldiselenophosphato)zirconium [Cp*Zr{Se$_2$P(OEt)$_2$}$_3$] (catalyst 27)

Into a 100 ml glass reactor which had been fully purged with nitrogen gas were charged 2.0 g of (pentamethylcyclopentadienyl)zirconium trichloride and 5.4 g of ammonium O,O'-diethyldiselenophosphate, followed by mixing. 50 ml of methylene chloride was added to the obtained mixture, and the resultant mixture was stirred at room temperature for 12 hours to effect a reaction. The resultant reaction mixture was filtered to obtain a filtrate, and the obtained filtrate was subjected to distillation to obtain an oily substance. The obtained oily substance was washed with hexane and then dried under reduced pressure. As a result, 3.4 g of a yellow oily substance was obtained (yield: 53%). The results of elemental analysis of the product were as follows. C, 24.9; H, 4.4; P, 8.5; Zr, 8.4 (wt %)

Example 49

Synthesis of [(tetramethylcyclopentadienyl) dimethylsilylene(O-ethyldithiophosphonato)] dichlorozirconium [{Cp*SiMe$_2$PS$_2$(OEt)}ZrCl$_2$] (catalyst 28)

In a 100 ml glass reactor which had been fully purged with nitrogen gas, 4.3 g of (tetramethylcyclopentadienyl) dimethylsilyl chloride was dissolved in 50 ml of tetrahydrofuran to obtain a solution. 1.7 g of lithium ethoxyphosphide was added to the obtained solution, and the resultant mixture was stirred at room temperature for 3 hours to effect a reaction. The resultant reaction mixture was filtered to obtain a filtrate, and the obtained filtrate was subjected to distillation. As a result, 2.3 g of an oily substance was obtained. 30 ml of tetrahydrofuran and 0.9 g of sulfur were added to the oily substance to obtain a mixture. The obtained mixture was stirred for 12 hours at room temperature to effect a reaction. The resultant reaction mixture was filtered to obtain a filtrate, and the obtained filtrate was subjected to distillation. As a result, 2.2 g of an oily substance was obtained. To the obtained oily substance, 50 ml of tetrahydrofuran and 13.8 ml of a hexane solution of n-butyllithium (1 mole/liter) were added to obtain a mixture. The obtained mixture was stirred at room temperature for 6 hours to effect a reaction. To the reaction mixture, 1.6 g of zirconium tetrachloride was added to obtain a mixture. The obtained mixture was stirred at room temperature for 12 hours to effect a reaction. The resultant reaction mixture was filtered to obtain a filtrate, and the obtained filtrate was subjected to distillation to obtain a residue. 30 ml of toluene was added to the residue to obtain a mixture. The obtained mixture was filtered to obtain a filtrate. The obtained filtrate was subjected to distillation to obtain a solid. The obtained solid was recrystallized from methylene chloride and then dried under reduced pressure. As a result, 1.4 g of a yellow solid was obtained (yield: 15%). The results of elemental analysis of the product were as follows. C, 32.8; H, 4.6; P, 6.4; S, 14.0; Zr, 18.4 (wt %)

Example 50

Synthesis of (trimethylsilyltetramethylcyclopentadienyl)tris(O,O'-di-n-butyldithiophosphato)zirconium [(Me$_3$SiCp*)Zr{S$_2$p(OnBu)$_2$}$_3$] (catalyst 29)

Into a 100 ml glass reactor which had been fully purged with nitrogen gas were charged 2.0 g of (trimethylsilyltetramethylcyclopentadienyl)zirconium trichloride and 4.0 g of ammonium O,O'-di-n-butyldithiophosphate, followed by mixing. 50 ml of methylene chloride was added and the resultant mixture was stirred for 12 hours at room temperature to effect a reaction. The resultant reaction mixture was filtered to obtain a filtrate, and the obtained filtrate was subjected to distillation to obtain an oily substance. The obtained oily substance was washed with hexane and then dried under reduced pressure. As a result, 3.3 g of a yellow oily substance was obtained (yield: 63%). The results of elemental analysis of the product were as follows. C, 42.6; H, 6.4; P, 8.8; S, 18.5; Zr, 8.9 (wt %)

Example 51

Synthesis of (pentamethylcyclopentadienyl)tris (ethylphenyldithiophosphinato)zirconium [Cp*Zr(S$_2$PEtPh)$_3$] (catalyst 30)

Into a 100 ml glass reactor which had been fully purged with nitrogen gas were charged 2.0 g of (pentamethylcyclopentadienyl)zirconium trichloride and 4.0 g of ammonium ethylphenyldithiophosphate, followed by mixing to obtain a mixture. 50 ml of methylene chloride was added to the obtained mixture, and the resultant mixture was stirred at room temperature for 12 hours to effect a reaction. The resultant reaction mixture was filtered to obtain a filtrate, and the obtained filtrate was subjected to distillation to obtain an oily substance. The obtained oily substance was washed with hexane and then dried under reduced pressure. As a result, 3.4 g of a yellow oily substance was obtained (yield: 68%). The results of elemental analysis of the product were as follows. C, 49.5; H, 5.0; P, 11.3; S, 23.6; Zr, 10.6 (wt %)

Example 52 to Synthesis of (pentamethylcyclopentadienyl)(O,O'-diphenyldithiophosphato)dimethoxytitanium [Cp*Ti{S$_2$P(OPh)$_2$}(OMe)$_2$] (catalyst 31)

In a 100 ml glass reactor which had been fully purged with nitrogen gas, 2.0 g of (pentamethylcyclopentadienyl) titanium trichloride was dissolved in 30 ml of diethyl ether to obtain a solution. To the obtained solution was added 21.0 ml of a diethyl ether solution of lithium methoxide (1 mole/liter), and the resultant mixture was stirred at room temperature for 6 hours to effect a reaction. The resultant reaction mixture was subjected to distillation to obtain a solid. To the obtained solid, toluene was added to obtain a mixture, and the obtained mixture was filtered to obtain a filtrate, and the obtained filtrate was subjected to distillation to obtain a solid. 2.1 g of ammonium O,O'-diphenyldithiophosphate was added to the obtained solid to obtain a mixture. 50 ml of methylene chloride was added to the mixture, and the resultant mixture was stirred at room temperature for 12 hours to effect a reaction. The resultant reaction mixture was filtered to obtain a filtrate, and the obtained filtrate was subjected to distillation to obtain a solid. The obtained solid was recrystallized from methylene chloride and then dried under reduced pressure. As a result, 1.2 g of a yellow solid was obtained (yield: 32%). The results of elemental analysis of the product were as follows. C, 54.6; H, 6.1; P, 5.5; S, 12.4; Ti, 8.7 (wt %)

Example 53

Synthesis of (cyclopentadienyl)tris(O,O'-dimethylditellurophosphato)zirconium [CpZr{Te$_2$P(OMe)$_2$}$_3$] (catalyst 32)

Into a 100 ml glass reactor which had been fully purged with nitrogen gas were charged 2.0 g of bis(cyclopentadienyl)zirconium dichloride and 7.5 g of ammonium O,O'-dimethylditellurophosphate, followed by mixing to obtain a mixture. 50 ml of methylene chloride was added to the obtained mixture, and the resultant mixture was stirred at room temperature for 18 hours to effect a reaction. The resultant reaction mixture was filtered to obtain a filtrate, and the obtained filtrate was subjected to distillation to obtain an oily substance. The obtained oily substance was washed with hexane and then dried under reduced pressure. As a result, 3.5 g of a yellow oily substance was obtained (yield: 43%). The results of elemental analysis of the product were as follows. C, 10.3; H, 2.2; P, 7.9; Zr, 7.5 (wt %)

Example 54

Synthesis of [(tetramethylcyclopentadienyl) dimethylsilylene(phenyldithiophosphinato)] dichlorozirconium [{CP*SiMe$_2$PPhS$_2$)ZrCl$_2$] (catalyst 33)

In a 100 ml glass reactor which had been fully purged with nitrogen gas, 4.3 g of (tetramethylcyclopentadienyl) dimethylsilyl chloride was dissolved in 50 ml of tetrahydrofuran to thereby obtain a solution. 2.3 g of lithium phenylphosphide was added to the obtained solution, and the resultant mixture was stirred at room temperature for 3 hours to effect a reaction. The resultant reaction mixture was filtered to obtain a filtrate, and the obtained filtrate was subjected to distillation. As a result, 4.0 g of an oily substance was obtained. 30 ml of tetrahydrofuran and 0.9 g of sulfur were added to the obtained oily substance to obtain a mixture. The obtained mixture was stirred at room temperature for 12 hours to effect a reaction. The resultant reaction mixture was filtered to obtain a filtrate, and the obtained filtrate was subjected to distillation. As a result, 2.3 g of an oily substance was obtained. To the obtained oily substance, 30 ml of tetrahydrofuran and 12.9 ml of a hexane solution of n-butyllithium (1 mole/liter) were added to obtain a mixture. The obtained mixture was stirred at room temperature for 6 hours to effect a reaction. 1.5 g of zirconium tetrachloride was added to the reaction mixture to obtain a mixture, and the obtained mixture was stirred at room temperature for 12 hours to effect a reaction. The resultant reaction mixture was filtered to obtain a filtrate, and the obtained filtrate was subjected to distillation to obtain a residue. 30 ml of toluene was added to the residue to obtain a mixture. The obtained mixture was filtered to obtain a filtrate, and the obtained filtrate was subjected to distillation to obtain a solid. The obtained solid was recrystallized from methylene chloride and then dried under reduced pressure.

As a result, 1.5 g of a yellow solid was obtained (yield: 15%). The results of elemental analysis of the product were as follows. C, 40.4; H, 4.7; P, 6.6; S, 13.0; Zr, 18.1 (wt %)

Example 55

Synthesis of [(cyclopentadienyl)methylene(O-methyldithiophosphonato)]dichlorozirconium [{CpCH$_2$PS$_2$(OMe)}ZrCl$_2$] (catalyst 34)

In a 100 ml glass reactor which had been fully purged with nitrogen gas, 1.3 g of methoxyphosphine was dissolved in 30 ml of tetrahydrofuran to obtain a solution. 20.0 ml of a hexane solution of n-butyllithium (1 mole/liter) was added to the obtained solution to obtain a mixture. The obtained mixture was stirred at room temperature for 1 hour to effect a reaction. 1.6 g of fulvene was added to the resultant reaction mixture, and stirred at room temperature for 12 hours to effect a reaction. To the resultant reaction mixture was added 40 ml of water to obtain an aqueous mixture, and the aqueous mixture was extracted with ether to obtain an ether solution. The obtained ether solution was subjected to distillation to obtain 1.8 g of an oily substance. To the obtained oily substance were added 30 ml of tetrahydrofuran and 0.8 g of sulfur to obtain a mixture, and the obtained mixture was stirred at room temperature for 12 hours to effect a reaction. The resultant reaction mixture was filtered to obtain a filtrate, and the obtained filtrate was subjected to distillation. As a result, 1.3 g of an oily substance was obtained. To the oily substance were added 50 ml of tetrahydrofuran and 10.7 ml of a hexane solution of n-butyllithium (1 mole/liter) to obtain a mixture. The mixture was stirred at room temperature for 6 hours to effect a reaction. To the reaction mixture was added 1.2 g of zirconium tetrachloride, and the resultant mixture was stirred at room temperature for 12 hours to effect a reaction. The resultant reaction mixture was filtered to obtain a filtrate, and the obtained filtrate was subjected to distillation to obtain a residue. 30 ml of toluene was added to the residue to obtain a mixture. The obtained mixture was filtered to obtain a filtrate. The filtrate was subjected to distillation to obtain a solid. The obtained solid was recrystallized from methylene chloride and then dried under reduced pressure. As a result, 1.1 g of a yellow solid was obtained (yield: 14%). The results of elemental analysis of the product were as follows. C, 21.8; H, 2.6; P, 7.5; S, 16.6; Zr, 22.6 (wt %)

Example 56

Synthesis of (1,3-dimethylcyclopentadienyl)tris-(O, O'-di-isopropyldithiophosphato)zirconium [(1,3-Me$_2$CP)Zr{S$_2$P(OiPr)$_2$}$_3$] (catalyst 35)

Into a 100 ml glass reactor which had been fully purged with nitrogen gas were charged 2.0 g of bis(1,3-dimethylcyclopentadienyl)zirconium dichloride and 4.0 g of ammonium O,O'-di-isopropyldithiophosphate, followed by mixing. 50 ml of methylene chloride was added and the obtained mixture was stirred at room temperature for 18 hours to effect a reaction. The resultant reaction mixture was filtered to obtain a filtrate, and the obtained filtrate was subjected to distillation to obtain an oily substance. The obtained oily substance was washed with hexane and then dried under reduced pressure. As a result, 2.6 g of a yellow oily substance was obtained (yield: 56%). The results of elemental analysis of the product were as follows. C, 36.3; H, 6.2; P, 11.6; S, 22.8; Zr, 11.0 (wt %)

Polymerization reaction 3

Example 57

Into a 1.6-liter autoclave which had been evacuated and fully purged with nitrogen gas, a 5 ml toluene solution containing 0.5 μmole of catalyst 22 [Cp*Zr{S$_2$P(OEt)$_2$}$_3$] and 5 ml of a toluene solution MMAO (methylaluminoxane, manufactured and sold by Tosoh Akzo Corp., Japan) were charged together with 0.6 liter of dehydrated and deoxidated toluene, wherein the MMAO concentration of the toluene solution of MMAO was 0.1 mole/liter in terms of the amount of aluminum and, accordingly, 5 ml of the toluene solution contained MMAO in an amount of 0.5 mmole in terms of the amount of aluminum. The temperature of the inside of the autoclave was maintained at 80° C. and then, ethylene gas was charged into the autoclave at a pressure of 10 kg/cm$^2$•G. A polymerization reaction was allowed to proceed for 1 hour, while supplying ethylene gas to maintain the total pressure in the autoclave at a constant level. 61.0 g of a polymer was obtained. It was found that the $\overline{Mw}$ of the polymer was 523,000 and the $\overline{Mw}/\overline{Mn}$ was 2.66.

Example 58

A polymerization reaction was conducted in substantially the same manner as in Example 57 except that use was made of catalyst 23 {(nBuCp)Zr[S$_2$P(OC$_6$H$_{11}$)$_2$]$_3$} instead of catalyst 22. 49.1 g of a polymer was obtained. It was found that the $\overline{Mw}$ of the polymer was 559,000 and the $\overline{Mw}/\overline{Mn}$ was 2.94.

Example 59

A polymerization reaction was conducted in substantially the same manner as in Example 57 except that use was made of catalyst 24 [Cp*Zr{S$_2$P(OEt)$_2$}Cl$_2$]. 57.2 g of a polymer was obtained. It was found that the $\overline{Mw}$ of the polymer was 476,000 and the $\overline{Mw}/\overline{Mn}$ was 3.02.

Example 60

In a 100 ml glass reactor which had been fully purged with nitrogen gas, a 10 ml toluene solution containing 1 μmole of catalyst 25 [(1,2,4-Me$_3$Cp)Zr{S$_2$P(OPh)$_2$}$_3$], 10 ml of a toluene solution of MMAO (methylaluminoxane, manufactured and sold by Tosoh Akzo Corp., Japan) and 1 ml of octene were mixed, wherein the MMAO concentration of the toluene solution of MMAO was 0.1 mole/liter in terms of the amount of aluminum and, accordingly, 10 ml of the toluene solution contained MMAO in an amount of 1 mmole in terms of the amount of aluminum. The temperature of the inside of the reactor was maintained at 100° C. for 30 minutes while stirring, to thereby obtain a toluene solution of a final olefin polymerization catalyst composition.

10.5 ml of the above-obtained toluene solution of the catalyst composition was charged together with 0.6 liter of dehydrated and deoxidated toluene into a 1.6-liter autoclave which had been evacuated and fully purged with nitrogen gas. The temperature of the inside of the autoclave was maintained at 80° C. and then, ethylene gas was charged into the autoclave at a pressure of 10 kg/cm$^2$•G. A polymerization reaction was allowed to proceed for 1 hour, while supplying ethylene gas to maintain the total pressure in the autoclave at a constant level. 53.4 g of a polymer was obtained. It was found that the $\overline{Mw}$ of the polymer was 521,000 and the $\overline{Mw}/\overline{Mn}$ was 2.35.

Example 61

A polymerization reaction was conducted in substantially the same manner as in Example 60 except that use was made of catalyst 26 [CpHf{S$_2$P(OEt)$_2$}$_3$] instead of catalyst 25. 31.6 g of a polymer was obtained. It was found that the $\overline{Mw}$ was 652,000 and the $\overline{Mw}/\overline{Mn}$ was 4.22.

Example 62

A polymerization reaction was conducted in substantially the same manner as in Example 60 except that use was made of catalyst 27 [Cp*Zr{Se$_2$P(OEt)$_2$}$_3$]. 38.7 g of a polymer was obtained. It was found that the $\overline{Mw}$ of the polymer was 498,000 and the $\overline{Mw}/\overline{Mn}$ was 3.65.

Example 63

In a 100 ml glass reactor which had been fully purged with nitrogen gas, a 10 ml toluene solution containing 1 μmole of catalyst 28 [{Cp*SiMe$_2$PS$_2$(OEt)}ZrCl$_2$], a 10 ml toluene solution containing 1 mmole of tri-isobutylaluminum and a 10 ml toluene solution containing 2 μmole of tris (pentafluorophenyl)borane were mixed. The temperature of the inside of the reactor was maintained at 30° C. for 10 minutes while stirring, to thereby obtain a toluene solution of a final olefin polymerization catalyst composition.

15 ml of the above-obtained toluene solution of the catalyst composition was charged together with 0.6 liter of dehydrated and deoxidated toluene into a 1.6-liter autoclave which had been evacuated and fully purged with nitrogen gas. The temperature of the inside of the autoclave was maintained at 80° C. and then, ethylene gas was charged into the autoclave at a pressure of 10 kg/cm$^2$·G. A polymerization reaction was allowed to proceed for 1 hour, while supplying ethylene gas to maintain the total pressure in the autoclave at a constant level. 58.5 g of a polymer was obtained. It was found that the $\overline{Mw}$ of the polymer was 385,000 and the $\overline{Mw}/\overline{Mn}$ was 4.50.

Example 64

Into a 1.6-liter autoclave which had been evacuated and fully purged with nitrogen gas were charged a 5 ml toluene solution containing 0.5 μmole of catalyst 29 [(Me$_3$SiCp*)Zr{S$_2$P(OnBu)$_2$}$_3$], 5 ml of a toluene solution of MMAO (methylaluminoxane, manufactured and sold by Tosoh Akzo Corp., Japan) and 0.5 liter of dehydrated and deoxidated toluene, followed by mixing, wherein the MMAO concentration of the toluene solution of MMAO was 0.1 mole/liter in terms of the amount of aluminum and, accordingly, 5 ml of the toluene solution contained MMAO in an amount of 0.5 mmole in terms of the amount of aluminum. 100 ml of 1-hexene was charged into the autoclave, and the temperature of the inside of the autoclave was maintained at 120° C. Ethylene gas was charged into the autoclave at a pressure of 20 kg/cm$^2$·G. A polymerization reaction was allowed to proceed for 1 hour, while supplying ethylene gas to maintain the total pressure in the autoclave at a constant level. 63.4 g of a polymer was obtained. It was found that the $\overline{Mw}$ of the polymer was 232,000 and the $\overline{Mw}/\overline{Mn}$ was 2.12. The obtained polymer had a density of 0.923 g/cm$^3$. The measurement of the comonomer distribution of the polymer by GPC-(FT-IR) showed that 1-hexene was distributed uniformly from the low molecular region to the high molecular region in the molecular weight distribution of the obtained polymer.

Example 65

A polymerization reaction was conducted in substantially the same manner as in Example 64 except that use was made of catalyst 30 [Cp*Zr(S$_2$PEtPh)$_3$] instead of catalyst 29. 55.8 g of a polymer was obtained. It was found that the $\overline{Mw}$ of the polymer was 284,000, the $\overline{Mw}/\overline{Mn}$ was 2.68 and the density was 0.921 g/cm$^3$.

Example 66

A polymerization reaction was conducted in substantially the same manner as in Example 64 except that use was made of catalyst 31 [Cp*Ti{S$_2$P(OPh)$_2$}(OMe)$_2$]. 39.9 g of a polymer was obtained. It was found that the $\overline{Mw}$ of the polymer was 256,000, the $\overline{Mw}/\overline{Mn}$ was 3.65 and the density was 0.920 g/cm$^3$.

Example 67

A polymerization reaction was conducted in substantially the same manner as in Example 64 except that use was made of catalyst 32 [CpZr{Te$_2$P(OMe)$_2$}$_3$]. 48.7 g of a polymer was obtained. It was found that the $\overline{Mw}$ of the polymer was 319,000, the $\overline{Mw}/\overline{Mn}$ was 3.28 and the density was 0.916 g/cm$^3$.

Example 68

A polymerization reaction was conducted in substantially the same manner as in Example 64 except that use was made of catalyst 33 [(Cp*SiMe$_2$PPhS$_2$)ZrCl$_2$]. 76.2 g of a polymer was obtained. It was found that the $\overline{Mw}$ of the polymer was 275,000, the $\overline{Mw}/\overline{Mn}$ was 3.35 and the density was 0.908 g/cm$^3$.

Example 69

A polymerization reaction was conducted in substantially the same manner as in Example 64 except that use was made of catalyst 34 [{CpCH$_2$PS$_2$(OMe)}ZrCl$_2$]. 64.1 g of a polymer was obtained. It was found that the $\overline{Mw}$ of the polymer was 260,000, the $\overline{Mw}/\overline{Mn}$ was 3.85 and the density was 0.905 g/cm$^3$.

Example 70

Into a 100 ml glass reactor which had been fully purged with nitrogen gas were charged a 10 ml toluene solution containing 1 μmole of catalyst 35 [(1,3-Me$_2$Cp)Zr{S$_2$P(OiPr)$_2$}$_3$], a 10 ml toluene solution containing 1 mmole of tri-isobutylaluminum and a 10 ml toluene solution containing 2 μmole of triphenylcarbonium-tetrakis(pentafluorophenyl)borate, followed by mixing. The temperature of the inside of the reactor was maintained at 30° C. for 10 minutes while stirring, to thereby obtain a toluene solution of a final olefin polymerization catalyst composition.

15 ml of the above-obtained toluene solution of the catalyst composition was charged together with 0.5 liter of dehydrated and deoxidated toluene into a 1.6-liter autoclave which had been evacuated and purged with nitrogen gas. 100 ml of 1-hexene was charged into the autoclave, and the temperature of the inside of the autoclave was maintained at 80° C. Ethylene gas was charged into the autoclave at a pressure of 10 kg/cm$^2$·G. A polymerization reaction was allowed to proceed for 1 hour, while supplying ethylene gas to maintain the total pressure in the autoclave at a constant level. 46.8 g of a polymer was obtained. It was found that the $\overline{Mw}$ of the polymer was 274,000, the $\overline{Mw}/\overline{Mn}$ was 2.84 and the density was 0.918 g/cm$^3$.

Synthesis 4 of Catalyst

Example 71

Synthesis of (pentamethylcyclopentadienyl)bis-(8-quinolinolato)chlorozirconium [Cp*Zr(C$_9$H$_6$NO)$_2$Cl] (catalyst 36)

Into a 100 ml glass reactor which had been fully purged with nitrogen gas was charged a 50 ml of acetonitrile solution containing 2.0 g of (pentamethylcyclopentadienyl)

zirconium trichloride. 3.5 g of 8-quinolinol was added to the acetonitrile solution to thereby obtain a mixture, and the obtained mixture was stirred at room temperature for 12 hours to effect a reaction. The resultant reaction mixture was evaporated to dryness under reduced pressure to obtain a solid. To the obtained solid, toluene was added to obtain a mixture, and the mixture was filtered to obtain a filtrate. The obtained filtrate was concentrated. To the obtained concentrate was added pentane to precipitate a solid. As a result, 2.7 g of a yellow solid was obtained (yield: 81%). The results of the measurement by $^1$H-NMR spectroscopy (δ: ppm, solvent: deuteriochloroform) and elemental analysis of the product were as follows.

δ1.9 (s, 15H), 7.0 (m, 6H), 7.4 (m, 2H), 7.8 (d,1H), 7.9 (d, 1H), 8.1 (d, 1H), 8.5 (d, 1H) C, 61.4; H, 5.5; N, 4.8; Zr, 16.4 (wt %)

Example 72

Synthesis of (1,3-dimethylcyclopentadienyl)bis-{1-(3-ethoxy-2-pyridyl)ethanolato}chlorozirconium [(1,3-Me$_2$Cp)Zr(EtOC$_5$H$_3$N—MeCHO)$_2$Cl] (catalyst 37)

Into a 100 ml glass reactor which had been fully purged with nitrogen gas was charged a 50 ml of acetonitrile solution containing 2.0 g of bis(1,3-dimethylcyclopentadienyl)zirconium dichloride. 3.8 g of 1-(3-ethoxy-2-pyridyl)ethanol was added to the acetonitrile solution to thereby obtain a mixture, and the obtained mixture was stirred at room temperature for 18 hours to effect a reaction. The resultant reaction mixture was evaporated to dryness under reduced pressure to obtain a solid. To the obtained solid, toluene was added to obtain a mixture, and the mixture was filtered to obtain a filtrate. The obtained filtrate was concentrated. To the obtained concentrate was added pentane to precipitate a solid. As a result, 2.2 g of a white solid was obtained (yield: 68%). The results of elemental analysis of the product were as follows. C, 54.0; H, 6.2; N, 5.5; Zr, 16.2 (wt %)

Example 73

Synthesis of (trimethylsilyltetramethylcyclopentadienyl)(4-methyl-2-pyridylmethanolato)dichlorozirconium [(Me$_3$SiMe$_4$Cp)Zr(OCH$_2$-4-MeC$_5$H$_3$N)Cl$_2$] (catalyst 38)

Into a 100 ml glass reactor which had been fully purged with nitrogen gas was charged a 50 ml of acetonitrile solution containing 2.0 g of (trimethylsilyltetramethylcyclopentadienyl)zirconium trichloride. 0.6 g of 4-methyl-2-pyridylmethanol and 0.5 g of triethylamine was added to the acetonitrile solution to thereby obtain a mixture, and the obtained mixture was stirred at room temperature for 12 hours to effect a reaction. The resultant reaction mixture was evaporated to dryness under reduced pressure to obtain a solid. To the obtained solid, toluene was added to obtain a mixture, and the mixture was filtered to obtain a filtrate. The obtained filtrate was concentrated. To the obtained concentrate was added pentane to precipitate a solid. As a result, 1.5 g of a yellow solid was obtained (yield: 63%). The results of elemental analysis of the product were as follows. C, 47.2; H, 6.6; N, 3.2; Zr, 19.5 (wt %)

Example 74

Synthesis of (pentamethylcyclopentadienyl)bis(2-pyridylmethanolato)chlorotitanium [Cp*Ti(OCH$_2$—C$_5$H$_4$N)$_2$Cl] (catalyst 39)

Into a 100 ml glass reactor which had been fully purged with nitrogen gas was charged a 50 ml of acetonitrile solution containing 2.0 g of (pentamethylcyclopentadienyl) titanium trichloride. 1.5 g of 2-pyridylmethanol and 1.4 g of triethylamine was added to the acetonitrile solution to thereby obtain a mixture, and the obtained mixture was stirred at room temperature for 12 hours to effect a reaction. The resultant reaction mixture was evaporated to dryness under reduced pressure to obtain a solid. To the obtained solid, toluene was added to obtain a mixture, and the mixture was filtered to obtain a filtrate. The obtained filtrate was concentrated. To the obtained concentrate was added pentane to precipitate a solid. As a result, 1.2 g of a yellow oily substance was obtained (yield: 41%). The results of elemental analysis of the product were as follows. C, 61.1; H, 6.0; N, 6.8; Ti, 10.7 (wt %)

Example 75

Synthesis of (cyclopentadienyl)bis(7-n-propyl-8-quinolinolato)chlorozirconium [CpZr(7-nPr—C$_9$H$_5$NO)$_2$Cl] (catalyst 40)

Into a 100 ml glass reactor which had been fully purged with nitrogen gas was charged a 50 ml of acetonitrile solution containing 2.0 g of bis(cyclopentadienyl)zirconium dichloride. 5.1 g of 8-quinolinol was added to the acetonitrile solution to thereby obtain a mixture, and the obtained mixture was stirred at room temperature for 18 hours to effect a reaction. The resultant reaction mixture was evaporated to dryness under reduced pressure to obtain a solid. To the obtained solid, toluene was added to obtain a mixture, and the mixture was filtered to obtain a filtrate. The obtained filtrate was concentrated. To the obtained concentrate was added pentane to precipitate a solid. As a result, 2.7 g of a yellow solid was obtained (yield: 71%). The results of elemental analysis of the product were as follows. C, 61.0; H, 5.6; N, 4.6; Zr, 16.5 (wt %)

Example 76

Synthesis of (n-butylcyclopentadienyl)bis(5-chloro-7-iodo-8-quinolinolato)chlorozirconium [(nBuCp)Zr(5-Cl-7-I—C$_9$H$_4$NO)$_2$Cl] (catalyst 41)

Into a 100 ml glass reactor which had been fully purged with nitrogen gas was charged a 50 ml of acetonitrile solution containing 2.0 g of bis(n-butylcyclopentadienyl) zirconium dichloride. 2.1 g of 5-chloro-7-iodo-8-quinolinol was added to the acetonitrile solution to thereby obtain a mixture, and the obtained mixture was stirred at room temperature for 18 hours to effect a reaction. The resultant reaction mixture was evaporated to dryness under reduced pressure to obtain a solid. To the obtained solid, toluene was added to obtain a mixture, and the mixture was filtered to obtain a filtrate. The obtained filtrate was concentrated. To the obtained concentrate was added pentane to precipitate a solid. As a result, 2.8 g of a yellow solid was obtained (yield: 67%). The results of elemental analysis of the product were as follows. C, 37.3; H, 2.7; N, 3.5; Zr, 10.5 (wt %)

Example 77

Synthesis of (1,3-dimethylcyclopentadienyl)bis(8-quinolinethiolato)chlorozirconium [(1,3-Me$_2$Cp)Zr(C$_9$H$_6$NS)$_2$Cl] (catalyst 42)

Into a 100 ml glass reactor which had been fully purged with nitrogen gas was charged a 50 ml of acetonitrile solution containing 2.0 g of bis(1,3-dimethylcyclopentadienyl)zirconium dichloride. 2.9 g of 8-quinolinethiol was added to the acetonitrile solution to thereby obtain a mixture, and the obtained mixture was stirred at room temperature for 18 hours to effect a reaction. The resultant reaction mixture was evaporated to dryness under reduced pressure to obtain a solid. To the obtained solid, toluene was added to obtain a mixture, and the mixture was filtered to obtain a filtrate. The obtained filtrate was concentrated. To the obtained concentrate was added pentane to precipitate a solid. As a result, 1.3 g of a yellow solid was obtained (yield: 54%). The results of elemental analysis of the product were as follows. C, 56.3; H, 3.6; N, 5.5; S, 11.5; Zr, 16.9 (wt %)

Example 78

Synthesis of (cyclopentadienyl)bis(8-quinolinolato) chlorohafnium [CpHf($C_9H_6NO$)$_2$Cl] (catalyst 43)

Into a 100 ml glass reactor which had been fully purged with nitrogen gas was charged a 50 ml of acetonitrile solution containing 2.0 g of bis(cyclopentadienyl)hafnium dichloride. 3.1 g of 8-quinolinol was added to the acetonitrile solution to thereby obtain a mixture, and the obtained mixture was stirred at room temperature for 18 hours to effect a reaction. The resultant reaction mixture was evaporated to dryness under reduced pressure to obtain a solid. To the obtained solid, toluene was added to obtain a mixture, and the mixture was filtered to obtain a filtrate. The obtained filtrate was concentrated. To the obtained concentrate was added pentane to precipitate a solid. As a result, 1.0 g of a yellow solid was obtained (yield: 32%). The results of elemental analysis of the product were as follows. C, 48.4; H, 3.0; N, 4.7; Hf, 31.2, (wt %)

Example 79

Synthesis of (n-butylcyclopentadienyl)bis(2-pyridyl-phenylmethanolato)chlorozirconium [(nBuCp)Zr(OCPhH—$C_5H_4N$)$_2$Cl] (catalyst 44)

Into a 100 ml glass reactor which had been fully purged with nitrogen gas was charged a 50 ml of acetonitrile solution containing 2.0 g of bis(n-butylcyclopentadienyl) zirconium dichloride. 1.8 g of 2-pyridylphenylmethanol and 0.5 g of triethylamine were added to the acetonitrile solution to thereby obtain a mixture, and the obtained mixture was stirred at room temperature for 18 hours to effect a reaction. The resultant reaction mixture was evaporated to dryness under reduced pressure to obtain a solid. To the obtained solid, toluene was added to obtain a mixture, and the mixture was filtered to obtain a filtrate. The obtained filtrate was concentrated. To the obtained concentrate was added pentane to precipitate a solid. As a result, 2.1 g of a white solid was obtained (yield: 70%). The results of elemental analysis of the product were as follows. C, 64.0; H, 5.2; N, 4.6; Zr, 15.0 (wt %)

Example 80

Synthesis of (indenyl)bis(2-pyridyl-methylthio) chlorozirconium [(Ind)Zr(SCH$_2$—$C_5H_4N$)$_2$Cl] (catalyst 45)

Into a 100 ml glass reactor which had been fully purged with nitrogen gas was charged a 50 ml of acetonitrile solution containing 2.0 g of bis(indenyl)zirconium dichloride. 1.1 g of 2-pyridylmethanethiol and 0.5 g of triethylamine were added to the acetonitrile solution to thereby obtain a mixture, and the obtained mixture was stirred at room temperature for 18 hours to effect a reaction. The resultant reaction mixture was evaporated to dryness under reduced pressure to obtain a solid. To the obtained solid, toluene was added to obtain a mixture, and the mixture was filtered to obtain a filtrate. The obtained filtrate was concentrated. To the obtained concentrate was added pentane to precipitate a solid. As a result, 1.4 g of a yellow solid was obtained (yield: 65%). The results of elemental analysis of the product were as follows. C, 51.1; H, 4.2; N, 5.7; S, 12.9; Zr, 18.6 (wt %)

Example 81

Synthesis of (1,2,4-trimethylcyclopentadienyl)bis-(2-pyridyl-iso-propyl-methanolato)phenylzirconium [(1,2,4-Me$_3$Cp)Zr(OCHiPr—$C_5H_4N$)$_2$Ph] (catalyst 46)

Into a 100 ml glass reactor which had been fully purged with nitrogen gas was charged a 50 ml of acetonitrile solution containing 2.0 g of bis(1,2,4-trimethylcyclopentadienyl)zirconium dichloride. 3.2 g of 2-pyridyl-iso-propylmethanol was added to the acetonitrile solution to thereby obtain a mixture, and the obtained mixture was stirred at room temperature for 12 hours to effect a reaction. The resultant reaction mixture was evaporated to dryness under reduced pressure to obtain a solid. To the obtained solid, toluene was added to obtain a mixture, and the mixture was filtered to obtain a filtrate. The obtained filtrate was subjected to distillation to obtain a solid. The obtained solid was dissolved in 30 ml of tetrahydrofuran to obtain a solution, and to the obtained solution was added 4.5 ml of diethyl ether solution of phenyllithium (phenyllithium concentration: 1 mole/liter). The resultant mixture was allowed to react at room temperature for 3 hours. The resultant reaction mixture was evaporated to dryness under reduced pressure to obtain a solid. To the obtained solid, toluene was added to obtain a mixture, and the mixture was filtered to obtain a filtrate. The obtained filtrate was concentrated. To the obtained concentrate was added pentane to precipitate a solid. As a result, 1.6 g of a white solid was obtained (yield: 51%). The results of elemental analysis of the product were as follows. C, 66.3; H, 7.1; N, 5.2; Zr, 16.3 (wt %)

Example 82

Synthesis of (cyclopentadienyl)bis(2-pyridylmethanolato)chlorohafnium [CpHf(OCH$_2$—$C_5H_4N$)$_2$Cl] (catalyst 47)

Into a 100 ml glass reactor which had been fully purged with nitrogen gas was charged a 50 ml of acetonitrile solution containing 2.0 g of bis(cyclopentadienyl)hafnium dichloride. 2.3 g of 2-pyridylmethanol was added to the acetonitrile solution to thereby obtain a mixture, and the obtained mixture was stirred at room temperature for 18 hours to effect a reaction. The resultant reaction mixture was evaporated to dryness under reduced pressure to obtain a solid. To the obtained solid, toluene was added to obtain a mixture, and the mixture was filtered to obtain a filtrate. The obtained filtrate was concentrated. To the obtained concentrate was added pentane to precipitate a solid. As a result, 1.1 g of a white solid was obtained (yield: 43%). The results of elemental analysis of the product were as follows. C, 41.0; H, 3.4; N, 5.5; Hf, 35.8 (wt %)

Example 83

Synthesis of (pentamethylcyclopentadienyl)bis(2-pyridylmethanolato)chlorozirconium [Cp*Zr(OCH$_2$—$C_5H_4N$)$_2$Cl] (catalyst 48)

Into a 100 ml glass reactor which had been fully purged with nitrogen gas was charged a 50 ml of acetonitrile solution containing 2.0 g of (pentametylcytlopentadienyl) zirconium trichloride. 1.3 g of 2-pyridylmethanol and 1.2 g of triethylamine were added to the acetonitrile solution to thereby obtain a mixture, and the obtained mixture was stirred at room temperature for 12 hours to effect a reaction. The resultant reaction mixture was evaporated to dryness under reduced pressure to obtain a solid. To the obtained solid, toluene was added to obtain a mixture, and the mixture was filtered to obtain a filtrate. The obtained filtrate was concentrated. To the obtained concentrate was added pentane to precipitate a solid. As a result, 2.4 g of a yellow solid was obtained (yield: 82%). The results of elemental analysis of the product were as follows. C, 55.1; H, 5.8; N, 5.6; Zr, 19.3 (wt %)

Example 84

Synthesis of (indenyl)bis(2-methyl-8-quinolinolato) chlorozirconium [(Ind)Zr(2-Me—C$_9$H$_5$NO)$_2$Cl] (catalyst 49)

Into a 100 ml glass reactor which had been fully purged with nitrogen gas was charged a 50 ml of acetonitrile solution containing 2.0 g of bis(indenyl)zirconium dichloride. 2.8 g of 2-methyl-8-quinolinol was added to the acetonitrile solution to thereby obtain a mixture, and the obtained mixture was stirred at room temperature for 18 hours to effect a reaction. The resultant reaction mixture was evaporated to dryness under reduced pressure to obtain a solid. To the obtained solid, toluene was added to obtain a mixture, and the mixture was filtered to obtain a filtrate. The obtained filtrate was concentrated. To the obtained concentrate was added pentane to precipitate a solid. As a result, 1.6 g of a yellow solid was obtained (yield: 63%). The results of elemental analysis of the product were as follows. C, 62.3; H, 4.4; N, 4.4; Zr, 14.0 (wt %)

Example 85

Synthesis of (1,2,4-trimethylcyclopentadienyl)bis(5-chloro-8-quinolinolato)benzylzirconium [(1,2,4-Me$_3$Cp)Zr(5-Cl—C$_9$H$_5$NO)$_2$(CH$_2$Ph)] (catalyst 50)

Into a 100 ml glass reactor which had been fully purged with nitrogen gas was charged a 50 ml of acetonitrile solution containing 2.0 g of bis(1,2,4-trimethylcyclopentadienyl)zirconium dichloride. 3.8 g of 5-chloro-8-quinolinol was added to the acetonitrile solution to thereby obtain a mixture, and the obtained mixture was stirred at room temperature for 18 hours to effect a reaction. The resultant reaction mixture was evaporated to dryness under reduced pressure to obtain a solid. To the obtained solid, toluene was added to obtain a mixture, and the mixture was filtered to obtain a filtrate. The obtained filtrate was subjected to distillation to obtain a solid. The obtained solid was dissolved in 30 ml of tetrahydrofuran to obtain a solution, and to the obtained solution was added 5.3 ml of a diethyl ether solution of benzyllithium (benzyllithium concentration: 1 mole/liter). The resultant mixture was allowed to react at room temperature for 3 hours. The reaction mixture was evaporated to dryness under reduced pressure to obtain a solid. To the obtained solid, toluene was added to obtain a mixture, and the mixture was filtered to obtain a filtrate. The obtained filtrate was concentrated. To the obtained concentrate was added pentane to precipitate a solid. As a result, 1.7 g of a yellow solid was obtained (yield: 50%). The results of elemental analysis of the product were as follows. C, 61.7; H, 4.5; N, 4.1; Zr, 14.0 (wt %)

Example 86

Synthesis of (pentamethylcyclopentadienyl)bis(8-quinolinolato)chlorotitanium [Cp*Ti(C$_9$H$_6$NO)$_2$Cl] (catalyst 51)

Into a 100 ml glass reactor which had been fully purged with nitrogen gas was charged a 50 ml of acetonitrile solution containing 2.0 g of (pentamethylcyclopentadienyl) titanium trichloride. 2.0 g of 8-quinolinol and 1.4 g of triethylamine were added to the acetonitrile solution to thereby obtain a mixture, and the obtained mixture was stirred at room temperature for 12 hours to effect a reaction. The resultant reaction mixture was evaporated to dryness under reduced pressure to obtain a solid. To the obtained solid, toluene was added to obtain a mixture, and the mixture was filtered to obtain a filtrate. The obtained filtrate was concentrated. To the obtained concentrate was added pentane to precipitate a solid. As a result, 1.4 g of a yellow oily substance was obtained (yield: 39%). The results of elemental analysis of the product were as follows. C, 66.2; H, 5.4; N, 5.6; Ti, 9.8 (wt %)

Example 87

Synthesis of (trimethylsilyltetramethylcyclopentadienyl)(10-acridinolato)dichlorozirconium [(Me$_3$SiCP*)Zr (Cl$_3$H$_8$NO)Cl$_2$] (catalyst 52)

Into a 100 ml glass reactor which had been fully purged with nitrogen gas was charged a 50 ml of acetonitrile solution containing 2.0 g of (trimethylsilyltetramethylcyclopentadienyl)zirconium trichloride. 1.0 g of 10-acridinol and 0.5 g of triethylamine were added to the acetonitrile solution to thereby obtain a mixture, and the obtained mixture was stirred at room temperature for 12 hours to effect a reaction. The resultant reaction mixture was evaporated to dryness under reduced pressure to obtain a solid. To the obtained solid, toluene was added to obtain a mixture, and the mixture was filtered to obtain a filtrate. The obtained filtrate was concentrated. To the obtained concentrate was added pentane to precipitate a solid. As a result, 2.0 g of a yellow solid was obtained (yield: 72%). The results of elemental analysis of the product were as follows. C, 54.1; H, 5.5; N, 2.6; Zr, 16.7 (wt %)

Polymerization reaction 4

Example 88

Into a 1.6-liter autoclave which had been evacuated and fully purged with nitrogen gas, a 5 ml toluene solution containing 0.5 $\mu$mole of catalyst 36 [Cp*Zr(C$_9$H$_6$NO)$_2$Cl] and 5 ml of a toluene solution of MMAO (type 4) (methylaluminoxane, manufactured and sold by Tosoh Akzo Corp., Japan) were charged together with 0.6 liter of dehydrated and deoxidated toluene, wherein the MMAO concentration of the toluene solution of MMAO was 0.1 mole/liter in terms of the amount of aluminum and, accordingly, 5 ml of the toluene solution contained MMAO in an amount of 0.5 mmole in terms of the amount of aluminum. The temperature of the inside of the autoclave was maintained at 80° C. and then, ethylene gas was charged into the autoclave at a pressure of 10 kg/cm$^2$•G. A polymerization reaction was allowed to proceed for 1 hour, while supplying ethylene gas to maintain the total pressure in the autoclave at a constant level. 24.3 g of a polymer was obtained. It was found that the $\overline{Mw}$ of the polymer was 952,000 and the $\overline{Mw}/\overline{Mn}$ was 2.65.

Example 89

A polymerization reaction was conducted in substantially the same manner as in Example 88 except that use was made of catalyst 37 [(1,3-Me$_2$Cp)Zr(EtOC$_5$H$_3$N—MeCHO)$_2$Cl] instead of catalyst 36. 22.1 g of a polymer was obtained. It was found that the $\overline{Mw}$ of the polymer was 960,000 and the $\overline{Mw}/\overline{Mn}$ was 2.86.

Example 90

A polymerization reaction was conducted in substantially the same manner as in Example 88 except that use was made of catalyst 38 [(Me$_3$SiMe$_4$Cp)Zr(OCH$_2$-4-MeC$_5$H$_3$N)Cl$_2$]. 25.6 g of a polymer was obtained. It was found that the $\overline{\text{Mw}}$ of the polymer was 862,000 and the $\overline{\text{Mw}}/\overline{\text{Mn}}$ was 2.10.

Example 91

In a 100 ml glass reactor which had been fully purged with nitrogen gas, a 10 ml toluene solution containing 1 μmole of catalyst 39 [Cp*Ti(OCH$_2$—C$_5$H$_4$N)$_2$Cl], 10 ml of a toluene solution of MMAO (methylaluminoxane, manufactured and sold by Tosoh Akzo Corp., Japan) and 1 ml of octene were mixed, wherein the MMAO concentration of the toluene solution of MMAO was 0.1 mole/liter in terms of the amount of aluminum and, accordingly, 10 ml of the toluene solution contained MMAO in an amount of 1 mmole in terms of the amount of aluminum. The temperature of the inside of the reactor was maintained at 100° C. for 30 minutes while stirring, to thereby obtain a toluene solution of a final olefin polymerization catalyst composition.

10.5 ml of the above-obtained toluene solution of the catalyst composition was charged together with 0.6 liter of dehydrated and deoxidated toluene into a 1.6-liter autoclave which had been evacuated and fully purged with nitrogen gas. The temperature of the inside of the autoclave was maintained at 80° C. and then, ethylene gas was charged into the autoclave at a pressure of 10 kg/cm$^2$•G. A polymerization reaction was allowed to proceed for 1 hour, while supplying ethylene gas to maintain the total pressure in the autoclave at a constant level. 18.0 g of a polymer was obtained. It was found that the $\overline{\text{Mw}}$ of the polymer was 986,000 and the $\overline{\text{Mw}}/\overline{\text{Mn}}$ was 2.95.

Example 92

A polymerization reaction was conducted in substantially the same manner as in Example 91 except that use was made of catalyst 40 [CpZr(7-nPr—C$_9$H$_5$NO)$_2$Cl] instead of catalyst 39. 19.6 g of a polymer was obtained. It was found that the $\overline{\text{Mw}}$ was 1,023,000 and the $\overline{\text{Mw}}/\overline{\text{Mn}}$ was 2.32.

Example 93

A polymerization reaction was conducted in substantially the same manner as in Example 91 except that use was made of catalyst 41 [(nBuCp)Zr(5-Cl-7-I—C$_9$H$_4$NO)$_2$Cl]. 20.8 g of a polymer was obtained. It was found that the $\overline{\text{Mw}}$ of the polymer was 1,025,000 and the $\overline{\text{Mw}}/\overline{\text{Mn}}$ was 2.41.

Example 94

A polymerization reaction was conducted in substantially the same manner as in Example 91 except that use was made of catalyst 42 [(1,3-Me$_2$Cp)Zr(C$_9$H$_6$NS)$_2$Cl]. 21.2 g of a polymer was obtained. It was found that the $\overline{\text{Mw}}$ of the polymer was 952,000 and the $\overline{\text{Mw}}/\overline{\text{Mn}}$ was 2.79.

Example 95

In a 100 ml glass reactor which had been fully purged with nitrogen gas, a 10 ml toluene solution containing 1 μmole of catalyst 43 [CpHf(C$_9$H$_6$NO)$_2$Cl], a 10 ml toluene solution containing 1 mmole of triisobutylaluminum and a 10 ml toluene solution containing 2 μmole of tris(pentafluorophenyl)borane were mixed. The temperature of the inside of the reactor was maintained at 120° C. for 10 minutes while stirring, to thereby obtain a toluene solution of a final olefin polymerization catalyst composition.

15 ml of the above-obtained toluene solution of the catalyst composition was charged together with 0.6 liter of dehydrated and deoxidated toluene into a 1.6-liter autoclave which had been evacuated and fully purged with nitrogen gas. The temperature of the inside of the autoclave was maintained at 80° C. and then, ethylene gas was charged into the autoclave at a pressure of 10 kg/cm$^2$•G. A polymerization reaction was allowed to proceed for 1 hour, while supplying ethylene gas to maintain the total pressure in the autoclave at a constant level. 18.8 g of a polymer was obtained. It was found that the $\overline{\text{Mw}}$ of the polymer was 1,023,000 and the $\overline{\text{Mw}}/\overline{\text{Mn}}$ was 3.65.

Example 96

Into a 1.6-liter autoclave which had been evacuated and fully purged with nitrogen gas were charged a 5 ml toluene solution containing 0.5 μmole of catalyst 44 [(nBuCp)Zr(OCPhH—C$_5$H$_4$N)$_2$Cl], 5 ml of a toluene solution of MMAO (methylaluminoxane, manufactured and sold by Tosoh Akzo Corp., Japan) and 0.5 liter of dehydrated and deoxidated toluene, followed by mixing, wherein the MMAO concentration of the toluene solution of MMAO was 0.1 mole/liter in terms of the amount of aluminum and, accordingly, 5 ml of the toluene solution contained MMAO in an amount of 0.5 mmole in terms of the amount of aluminum. 100 ml of 1-hexene was charged into the autoclave, and the temperature of the inside of the autoclave was maintained at 120° C. Ethylene gas was charged into the autoclave at a pressure of 20 kg/cm$^2$•G. A polymerization reaction was allowed to proceed for 1 hour, while supplying ethylene gas to maintain the total pressure in the autoclave at a constant level. 31.9 g of a polymer was obtained. It was found that the $\overline{\text{Mw}}$ of the polymer was 863,000 and the $\overline{\text{Mw}}/\overline{\text{Mn}}$ was 2.55. The obtained polymer had a density of 0.908 g/cm$^3$. The measurement of the comonomer distribution of the polymer by GPC-(FT-IR) showed that 1-hexene was distributed uniformly from the low molecular region to the high molecular region in the molecular weight distribution of the obtained polymer.

Example 97

A polymerization reaction was conducted in substantially the same manner as in Example 96 except that use was made of catalyst 45 [(Ind)Zr(SCH$_2$—C$_5$H$_4$N)$_2$Cl] instead of catalyst 44. 33.0 g of a polymer was obtained. It was found that the $\overline{\text{Mw}}$ of the polymer was 774,000, the $\overline{\text{Mw}}/\overline{\text{Mn}}$ was 2.60 and the density was 0.914 g/cm$^3$.

Example 98

A polymerization reaction was conducted in substantially the same manner as in Example 96 except that use was made of catalyst 46 [(1,2,4-Me$_3$Cp)Zr(OCHiPr—C$_5$H$_4$N)$_2$Ph]. 35.0 g of a polymer was obtained. It was found that the $\overline{\text{Mw}}$ of the polymer was 717,000, the $\overline{\text{Mw}}/\overline{\text{Mn}}$ was 2.66 and the density was 0.916 g/cm$^3$.

Example 99

A polymerization reaction was conducted in substantially the same manner as in Example 96 except that use was made of catalyst 47 [CpHf(OCH$_2$—C$_5$H$_4$N)$_2$Cl]. 30.6 g of a polymer was obtained. It was found that the $\overline{\text{Mw}}$ of the polymer was 685,000, the $\overline{\text{Mw}}/\overline{\text{Mn}}$ was 3.05 and the density was 0.921 g/cm$^3$.

Example 100

A polymerization reaction was conducted in substantially the same manner as in Example 96 except that use was made of catalyst 48 [Cp*Zr(OCH$_2$—C$_5$H$_4$N)$_2$Cl]. 36.5 g of a polymer was obtained. It was found that the $\overline{Mw}$ of the polymer was 743,000, the $\overline{Mw/Mn}$ was 2.33 and the density was 0.910 g/cm$^3$.

Example 101

A polymerization reaction was conducted in substantially the same manner as in Example 96 except that use was made of catalyst 49 [(Ind)Zr(2-Me—C$_9$H$_5$NO)$_2$Cl]. 32.6 g of a polymer was obtained. It was found that the $\overline{Mw}$ of the polymer was 721,000, the $\overline{Mw/Mn}$ was 2.80 and the density was 0.916 g/cm$^3$.

Example 102

A polymerization reaction was conducted in substantially the same manner as in Example 96 except that use was made of catalyst 50 [(1,2,4-Me$_3$Cp)Zr(5-Cl—C$_9$H$_5$NO)$_2$ (CH$_2$Ph)]. 35.2 g of a polymer was obtained. It was found that the $\overline{Mw}$ of the polymer was 666,000, the $\overline{Mw/Mn}$ was 2.37 and the density was 0.914 g/cm$^3$.

Example 103

A polymerization reaction was conducted in substantially the same manner as in Example 96 except that use was made of catalyst 51 [Cp*Ti(C$_9$H$_6$NO)$_2$Cl]. 30.4 g of a polymer was obtained. It was found that the $\overline{Mw}$ of the polymer was 737,000, the $\overline{Mw/Mn}$ was 3.46 and the density was 0.911 g/cm$^3$.

Example 104

Into a 100 ml glass reactor which had been fully purged with nitrogen gas were charged a 10 ml toluene solution containing 1 µmole of catalyst 52 [(Me$_3$SiCP*)Zr (C$_{13}$H$_8$NO)Cl$_2$], a 10 ml toluene solution containing 1 mmole of tri-isobutylaluminum and a 10 ml toluene solution containing 2 µmole of triphenylcarbonium-tetrakis (pentafluorophenyl)borate, followed by mixing. The temperature of the inside of the reactor was maintained at 30° C. for 10 minutes while stirring, to thereby obtain a toluene solution of a final olefin polymerization catalyst composition.

15 ml of the above-obtained toluene solution of the catalyst composition was charged together with 0.5 liter of dehydrated and deoxidated toluene into a 1.6-liter autoclave which had been evacuated and purged with nitrogen gas. 100 ml of 1-hexene was charged into the autoclave, and the temperature of the inside of the autoclave was maintained at 80° C. Ethylene gas was charged into the autoclave at a pressure of 10 kg/cm$^2$•G. A polymerization reaction was allowed to proceed for 1 hour, while supplying ethylene gas to maintain the total pressure in the autoclave at a constant level. 33.1 g of a polymer was obtained. It was found that the $\overline{Mw}$ of the polymer was 755,000, the $\overline{Mw/Mn}$ was 2.91 and the density was 0.916 g/cm$^3$.

Synthesis 5 of catalyst

Example 105

Synthesis of (pentamethylcyclopentadienyl)bis(2-dimethylaminophenolato)chlorozirconium [Cp*Zr (O—C$_6$H$_4$—NMe$_2$)$_2$Cl] (catalyst 53)

Into a 100 ml glass reactor which had been fully purged with nitrogen gas was charged a 50 ml acetonitrile solution containing 2.0 g of (pentamethylcyclopentadienyl) zirconium trichloride. 3.3 g of 2-dimethylaminophenol was added to the solution to obtain a mixture, and the obtained mixture was stirred at room temperature for 12 hours to effect a reaction. The resultant reaction mixture was evaporated to dryness under reduced pressure to obtain a solid. Toluene was added to the obtained solid to obtain a mixture, and the obtained mixture was filtered to obtain a filtrate. The obtained filtrate was concentrated. To the resultant concentrate was added pentane to precipitate a solid. As a result, 2.3 g of a yellow solid was obtained (yield: 72%). The results of the measurement by $^1$H-NMR spectroscopy (δ: ppm, solvent: deuteriochloroform) and elemental analysis of the product were as follows.

δ1.9 (s, 15H), 2.3 (t,12H), 3.6 (s, 12H), 6.4–7.1 (m, 8H)
C, 58.6; H, 6.3; N, 4.9; Zr, 17.3 (wt %)

Example 106

Synthesis of (indenyl)bis(2-di-isopropylaminoethanolato)chlorozirconium [(Ind)Zr (O—CH$_2$CH$_2$—NiPr$_2$)$_2$Cl] (catalyst 54)

Into a 100 ml glass reactor which had been fully purged with nitrogen gas was charged a 50 ml acetonitrile solution containing 2.0 g of bis(indenyl)zirconium dichlolide. 1.3 g of 2-di-isopropylaminoethanol and 0.9 g of triethylamine were added to the solution to obtain a mixture, and the obtained mixture was stirred at room temperature for 18 hours to effect a reaction. The resultant reaction mixture was evaporated to dryness under reduced pressure to obtain a solid. Toluene was added to the obtained solid to obtain a solution, and the obtained solution was filtered to obtain a filtrate. The obtained filtrate was concentrated. To the resultant concentrate was added pentane to precipitate a solid. As a result, 1.5 g of a white solid was obtained (yield: 63%). The results of elemental analysis of the product are as follows. C, 56.8; H, 8.2; N, 5.4; Zr, 17.7 (wt %)

Example 107

Synthesis of (1,2,4-trimethylcyclopentadienyl) bis (2-dimethylaminothiophenolato)chlorozirconium [(1,2,4-Me$_3$Cp)Zr(S—C$_6$H$_4$—NMe$_2$)$_2$Cl] (catalyst 55)

Into a 100 ml glass reactor which had been fully purged with nitrogen gas was charged a 50 ml acetonitrile solution containing 2.0 g of bis(1,2,4-trimethylcyclopentadienyl) zirconium dichloride. 1.6 g of 2-dimethylaminothiophenol and 1.1 g of triethylamine were added to the solution to obtain a mixture, and the obtained mixture was stirred at room temperature for 18 hours to effect a reaction. The resultant reaction mixture was evaporated to dryness under reduced pressure to obtain a solid. Toluene was added to the obtained solid to obtain a solution, and the obtained solution was filtered to obtain a filtrate. The obtained filtrate was concentrated. To the resultant concentrate was added pentane to precipitate a solid. As a result, 1.6 g of a yellow solid was obtained (yield: 55%). The results of elemental analysis of the product are as follows. C, 54.0; H, 5.6; N, 5.1; S, 12.3; Zr, 17.3 (wt %)

Example 108

Synthesis of (pentamethylcyclopentadienyl)bis(2-dimethylaminoethanolato)chlorotitanium [Cp*Ti (O—CH$_2$CH$_2$—NMe$_2$)$_2$Cl] (catalyst 56)

Into a 100 ml glass reactor which had been fully purged with nitrogen gas was charged a 50 ml acetonitrile solution containing 2.0 g of (pentamethylcyclopentadienyl)titanium trichloride. 1.2 g of 2-dimethylaminoethanol and 1.4 g of triethylamine were added to the solution to obtain a mixture, and the obtained mixture was stirred at room temperature for 12 hours to effect a reaction. The resultant reaction mixture was evaporated to dryness under reduced pressure to obtain a solid. Toluene was added to the obtained solid to obtain a mixture, and the obtained mixture was filtered to obtain a filtrate. The obtained filtrate was concentrated. To the resultant concentrate was added pentane to obtain an oily substance. As a result, 1.4 g of a yellow oily substance was obtained (yield: 53%). The results of elemental analysis of the product were as follows. C, 55.2; H, 8.6; N, 7.1; Ti, 12.3 (wt %)

Example 109

Synthesis of [(tetramethylcyclopentadienyl) dimethylsilylene(N-phenyl-2-aminoethanolato)] dichlorozirconium [(Cp*SiMe$_2$NPhCH$_2$CH$_2$O) ZrCl$_2$] (catalyst 57)

Into a 100 ml glass reactor which had been fully purged with nitrogen gas was charged a 30 ml tetrahydrofuran solution containing 2.7 g of N-phenyl-2-aminoethanol. 2.1 g of trimethylsilyl chloride and 2.0 g of triethylamine were added to the tetrahydrofuran solution to obtain a mixture, and the obtained mixture was stirred at room temperature for 3 hours to effect a reaction. The resultant reaction mixture was subjected to distillation to obtain an oily substance. 4.0 g of (tetramethylcyclopentadienyl)dimethylsilyl chloride was dissolved in 50 ml of tetrahydrofuran to obtain a solution. To the obtained solution were added the above-obtained oily substance and 1.9 g of triethylamine, and the resultant mixture was stirred at room temperature for 6 hours to effect a reaction. The resultant reaction mixture was subjected to distillation to obtain 4.5 g of an oily substance. To the obtained oily substance were added 50 ml of tetrahydrofuran and 28.3 ml of a hexane solution of n-butyllithium (1 mole/liter) to obtain a mixture, and the obtained mixture was stirred at room temperature for 6 hours to effect a reaction. To the resultant reaction mixture was added 3.3 g of zirconium tetrachloride to obtain a mixture, and the obtained mixture was stirred at room temperature for 12 hours to effect a reaction. The resultant reaction mixture was filtered to obtain a filtrate. The obtained filtrate was subjected to distillation. 30 ml of toluene was added to the resultant residue to obtain a mixture. The obtained, mixture was filtered to obtain a filtrate. The obtained filtrate was subjected to distillation to obtain a solid. The obtained solid was recrystallized from methylene chloride and then, dried under reduced pressure. As a result, 2.9 g of a yellow solid was obtained (yield: 30%). The results of elemental analysis of the product were as follows. C, 47.3; H, 5.7; N, 3.3; Zr, 19.6 (wt %)

Example 110

Synthesis of (pentamethylcyclopentadienyl)(4-n-butyl-2-dimethylaminophenolato)dichlorozirconium [Cp*Zr(O-4-nBu—C$_6$H$_3$—NMe$_2$)Cl$_2$] (catalyst 58)

Into a 100 ml glass reactor which had been fully purged with nitrogen gas was charged a 50 ml acetonitrile solution containing 2.0 g of (pentamethylcyclopentadienyl) zirconium trichloride. 1.2 g of 4-n-butyl-2-dimethylaminophenol and 0.6 g of triethylamine were added to the acetonitrile solution to obtain a mixture, and the obtained mixture was stirred at room temperature for 12 hours to effect a reaction. The resultant reaction mixture was evaporated to dryness under reduced pressure to obtain a solid. Toluene was added to the obtained solid to obtain a mixture, and the obtained mixture was filtered to obtain a filtrate. The obtained filtrate was concentrated. To the resultant concentrate was added pentane to precipitate a solid. As a result, 1.4 g of a yellow solid was obtained (yield: 46%). The results of elemental analysis of the product were as follows. C, 54.5; H, 6.4; N, 3.1; Zr, 18.7 (wt %)

Example 111

Synthesis of (trimethylsilyltetramethylcyclopentadienyl)bis(4-amino-2-diethylaminophenolato)chlorozirconium [(Me$_3$SiCp*)Zr(O-4-H$_2$N—C$_6$H$_3$—NEt$_2$)$_2$Cl] (catalyst 59)

Into a 100 ml glass reactor which had been fully purged with nitrogen gas was charged a 50 ml acetonitrile solution containing 2.0 g of (trimethylsilyltetramethylcyclopentadienyl)zirconium trichloride. 3.7 g of 4-amino-2-diethylaminophenol was added to the acetonitrile solution to obtain a mixture, and the obtained mixture was stirred at room temperature for 12 hours to effect a reaction. The resultant reaction mixture was evaporated to dryness under reduced pressure to obtain a solid. Toluene was added to the obtained solid to obtain a mixture, and the obtained mixture was filtered to obtain a filtrate. The obtained filtrate was concentrated. To the resultant concentrate was added pentane to precipitate a solid. As a result, 2.1 g of a yellow solid was obtained (yield: 61%). The results of elemental analysis of the product were as follows. C, 56.5; H, 7.4; N, 7.9; Zr, 13.9 (wt %)

Example 112

Synthesis of (n-butylcyclopentadienyl)bis(2-pyrrolidinophenolato)chlorozirconium [(nBuCp)Zr (O—C$_6$H$_4$—NC$_4$H$_8$)$_2$Cl] (catalyst 60)

Into a 100 ml glass reactor which had been fully purged with nitrogen gas was charged a 50 ml acetonitrile solution containing 2.0 g of bis(n-butylcyclopentadienyl)zirconium dichloride. 3.2 g of 2-pyrrolidinophenol was added to the acetonitrile solution to obtain a mixture, and the obtained mixture was stirred at room temperature for 18 hours to effect a reaction. The resultant reaction mixture was evaporated to dryness under reduced pressure to obtain a solid. Toluene was added to the obtained solid to obtain a mixture, and the obtained mixture was filtered to obtain a filtrate. The obtained filtrate was concentrated. To the resultant concentrate was added pentane to precipitate a solid. As a result, 2.0 g of a yellow solid was obtained (yield: 71%). The results of elemental analysis of the product were as follows. C, 61.5; H, 6.6; N, 4.7; Zr, 15.2 (wt %)

Example 113

Synthesis of (cyclopentadienyl)bis(2-dimethylamino-1,1,2,2-tetramethylethanolato) chlorohafnium [CpHf(O—CMe$_2$CMe$_2$—NMe$_2$)$_2$Cl] (catalyst 61)

Into a 100 ml glass reactor which had been fully purged with nitrogen gas was charged a 50 ml acetonitrile solution containing 2.0 g of bis(cyclopentadienyl)hafnium dichloride. 1.4 g of 2-dimethylamino-1,1,2,2-tetramethylethanol and 1.1 g of triethylamine were added to the acetonitrile solution to obtain a mixture, and the obtained mixture was stirred at room temperature for 18 hours to effect a reaction. The resultant reaction mixture was evaporated to dryness under reduced pressure to obtain a solid. Toluene was added to the obtained solid to obtain a mixture, and the obtained mixture was filtered to obtain a filtrate. The obtained filtrate was concentrated. To the resultant concentrate was added pentane to precipitate a solid. As a result, 1.6 g of a white solid was obtained (yield: 57%). The results of the measurement by elemental analysis of the product were as follows. C, 42.4; H, 7.7; N, 5.5; Hf, 31.8 (wt %)

Example 114

Synthesis of (tetramethylcyclopentadienyl) dimethylsilylene(2-isopropylaminophenolato) dichlorozirconium [(Cp*SiMe$_2$NiPr—C$_6$H$_4$—O) ZrCl$_2$] (catalyst 62)

Into a 100 ml glass reactor which had been fully purged with nitrogen gas was charged a 30 ml tetrahydrofuran solution containing 3.0 g of 2-isopropylaminophenol. 2.2 g of trimethylsilyl chloride and 2.0 g of triethylamine were added to the tetrahydrofuran solution to obtain a mixture, and the resultant mixture was stirred at room temperature for 3 hours to effect a reaction. The resultant reaction mixture was subjected to distillation to obtain 4.1 g of an oily substance. 3.9 g of (tetramethylcyclopentadienyl) dimethylsilyl chloride was dissolved in 50 ml of tetrahydrofuran to obtain a solution. To the obtained solution were added the above-obtained oily substance and 1.8 g of triethylamine, and the resultant mixture was stirred at room temperature for 6 hours to effect a reaction. The resultant reaction mixture was subjected to distillation to obtain 4.8 g of an oily substance. To the obtained oily substance were added 50 ml of tetrahydrofuran and 29.5 ml of a hexane solution of n-butyllithium (1 mole/liter) to obtain a mixture, and the obtained mixture was stirred at room temperature for 6 hours to effect a reaction. To the resultant reaction mixture was added 3.4 g of zirconium tetrachloride to obtain a mixture, and the obtained mixture was stirred at room temperature for 12 hours to effect a reaction. The resultant reaction mixture was filtered to obtain a filtrate. The obtained filtrate was subjected to distillation. 30 ml of toluene was added to the resultant residue to obtain a mixture. The obtained mixture was filtered to obtain a filtrate. The obtained filtrate was subjected to distillation to obtain a solid. The obtained solid was recrystallized from methylene chloride and then dried under reduced pressure. As a result, 2.6 g of a yellow solid was obtained (yield: 27%). The results of elemental analysis of the product were as follows. C, 49.3; H, 6.1; N, 3.3; Zr, 19.0 (wt %)

Example 115

Synthesis of [(3,4-dimethylcyclopentadienyl) isopropylene(N-phenyl-2-aminoethanolato)] dichlorozirconium [{(1,3-Me$_2$Cp) CMe$_2$NPhCH$_2$CH$_2$—O}ZrCl$_2$] (catalyst 63)

Into a 100 ml glass reactor which had been fully purged with nitrogen gas was charged a 30 ml tetrahydrofuran solution containing 2.7 g of N-phenyl-2-aminoethanol. 2.2 g of trimethylsilyl chloride and 2.0 g of triethylamine were added to the tetrahydrofuran solution to obtain a mixture, and the obtained mixture was stirred at room temperature for 3 hours to effect a reaction. The resultant reaction mixture was subjected to distillation to obtain 18.4 g of an oily substance. To the obtained oily substance were added 30 ml of tetrahydrofuran and 18.5 ml of a hexane solution of n-butyllithium (1 mole/liter) to obtain a mixture, and the obtained mixture was stirred at room temperature for 1 hour to effect a reaction. To the resultant reaction mixture was added 2.5 g of 1,1,3,4-tetramethylfulvene to obtain a mixture, and the obtained mixture was stirred at room temperature for 12 hours to effect a reaction. To the resultant reaction mixture was added 40 ml of water to obtain an aqueous mixture, and the aqueous mixture was extracted with ether to obtain an ether solution. The obtained ether solution was subjected to distillation to obtain 2.7 g of an oily substance. To the obtained oily substance were added 30 ml of tetrahydrofuran and 17.7 ml of a hexane solution of n-butyllithium (1 mole/liter) to obtain a mixture, and the obtained mixture was stirred at room temperature for 6 hours to effect a reaction. To the resultant mixture was added 2.0 g of zirconium tetrachloride to obtain a mixture, and the obtained mixture was stirred at room temperature for 24 hours to effect a reaction. The resultant reaction mixture was filtered to obtain a filtrate. The obtained filtrate was subjected to distillation. Toluene was added to the resultant residue to obtain a mixture. The obtained mixture was filtered to obtain a filtrate. The obtained filtrate was subjected to distillation to obtain a solid. The obtained solid was recrystallized from methylene chloride and then dried under reduced pressure. As a result, 1.7 g of a yellow solid was obtained (yield: 19%). The results of elemental analysis of the product were as follows. C, 47.8; H, 5.1; N, 3.2; Zr, 19.2 (wt %)

Example 116

Synthesis of (1,3-dimethylcyclopentadienyl)bis(2-dimethylamino-4-allylphenolato)methoxyzirconium [(1,3-Me$_2$Cp)Zr(O—(4-C$_3$H$_5$—C$_6$H$_3$—NMe$_2$)}$_2$ (OMe)] (catalyst 64)

Into a 100 ml glass reactor which had been fully purged with nitrogen gas was charged a 50 ml acetonitrile solution containing 2.0 g of bis(1,3-dimethylcyclopentadienyl) zirconium dichloride. 1.9 g of 2-dimethylamino-4-allylphenol and 1.2 g of triethylamine were added to the acetonitrile solution to obtain a mixture, and the obtained mixture was stirred at room temperature for 18 hours to effect a reaction. The resultant reaction mixture was evaporated to dryness under reduced pressure to obtain a solid. Toluene was added to the obtained solid to obtain a mixture, and the obtained mixture was filtered to obtain a filtrate. The obtained filtrate was subjected to distillation to obtain a solid. The obtained solid was dissolved in 30 ml of tetrahydrofuran to obtain a solution. To the obtained solution was added 5.2 ml of a tetrahydrofuran solution of lithium methoxide (1 mole/liter) to obtain a mixture, and the obtained mixture was stirred at room temperature for 3 hours to effect a reaction. The resultant reaction mixture was evaporated to dryness under reduced pressure to obtain a solid. Toluene was added to the obtained solid to obtain a mixture, and the obtained mixture was filtered to obtain a filtrate. The obtained filtrate was concentrated. To the resultant concentrate was added pentane to precipitate a solid. As a result, 1.5 g of a yellow solid was obtained (yield: 49%). The results of elemental analysis of the product were as follows. C, 63.1; H, 6.2; N, 5.2; Zr, 16.7 (wt %)

Polymerization reaction 5

Example 117

Into a 1.6-liter autoclave which had been evacuated and fully purged with nitrogen gas, a 5 ml toluene solution containing 0.5 μmole of catalyst 53 [Cp*Zr(O—C$_6$H$_4$—NMe$_2$)$_2$Cl] and 5 ml of a toluene solution of MMAO (type 4) (methylaluminoxane, manufactured and sold by Tosoh Akzo Corp., Japan) were charged together with 0.6 liter of dehydrated and deoxidated toluene, wherein the MMAO concentration of the toluene solution of MMAO was 0.1 mole/liter in terms of the amount of aluminum and, accordingly, 5 ml of the toluene solution contained MMAO in an amount of 0.5 mmole in terms of the amount of aluminum. The temperature of the inside of the autoclave was maintained at 80° C. and then, ethylene gas was charged into the autoclave at a pressure of 10 kg/cm$^2$•G. A polymerization reaction was allowed to proceed for 1 hour, while supplying ethylene gas to maintain the total pressure in the autoclave at a constant level. 26.2 g of a polymer was obtained. It was found that the $\overline{Mw}$ of the polymer was 929,000 and the $\overline{Mw}/\overline{Mn}$ was 2.52.

Example 118

A polymerization reaction was conducted in substantially the same manner as in Example 117 except that use was made of catalyst 54 [(Ind)Zr(O—CH$_2$CH$_2$—NiPr$_2$)$_2$Cl] instead of catalyst 53. 23.1 g of a polymer was obtained. It was found that the $\overline{Mw}$ of the polymer was 834,000 and the $\overline{Mw}/\overline{Mn}$ was 2.16.

Example 119

In a 100 ml glass reactor which had been fully purged with nitrogen gas, a 10 ml toluene solution containing 1 μmole of catalyst 55 [(1,2,4-Me$_3$Cp)Zr(S—C$_6$H$_4$—NMe$_2$)$_2$Cl], 10 ml of a toluene solution of MMAO (methylaluminoxane, manufactured and sold by Tosoh Akzo Corp., Japan) and 1 ml of octene were mixed, wherein the MMAO concentration of the toluene solution of MMAO was 0.1 mole/liter in terms of the amount of aluminum and, accordingly, 10 ml of the toluene solution contained MMAO in an amount of 1 mmole in terms of the amount of aluminum. The temperature of the inside of the reactor was maintained at 100° C. for 30 minutes while stirring, to thereby obtain a toluene solution of a final olefin polymerization catalyst composition.

10.5 ml of the above-obtained toluene solution of the catalyst composition was charged together with 0.6 liter of dehydrated and deoxidated toluene into a 1.6-liter autoclave which had been evacuated and fully purged with nitrogen gas. The temperature of the inside of the autoclave was maintained at 80° C. and then, ethylene gas was charged into the autoclave at a pressure of 10 kg/cm$^2$•G. A polymerization reaction was allowed to proceed for 1 hour, while supplying ethylene gas to maintain the total pressure in the autoclave at a constant level. 24.9 g of a polymer was obtained. It was found that the $\overline{Mw}$ of the polymer was 940,000 and the $\overline{Mw}/\overline{Mn}$ was 2.65.

Example 120

A polymerization reaction was conducted in substantially the same manner as in Example 119 except that use was made of catalyst 56 [Cp*Ti(O—CH$_2$CH$_2$—NMe$_2$)$_2$Cl] instead of catalyst 55. 22.0 g of a polymer was obtained. It was found that the $\overline{Mw}$ of the polymer was 767,000 and the $\overline{Mw}/\overline{Mn}$ was 2.98.

Example 121

A polymerization reaction was conducted in substantially the same manner as in Example 119 except that use was made of catalyst 57 {[Cp*SiMe$_2$NphCH$_2$CH$_2$O]ZrCl$_2$}. 31.6 g of a polymer was obtained. It was found that the $\overline{Mw}$ of the polymer was 691,000 and the $\overline{Mw}/\overline{Mn}$ was 3.07.

Example 122

In a 100 ml glass reactor which had been fully purged with nitrogen gas, a 10 ml toluene solution containing 1 μmole of catalyst 58 [Cp*Zr(O-4-nBu—C$_6$H$_3$—NMe$_2$)Cl$_2$], a 10 ml toluene solution containing 1 mmole of tri-isobutylaluminum and a 10 ml toluene solution containing 2 μmole of tris(pentafluorophenyl)borane were mixed. The temperature of the inside of the reactor was maintained at 120° C. for 10 minutes while stirring, to thereby obtain a toluene solution of a final olefin polymerization catalyst composition.

15 ml of the above-obtained toluene solution of the catalyst composition was charged together with 0.6 liter of dehydrated and deoxidated toluene into a 1.6-liter autoclave which had been evacuated and fully purged with nitrogen gas. The temperature of the inside of the autoclave was maintained at 80° C. and then, ethylene gas was charged into the autoclave at a pressure of 10 kg/cm$^2$•G. A polymerization reaction was allowed to proceed for 1 hour, while supplying ethylene gas to maintain the total pressure in the autoclave at a constant level. 25.2 g of a polymer was obtained. It was found that the $\overline{Mw}$ of the polymer was 827,000 and the $\overline{Mw}/\overline{Mn}$ was 2.30.

Example 123

Into a 1.6-liter autoclave which had been evacuated and fully purged with nitrogen gas were charged a 5 ml toluene solution containing 0.5 μmole of catalyst 59 [(Me$_3$SiCp*)Zr(O-4-H$_2$N—C$_6$H$_3$—NEt$_2$)$_2$Cl], 5 ml of a toluene solution of MMAO (methylaluminoxane, manufactured and sold by Tosoh Akzo Corp., Japan) together with 0.5 liter of dehydrated and deoxidated toluene, followed by mixing, wherein the MMAO concentration of the toluene solution of MMAO was 0.1 mole/liter in terms of the amount of aluminum and, accordingly, 5 ml of the toluene solution contained MMAO in an amount of 0.5 mmole in terms of the amount of aluminum. 100 ml of 1-hexene was charged into the autoclave, and the temperature of the inside of the autoclave was maintained at 120° C. Ethylene gas was charged into the autoclave at a pressure of 20 kg/cm$^2$•G. A polymerization reaction was allowed to proceed for 1 hour, while supplying ethylene gas to maintain the total pressure in the autoclave at a constant level. 32.1 g of a polymer was obtained. It was found that the $\overline{Mw}$ of the polymer was 726,000 and the $\overline{Mw}/\overline{Mn}$ was 2.35. The obtained polymer had a density of 0.918 g/cm$^3$. The measurement of the comonomer distribution of the polymer by GPC-(FT-IR) showed that 1-hexene was distributed uniformly from the low molecular region to the high molecular region in the molecular weight distribution of the obtained polymer.

Example 124

A polymerization reaction was conducted in substantially the same manner as in Example 123 except that use was made of catalyst 60 [(nBuCp)Zr(O—C$_6$H$_4$—NC$_4$H$_8$)$_2$Cl] instead of catalyst 59. 30.5 g of a polymer was obtained. It was found that the $\overline{Mw}$ of the polymer was 665,000, the $\overline{Mw}/\overline{Mn}$ was 2.95 and the density was 0.911 g/cm$^3$.

Example 125

A polymerization reaction was conducted in substantially the same manner as in Example 123 except that use was made of catalyst 61 [CpHf(O—CMe$_2$CMe$_2$—NMe$_2$)$_2$Cl]. 29.6 g of a polymer was obtained. It was found that the $\overline{Mw}$ of the polymer was 683,000, the $\overline{Mw}/\overline{Mn}$ was 3.62 and the density was 0.920 g/cm$^3$.

Example 126

A polymerization reaction was conducted in substantially the same manner as in Example 123 except that use was made of catalyst 62 [(Cp*SiMe$_2$NiPr—C$_6$H$_4$—O)ZrCl$_2$]. 40.6 g of a polymer was obtained. It was found that the $\overline{Mw}$ of the polymer was 465,000, the $\overline{Mw}/\overline{Mn}$ was 3.45 and the density was 0.909 g/cm$^3$.

Example 127

A polymerization reaction was conducted in substantially the same manner as in Example 123 except that use was made of catalyst 63 [{(1,3-Me$_2$Cp)CMe$_2$NPhCH$_2$CH$_2$—O}ZrCl$_2$]. 39.5 g of a polymer was obtained. It was found that the $\overline{Mw}$ of the polymer was 354,000, the $\overline{Mw}/\overline{Mn}$ was 3.60 and the density was 0.907 g/cm$^3$.

Example 128

Into a 100 ml glass reactor which had been fully purged with nitrogen gas were charged a 10 ml toluene solution containing 1 μmole of catalyst 64 [(1,3-Me$_2$CP)Zr{O-(4-C$_3$H$_5$—C$_6$H$_3$—NMe$_2$)}$_2$(OMe)], a 10 ml toluene solution containing 1 mmole of tri-isobutylaluminum and a 10 ml toluene solution containing 2 μmole of triphenylcarbonium-tetrakis(pentafluorophenyl)borate, followed by mixing. The temperature of the inside of the reactor was maintained at 30° C. for 10 minutes while stirring, to thereby obtain a toluene solution of a final olefin polymerization catalyst composition.

15 ml of the above-obtained toluene solution of the catalyst composition was charged together with 0.5 liter of dehydrated and deoxidated toluene into a 1.6-liter autoclave which had been evacuated and purged with nitrogen gas. 100 ml of 1-hexene was charged into the autoclave, and the temperature of the inside of the autoclave was maintained at 80° C. Ethylene gas was charged into the autoclave at a pressure of 10 kg/cm$^2$•G. A polymerization reaction was allowed to proceed for 1 hour, while supplying ethylene gas to maintain the total pressure in the autoclave at a constant level. 31.2 g of a polymer was obtained. It was found that the $\overline{Mw}$ of the polymer was 647,000, the $\overline{Mw}/\overline{Mn}$ was 2.54 and the density was 0.915 g/cm$^3$.

INDUSTRIAL APPLICABILITY

By polymerizing an olefin using the olefin polymerization catalyst of the present invention, there can be advantageously produced an olefin homopolymer having a narrow molecular weight distribution or an olefin copolymer having not only a narrow molecular weight distribution but also a uniform copolymerization distribution (i.e., uniform distribution with respect to the proportions of different component monomer units constituting the copolymer). The produced polymer has advantages in that it has high impact strength, high resistance to stress cracking, high transparency, excellent heat sealing properties at low temperatures, high blocking resistance, low tackiness, low extractability and the like.

What is claimed is:

1. A method for producing a homopolymer or copolymer, said method comprising homopolymerizing or copolymerizing an olefin in the presence of an olefin polymerization catalyst comprising a transition metal compound, said transition metal compound comprising one transition metal selected from the group consisting of Ti, Zr and Hf, and at least two ligands, wherein one ligand is a group having a cyclopentadienyl skeleton, and the remaining at least one ligand is a monovalent, bidentate, anionic chelating ligand having two coordinating atoms each coordinated to said transition metal, one of which atoms is selected from the group consisting of O, S, Se and Te, and the other atom of which is selected from the group consisting of N, S, Se and Te, and wherein one of said remaining at least one ligand is optionally bonded to said group having a cyclopentadienyl skeleton through a bridging group.

2. The method according to claim 1, therein said transition metal compound is a compound represented by the following formula (1):

Wherein $C_p$ represents a group having a cyclopentadienyl skeleton,

M represents Ti, Zr or Hf, $L^1$ represents a bidentate chelating ligand

Represented by the following formula (2):

Wherein each of $X^1$ and $X^2$ is a coordinating atom, wherein $X^1$ represents O, S, Se or Te, $X^2$ represents S, Se or Te, and each of $R^1$ and $R^2$ independently represents an unsubstituted or substituted $C_1$–$C_{20}$ hydrocarbon group, with the proviso that $R^1$ and $R^2$ are optionally bonded to each other, so that $R^1$, $R^2$ and N together form a 5- or 6-membered ring containing a nitrogen atom, Y represents a halogen atom, a $C_1$–$C_{20}$ hydrocarbon group, a $C_1$–$C_{20}$ alkoxy group, a $C_1$–$C_{20}$ thioalkoxy group, a $C_6$–$C_{20}$ aryloxy group, a $C_6$–$C_{20}$ thioaryloxy group, an amino group substituted with a $C_1$–$C_{20}$ hydrocarbon group, or a phosphino group substituted with a $C_1$–$C_{20}$ hydrocarbon group, and m represents 1, 2 or 3.

3. The method according to claim 1, wherein said transition metal compound is a compound represented by the following formula (3):

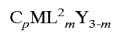

Wherein $C_p$ represents a group having a cyclopendienyl skeleton,

M represents Ti, Zr or Hf, $L^2$ represents a bidentate chelating ligand represented by the following formula (4):

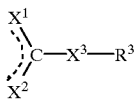
(4)

wherein each of $X^1$ and $X^2$ is a coordinating atom, wherein $X^1$ represents O, S, Se or Te, $X^2$ represents S, Se or Te, $X^3$ represents O, S, Se or Te, and $R^3$ represents an unsubstituted or substituted $C_1$–$C_{20}$ hydrocarbon group, Y represents a halogen atom, a $C_1$–$C_{20}$ hydrocarbon group, a $C_1$–$C_{20}$ alkoxy group, a $C_1$–$C_{20}$ thioalkoxy group, a $C_6$–$C_{20}$ aryloxy group, a $C_6$–$C_{20}$ thioaryloxy group, an amino group substituted with a $C_1$–$C_{20}$ hydrocarbon group, or a phosphino group substituted with a $C_1$–$C_{20}$ hydrocarbon group, and m represents 1, 2 or 3.

4. The method according to claim 1, wherein said transition metal compound is a compound represented by the following (5) or (6):

$$C_pM(L^3-R^4)_mY_{3-m} \qquad (5)$$

$$(C_q-A-L^3)M(L^3-R^4)_nY_{2-n} \qquad (6)$$

wherein $C_p$ represents a group having a cyclopentadienyl skeleton, $C_q$ represents a group, having a cycloentadienyl skeleton, covalently bonded to A, M represents Ti, Zr or Hf, $L^3$ represents a bidentate chelating functional group represented by the following formula (7):

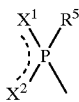
(7)

wherein each of $X^1$ and $X^2$ is a coordinating atom, wherein $X^1$ represents O, S, Se or Te, $X^2$ represents S, Se or Te, $R^5$ is represented by $X^5R^7$ or $R^7$, wherein $X^5$ represents O, S, Se or Te, and $R^7$ represents an unsubstituted or substituted $C_1$–$C_{20}$ hydrocarbon group, $R^4$ is represented by $X^4R^6$ or $R^6$, wherein $X^4$ represents O, S, Se or Te, and $R^6$ represents an unsubstituted or substituted $C_1$–$C_{20}$ hydrocarbon group, A represents a covalently bonded bridging group or atom selected from the group consisting of —$CR^8_2$—, —$CR^8_2CR^8_2$—, —$CR^8$=$CR^8$—, —$SiR^8_2$—, —$SiR^8_2SiR^8_2$—, —$GeR^8_2$—, —$BR^8$—, —$AlR^8$—, —$PR^8$—, —$P(O)R^8$—, —$NR^8$—, —$SO_2$—, —$SO$—, —O—, —S—, —Ge—, —Sn—, and —CO—, wherein $R^8$ represents a hydrogen atom, a halogen atom, or an unsubstituted or substituted $C_1$–$C_{20}$ hydrocarbon group, Y represents a halogen atom, a $C_1$–$C_{20}$ hydrocarbon group, a $C_1$–$C_{20}$ alkoxy group, a $C_1$–$C_{20}$ thioalkoxy group, a $C_6$–$C_{20}$ aryloxy group, a $C_6$–$C_{20}$ thioaryloxy group, an amino group substituted with a $C_1$–$C_{20}$ hydrocarbon group, or a phosphino group substituted with a $C_1$–$C_{20}$ hydrocarbon group, m represents 1, 2 or 3, and n represents 0, 1 or 2.

5. The method according to claim 1, wherein said transition metal compound is a compound represented by the following formula (8):

$$C_pML^4_nY_{3-n} \qquad (8)$$

Wherein $C_p$ represents a group having a cyclopentadienyl skeleton,

M represents Ti, Zr or Hf, $L^4$ represents a bidentate chelating ligand represented by the following formula (9):

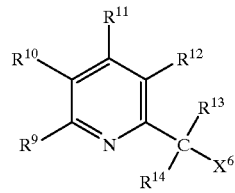
(9)

wherein each of N and $X^6$ is a coordinating atom, $X^6$ represents O, S, Se or Te, and each of $R^9$, $R^{10}$, $R^{11}$, $R^{12}$, $R^{13}$ and $R^{14}$ independently represents a hydrogen atom, a halogen atom, an unsubstituted or substituted $C_1$–$C_{20}$ hydrocarbon group, an unsubstituted or substituted $C_1$–$C_{20}$ alkoxy group, or a silyl group substituted with an unsubstituted or substituted $C_1$–$C_{20}$ hydrocarbon group, with the proviso that when each of $R^9$, $R^{10}$, $R^{11}$, $R^{12}$, $R^{13}$ and $R^{14}$ represents an unsubstituted or substituted hydrocarbon group, a pair of members of at least one combination of $R^9$ and $R^{10}$, $R^{10}$ and $R^{11}$, $R^{11}$ and $R^{12}$, and $R^{12}$ and $R^{13}$ are optionally bonded to each other, so that at least one combination of $R^9$ and $R^{10}$, $R^{10}$ and $R^{11}$, $R^{11}$ and $R^{12}$ and $R^{13}$ forms a 4-, 5- or 6-membered ring, Y represents a halogen atom, an unsubstituted or substituted $C_1$–$C_{20}$ hydrocarbon group, a $C_1$–$C_{20}$ alkoxy group, a $C_1$–$C_{20}$ thioalkoxy group, a $C_6$–$C_{20}$ aryloxy group, a $C_6$–$C_{20}$ thioaryloxy group, an amino group substituted with a $C_1$–$C_{20}$ hydrocarbon group, or a phosphino group substituted with a $C_1$–$C_{20}$ hydrocarbon group, and n represents 1 or 2.

6. The method according to claim 1, wherein said transition metal compound is a compound represented by the following formula (10) or (11):

$$C_pM(L^5-R^{15})_mY_{3-m} \qquad (10)$$

$$(C_q-A-L^5)M(L^5-R^{15})_nY_{2-n} \qquad (11)$$

wherein $C_p$ represents a group having a cyclopentadienyl skeleton, $C_q$ represents a group, having a cyclopentadienyl skeleton, covalently bonded to A, M represents Ti, Zr or Hf, $L^5$ represents a bidentate chelating functional group represented by the following formula (12):

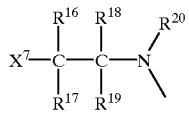 (12)

Wherein each of $X^7$ and N is a coordinating atom, wherein $X^7$ represents O, S, Se or Te, each of $R^{16}$, $R^{17}$, $R^{18}$ and $R^{19}$ independently represents a hydrogen atom, a halogen atom, an unsubstituted or substituted $C_1$–$C_{20}$ hydrocarbon group, an unsubstituted or substituted $C_1$–$C_{20}$ alkoxy group, or a silyl group substituted with an unsubstituted or substituted $C_1$–$C_{20}$ hydrocarbon group, or $L_5$ represents a bidentate chelating functional group having a structure such that, in said formula (12), each of the two carbon atoms has one or two unsubstituted or substituted hydrocarbon groups, wherein two hydrocarbon groups, which are respectively bonded to said two carbon atoms, are bonded to each other so that said two carbon atoms and said two hydrocarbon groups together form a 4-, 5- or 6-membered ring, or wherein each of $R^{16}$ and $R^{18}$ is the hydrocarbon group and $R^{17}$ and $R^{19}$ together form a second bond, said $R^{16}$ and said $R^{18}$ being bonded to each other, so that said two carbon atoms, $R^{16}$ and $R^{18}$ together form a 4-, 5- or 6-membered ring containing at least one carbon-to-carbon double bond, or wherein each of $R^{17}$ and $R^{19}$ is the hydrocarbon group and each of $R^{16}$ and $R^{18}$ together form a second bond, said $R^{17}$ and said $R^{19}$ being bonded to each other, so that said two carbon atoms, $R^{17}$ and $R^{19}$ together form 4-, 5- or 6-membered ring containing at least one carbon-to-carbon double bond, each of $R^{15}$ and $R^{20}$ independently represents a hydrogen atom, or an unsubstituted or substituted $C_1$–$C_{20}$ hydrocarbon group, with the proviso that $R^{15}$ and $R^{20}$ are optionally bonded to each other, so that $R^{15}$, $R^{20}$ and N together form a 5- or 6-membered ring containing a nitrogen atom, A represents a bridging group or atom forming the bridging by covalent bonding, and is selected from the group consisting of —$CR^8_2$—, —$CR^8_2CR^8_2$—, —$CR^8$=$CR^8$—, —$SiR^8_2$—, —$SiR^8_2SiR^8_2$—, —$GeR^8_2$—, —$BR^8$—, —$AlR^8$—, —$PR^8$—, —$P(O)R^8_2$—, —$NR^8$—, —$SO_2$—, —SO—, —O—, —S—, —Ge—, —Sn—, and —CO—, wherein $R^8$ represents a hydrogen atom, a halogen atom, or an unsubstituted or substituted $C_1$–$C_{20}$ hydrocarbon group, Y represents a halogen atom, an unsubstituted or substituted $C_1$–$C_{20}$ hydrocarbon group, a $C_1$–$C_{20}$ alkoxy group, a $C_1$–$C_{20}$ thioalkoxy group, a $C_6$–$C_{20}$ aryloxy group, a $C_6$–$C_{20}$ thioaryloxy group, an amino group substituted with a $C_1$–$C_{20}$ hydrocarbon group, or a phosphino group substituted with a $C_1$–$C_{20}$ hydrocarbon group, m represents 1 or 2, and n represents 0, 1 or 2.

7. The method according to any one of claims 1 to 6, wherein the catalyst further comprises at least one auxiliary catalyst selected from the group consisting of an organoaluminumoxy compound and a cation generator.

* * * * *